United States Patent
Hodge

(10) Patent No.: US 8,494,144 B2
(45) Date of Patent: Jul. 23, 2013

(54) SYSTEM AND METHOD FOR CONTROLLED CALL HANDLING

(75) Inventor: Stephen Lee Hodge, Aubry, TX (US)

(73) Assignee: **Global Tel*Link Corporation**, Mobile, AL (US)

( * ) Notice: Subject to any disclaimer, the term of this patent is extended or adjusted under 35 U.S.C. 154(b) by 1075 days.

(21) Appl. No.: 12/378,191

(22) Filed: Feb. 12, 2009

(65) Prior Publication Data

US 2012/0099714 A1 Apr. 26, 2012

(51) Int. Cl.
*H04M 3/42* (2006.01)
*H04M 1/56* (2006.01)
*H04M 15/06* (2006.01)

(52) U.S. Cl.
USPC ............ 379/210.02; 379/142.01; 379/201.01; 379/211.01

(58) Field of Classification Search
USPC ............. 379/201.01, 114.27, 210.02, 127.02, 379/211.01, 207.15, 142.01, 142.06, 207.02; 455/406
See application file for complete search history.

(56) References Cited

U.S. PATENT DOCUMENTS

| | | | |
|---|---|---|---|
| 5,274,695 A | 12/1993 | Green | |
| 5,473,671 A | 12/1995 | Partridge | |
| 5,485,507 A | 1/1996 | Brown et al. | |
| 5,502,759 A | 3/1996 | Cheng et al. | |
| 5,655,013 A | 8/1997 | Gainsboro | |
| 5,717,743 A | 2/1998 | McMahan et al. | |
| 5,923,746 A | 7/1999 | Baker et al. | |
| 5,926,533 A | 7/1999 | Gainsboro | |
| 5,943,403 A | 8/1999 | Richardson et al. | |
| 6,084,967 A | 7/2000 | Kennedy et al. | |
| 6,104,922 A | 8/2000 | Baumann | |
| 6,182,221 B1 | 1/2001 | Hsu et al. | |
| 6,213,391 B1 | 4/2001 | Lewis | |
| 6,219,439 B1 | 4/2001 | Burger | |
| 6,282,566 B1 | 8/2001 | Lee et al. | |
| 6,377,699 B1 | 4/2002 | Musgrave et al. | |
| 6,389,397 B1 | 5/2002 | Otto | |
| 6,574,317 B1 * | 6/2003 | de Freitas | 379/127.02 |
| 6,668,045 B1 | 12/2003 | Mow | |
| 6,687,733 B2 | 2/2004 | Manukyan | |
| 6,819,219 B1 | 11/2004 | Bolle et al. | |
| 6,836,556 B1 | 12/2004 | Bromba et al. | |
| 6,950,508 B1 | 9/2005 | Griffiths | |
| 2002/0042879 A1 | 4/2002 | Gould et al. | |
| 2002/0177433 A1 | 11/2002 | Bravo et al. | |
| 2003/0002639 A1 * | 1/2003 | Huie | 379/114.27 |
| 2009/0060161 A1 * | 3/2009 | Mertz et al. | 379/210.02 |
| 2010/0151820 A1 * | 6/2010 | Mulherin et al. | 455/406 |

* cited by examiner

Primary Examiner — Thjuan K Addy
(74) Attorney, Agent, or Firm — Sterne, Kessler, Goldstein & Fox PLLC

(57) ABSTRACT

A telephone call management system is provided including a local system and a central site server using improved blocked or restricted call means including network traffic management. Decisions to allow or block a call to called parties are accomplished by using flagged indicators associated with certain called telephone numbers, with subsequent verification of a central database. The system includes management software capable of implementing widespread or local changes to the system and is further capable of modifying or setting any number of user account parameters.

20 Claims, 41 Drawing Sheets

FIG. 16

Telephone Location Maintenance

Telephone Location

| Station | Living Unit | Location |  | Rec Ch. | Time(s) |
|---------|-------------|----------|--|---------|---------|
| 0001 | Default | LINE #1 | | 0001 | 1 |
| 0002 | Default | LINE #2 | | 0002 | 2 |
| 0003 | LOCATION A | LINE #3 | | 0003 | 3 |
| 0004 | LOCATION A | LINE #4 | | 0004 | 4 |
| 0005 | LOCATION A | LINE #5 | | 0005 | 5 |
| 0006 | Default | LINE #6 | | 0006 | 6 |
| 0007 | Default | LINE #7 | | 0007 | 7 |
| 0008 | Default | LINE #8 | | 0008 | 8 |
| 0009 | CELL BLOCK B | LINE #9 | | 0009 | 9 |
| 0010 | CELL BLOCK B | LINE #10 | | 0010 | 10 |
| 0011 | CELL BLOCK B | LINE #11 | | 0011 | 11 |
| 0012 | Default | LINE #12 | | 0012 | 12 |

Site Server Name: itacni_test

Station Number: 0004  Rec Channel: 4

Living Unit: LOCATION A

Location: LINE #4

[ Change ]  [ Close ]

FIG. 17

Facility Telephone Number Control

Facility Telephone Number

| Telephone Number | Type |
|---|---|
| (304) 466-5650 | Blocked |
| (909) 641-8410 | Blocked |
| (909) 355-9406 | Blocked |

Telephone Number: (909) 641 - 8410    Max Extra Digits: 0

Type: ● Block  ○ Allow  ○ No List required
      ☑ Collect  ☑ Direct

Number of days: 0    Date: 05/19/1999

Comments: [          ]

User: Tech

[Add] [Change] [Delete]    [International]    [OK] [Close]

FIG. 18

Nationwide Telephone Number Control — 1801

Facility Telephone Number — 1802

| Telephone Number | Type |
|---|---|
| (212) 383-0404 | Approved |
| (800) 426-9400 | Approved |
| (972) 808-3305 | Approved |
| (567) 887-2324 | Blocked |
| (972) 454-0100 | Blocked |
| (212) 424-1000 | Blocked |
| (914) XXX-XXXX | Blocked |
| (202) 222-XXXX | Blocked |
| (214) 555-1212 | Blocked |
| (972) 808-9431 | Allowed |

Telephone Number — 1803: ( 914 ) XXX XXXX

Max Extra Digits — 1804: 0

Type — 1805:
- ● Block  ○ Approved  ○ Exclude
- ☑ Collect  ☑ Direct

Number of days: 0   Date: 11/17/1998 — 1809

Comments: NO WESTCHESTER CALLS ALLOWED — 1811

User: Administrator

[Add] [Change] [Delete] — 1807   [International] — 1813 [OK] [Close]

| Multiple Telephone List Update | | | | | | |
|---|---|---|---|---|---|---|
| Register Number — DEV | Last Name TESTER | First Name CHESTER | Middle Name | | Maximum Active Telephone Numbers 30 | |
| Telephone Number | Comments | | | | Called Party Language English | |
| ☑ Direct Not Allow Reason | | Alert Telephone Number ☐ | | | Record ☑ | |
| ☑ Collect Not Allow Reason | | Extra Dialed Digits 4 | | | Active Telephone Numbers 9 | |
| ☑ Allow Not Allow Reason | | Cancel | Add | | Change | Delete |

| Telephone Number | Record | Called Party Lang | Alert | Allow | Allow Collect | Allow Direct | Comment |
|---|---|---|---|---|---|---|---|
| 6179311223 | Yes | English | No | Yes | Yes | Yes | |
| 9728083301 | Yes | English | No | Yes | Yes | Yes | |
| 9728083307 | Yes | English | No | Yes | Yes | Yes | |
| 9728083312 | Yes | English | No | Yes | Yes | Yes | |
| 9783865813 | Yes | English | No | Yes | Yes | Yes | |
| 9787961000 | Yes | English | No | Yes | Yes | Yes | |
| 9787961128 | Yes | English | No | Yes | Yes | Yes | |
| 9787961129 | Yes | English | No | Yes | Yes | Yes | |
| 9788401123 | Yes | English | No | Yes | Yes | Yes | |

OK    Close

First Level Called Party Number Control — 2121

XXXXXX XXXXXXXXX XXXXXXX

2115

| Telephone Number | Flagged Status |
|---|---|
| (304) 466-5650 | Flagged |
| (909) 641-8410 | Flagged |
| (909) 355-9406 | Flagged |

| Add | Change | Delete |

FIG. 22

View Calls in Progress — 2200

| | | | |
|---|---|---|---|
| User Name | Administrator | | |
| Computer Name | SITE1_WS2 | | |
| Speaker ID | XXXX | | |
| Status | Connected | | |

2201 2203 2205  2207 2209 2211 2213

Close

| Alert | Rec Ch | Living Unit | Register | Name | Time | Duration |
|---|---|---|---|---|---|---|
| No | 062 | Default | 02020202 | BULKTEST2, TEST2 T | 15:45:50 | 00:00:10 |
| No | 069 | Default | 09090909 | BULKTEST9, TEST9 T | 15:45:50 | 00:00:10 |
| No | 075 | LOCATION A | 15151515 | BULKTEST15, TEST15 T | 15:45:51 | 00:00:10 |
| No | 067 | Default | 07070707 | BULKTEST7, TEST7 T | 15:45:51 | 00:00:10 |
| No | 071 | Default | 11111112 | BULKTEST11, TEST11 T | 15:45:51 | 00:00:10 |
| No | 074 | Default | 14141414 | BULKTEST14, TEST14 T | 15:45:52 | 00:00:10 |
| No | 077 | Default | 17171717 | BULKTEST17, TEST17 T | 15:45:52 | 00:00:10 |
| No | 063 | Default | 03030303 | BULKTEST3, TEST3 T | 15:45:52 | 00:00:10 |
| No | 061 | Default | 01010101 | BULKTEST1, TEST1 T | 15:45:52 | 00:00:10 |

| Username | Full Name | Description |
|---|---|---|
| admin | tracking action code.nt | |
| Administrator | | Built-in account for administering the computer/domain |
| arcnet | | |
| autologon | | |
| dirrep | Directory Replication | account for directory replication domains |
| Guest | | Built-in account for guest access to the computer/domain |
| jballard | | |
| Ray | | |
| serges | Serge Seyfetdinov | self |
| site2user1 | | |
| site2user2 | | |

| Groups | Description |
|---|---|
| Account Operators | Members can administer domain user and group accounts |
| Administrators | Members can fully administer the computer/domain |
| Backup Operators | Members can bypass file security to back up files |
| Domain Admins | Designated administrators of the domain |
| Domain Guests | Alt domain guests |
| Domain Users | Alt domain users |
| Guests | Users granted guest access to the computer/domain |
| Investigators | |
| ITS_ACL_GUARD | REGULAR USERS |

FIG. 30

| Date | Time | Type | Amount | Balance | Facility | Ref. | Number | User |
|---|---|---|---|---|---|---|---|---|
| 10/01/1998 | 09:08 | INMATE INIT FUND | $100.00 | $7374.55 | | 2 | 1189 | INMA |
| 10/03/1998 | 00:54 | DEPOSIT | $300.00 | $7574.55 | | 2 | 1207 | Admi |
| 10/03/1998 | 01:27 | WITHDRAW | $300.00 | $7274.55 | | 2 | 1208 | Admi |
| 10/03/1998 | 03:26 | DEPOSIT | $123.00 | $7397.55 | | 2 | 1209 | Admi |
| 10/03/1998 | 03:27 | REFUND | $23.00 | $7420.55 | | 2 | 1210 | Admi |
| 10/03/1998 | 03:28 | WITHDRAW | $100.00 | $7320.55 | | 2 | 1211 | Admi |
| 10/03/1998 | 03:38 | DEPOSIT | $234.00 | $7554.55 | | 2 | 1212 | Admi |
| 10/03/1998 | 03:35 | WITHDRAW | $123.00 | $7434.55 | | 2 | 1213 | Admi |
| 10/03/1998 | 03:44 | DEPOSIT | $123.00 | $7554.55 | | 2 | 1214 | Admi |
| 10/03/1998 | 03:44 | WITHDRAW | $123.00 | $7431.55 | | 2 | 1215 | Admi |
| 10/03/1998 | 03:47 | DEPOSIT | $234.00 | $7665.55 | | 2 | 1216 | Admi |
| 10/03/1998 | 03:48 | WITHDRAW | $234.00 | $7431.55 | | 2 | 1217 | Admi |
| 10/03/1998 | 03:50 | DEPOSIT | $23.00 | $7454.55 | | 2 | 1218 | Admi |

Year 1998 (3002, 3003) — Month Oct (3005, 3004) — Display (3009, 3017) — Current Month (3011, 3019) — Sort Order (3013, 3021) — Refund (3015, 3023)

| Date | Time | Dialed Digits | Duration | Charge | Charge Type | Call Result | Recorder | Alert Type |
|---|---|---|---|---|---|---|---|---|
| 10/19/1998 | 00:00 | 9721618625 | 0 | $0.00 | DIRECT CALL | 10 | 62 | N/A |
| 10/19/1998 | 00:00 | 9721618625 | 0 | $0.00 | DIRECT CALL | 10 | 62 | N/A |
| 10/19/1998 | 00:00 | 9721618625 | 0 | $0.00 | DIRECT CALL | 10 | 62 | N/A |
| 10/19/1998 | 00:00 | 9721618625 | 87 | $0.30 | DIRECT CALL | 0 | 62 | N/A |
| 10/19/1998 | 00:00 | 9721618625 | 87 | $0.30 | DIRECT CALL | 0 | 62 | N/A |
| 10/19/1998 | 00:00 | 9721618625 | 87 | $0.30 | DIRECT CALL | 0 | 62 | N/A |
| 10/19/1998 | 00:00 | 9721618625 | 0 | $0.00 | DIRECT CALL | 10 | 62 | N/A |
| 10/19/1998 | 00:00 | 9721618625 | 87 | $0.30 | DIRECT CALL | 0 | 62 | N/A |
| 10/19/1998 | 00:00 | 9721618625 | 85 | $0.30 | DIRECT CALL | 0 | 62 | N/A |
| 10/19/1998 | 00:00 | 9721618625 | 87 | $0.30 | DIRECT CALL | 0 | 62 | N/A |
| 10/19/1998 | 00:00 | 9721618625 | 0 | $0.00 | DIRECT CALL | 10 | 62 | N/A |
| 10/19/1998 | 00:00 | 9721618625 | 87 | $0.30 | DIRECT CALL | 0 | 62 | N/A |
| 10/19/1998 | 00:00 | 9721618625 | 87 | $0.30 | DIRECT CALL | 0 | 62 | N/A |

FIG. 33

| Remaining Limits | Collect | | | Direct | | | Total | | |
|---|---|---|---|---|---|---|---|---|---|
| Number of Calls | Maximum | Used | Remaining | Maximum | Used | Remaining | Maximum | Used | Remaining |
| Today | 3 | 0 | 3 | 3 | 2 | 1 | 6 | 2 | 4 |
| This Week | 10 | 0 | 10 | 25 | 2 | 23 | 35 | 2 | 33 |
| This Month | 30 | 0 | 30 | 50 | 2 | 48 | 80 | 2 | 78 |

| Number of Minutes | Collect | | | Direct | | | Total | | |
|---|---|---|---|---|---|---|---|---|---|
| | Maximum | Used | Remaining | Maximum | Used | Remaining | Maximum | Used | Remaining |
| Today | 60 | 0 | 60 | 60 | 4 | 56 | 120 | 4 | 116 |
| This Week | 200 | 0 | 200 | 500 | 4 | 496 | 700 | 4 | 696 |
| This Month | 1800 | 0 | 1800 | 1800 | 4 | 1796 | 3600 | 4 | 3596 |

| Number of Incoming | TTS Inquiries | | | Commissary Transfers | | | Fund Transfers to TTS | | |
|---|---|---|---|---|---|---|---|---|---|
| | Maximum | Used | Remaining | Maximum | Used | Remaining | Maximum | Used | Remaining |
| Today | 3 | 1 | 2 | 3 | 1 | 2 | 2 | 0 | 2 |
| This Week | 7 | 1 | 6 | 10 | 1 | 9 | 10 | 0 | 10 |
| This Month | 20 | 1 | 19 | 30 | 150 | 0 | 30 | 0 | 30 |

FIG. 38

| | RID | Date | Time | Dest_ANI | Dur | Station Name |
|---|---|---|---|---|---|---|
| | 09090111 | 11/10/2000 | 08:51:49 | 9728082781 | 0:19 | CAMP 1-E |
| | 09090111 | 11/10/2000 | 09:12:22 | 9728083382 | 2:17 | CAMP 1-E |
| | 09090111 | 11/10/2000 | 09:18:29 | 9728083382 | 0:00 | CAMP 1-E |
| | 09090111 | 11/13/2000 | 08:39:02 | 9728083382 | 0:17 | CAMP 1-E |
| | 09090111 | 11/13/2000 | 08:42:49 | 9728083382 | 0:00 | CAMP 1-E |
| | 09090222 | 11/10/2000 | 08:57:35 | 9728083313 | 1:41 | CAMP 1-E |
| | 09090222 | 11/13/2000 | 08:54:50 | 9728083382 | 0:00 | CAMP 1-E |
| | 09090222 | 11/13/2000 | 09:06:59 | 9728083382 | 1:59 | CAMP 1-E |
| | 09090333 | 11/13/2000 | 09:10:16 | 9728083382 | 0:35 | CAMP 1-E |
| | 09090333 | 11/10/2000 | 09:20:47 | 9728083382 | 0:00 | CAMP 1-E |
| | 09090333 | 11/10/2000 | 09:22:47 | 9728083382 | 0:13 | CAMP 1-E |
| | 09990101 | 12/19/2000 | 13:47:18 | 9728083382 | 0:00 | CAMP 1-E |
| | 09990101 | 12/19/2000 | 14:34:05 | 4073337000 | 0:05 | CAMP 1-E |
| | 09990101 | 12/19/2000 | 14:38:21 | 4073337000 | 0:05 | CAMP 1-E |
| | 09990102 | 12/19/2000 | 15:43:04 | 4073337000 | 0:00 | CAMP 1-E |
| | 09990102 | 12/19/2000 | 12:47:58 | 2143400650 | 0:21 | CAMP 1-E |
| | 09990102 | 12/20/2001 | 13:16:13 | 01157224124380 | 0:00 | CAMP 1-E |
| | 09990109 | 12/19/2000 | 15:28:50 | 9728083307 | 0:00 | CAMP 1-E |
| | 09990110 | 12/19/2000 | 15:47:04 | 9728083307 | 0:00 | CAMP 1-E |
| | 11234453 | 11/09/2000 | 15:38:34 | 9728083307 | 0:00 | CAMP 1-E |
| | 11234453 | 11/09/2000 | 15:44:19 | 9728083307 | 0:00 | CAMP 1-E |
| | 11234453 | 11/10/2000 | 11:58:12 | 9728083307 | 0:00 | CAMP 1-E |

Close | Save To | Print | Printer Setup | Play | Cancel Play

FIG. 40

Correctional Facility
Account Telephone Number List

Run Date: 04/12/2000
Run Time: 17:57:47

Page 1 of 1

Report Site: VAC TEST FACILITY SITE 2
Terminal Making Request: RAY_SQL
User ID: Administrator — 4005

Register 12345111    Facility   TS2
Inmate Name Clinton Chuck   4011   4013   4015

| Phone Number | Collect | Direct | Record | Allow | Called Party Language | Date Changed |
|---|---|---|---|---|---|---|
| 2026162040 | YES | YES | YES | YES | ENGLISH | 12/15/2000 |
| 9725428754 | NO  | YES | YES | YES | ENGLISH | 12/15/2000 |
| 9726395252 | YES | YES | YES | YES | ENGLISH | 12/15/2000 |
| 9724565250 | YES | YES | YES | YES | ENGLISH | 12/15/2000 |
| 2146462000 | NO  | YES | NO  | YES | ENGLISH | 12/15/2000 |
| 2143965787 | YES | YES | YES | YES | ENGLISH | 12/15/2000 |
| 2145236463 | YES | YES | YES | YES | ENGLISH | 12/15/2000 |
| 2146233354 | YES | YES | YES | YES | ENGLISH | 12/15/2000 |
| 2146815544 | NO  | YES | YES | NO  | ENGLISH | 12/17/2000 |
| 2143652158 | YES | YES | YES | YES | ENGLISH | 12/7/2000 |

Number of Telephone Numbers for Inmate: 10 — 4021

Register 55264152   Facility   TS2
Inmate Name Williams Mathew

SYSTEM AND METHOD FOR CONTROLLED CALL HANDLING

FIELD OF THE INVENTION

The invention relates generally to the field of telephone communication systems in penal institutions or similar facilities. In particular, the invention relates to a computer-based telecommunication system with the capacity to effectively control handling of calls placed to called parties that have elected to block or restrict calls from a user.

BACKGROUND OF THE INVENTION

Generally, the need to monitor, control, record and provide detailed records of the usage of a telephone system in a controlled institutional environment is well recognized. It is common to utilize a controlled telephone system capable of monitoring outgoing telephone connections in many types of institutional environments, such as, but not limited to, penal institutions, military institutions, hospitals, schools, businesses, or specific types of government institutions. The reasons for monitoring and controlling institutional telephone systems are evident. To prevent potential called parties from receiving unwanted or even harassing telephone calls, the institutions must restrict or block access to outbound telephone lines. Otherwise, individuals who do not want to be contacted, for instance, by an individual in a penal institution, face the risk of being harassed by an inmate.

Therefore, it is imperative for many institutions to utilize a communication system that provides an accurate control means for administrators to block calls made by an individual responsible to a party unwilling to accept those calls.

Providing telephone systems in specific types of highly restricted institutions, such as in penal institutions, results in the consideration of numerous additional complicating factors. Generally, outbound communication means in penal institutions are heavily regulated by the government. Therefore, communication systems implemented in penal institutions or similar facilities must meet greater security requirements often mandated by regulatory bodies affiliated with the county, state, or federal institution. Thus, the communication system used in a regulated institution must employ unique functions often unnecessary in other types of institutions.

In its most general form, a penal institution's telephone system utilizes a call processor to approve and place a call, surveillance equipment or monitoring equipment, and a recording device for evidencing the conversation. Generally, these simple systems are not equipped to restrict an inmate from calling any individual. However, it is preferable for the call system devices now employed in such institutions to have the capability to thwart an inmate from calling certain specific individuals or types of individuals. Without the necessary constraints on an inmate's use of the telephone system, inmates have often harassed outside parties or individuals. For example, it is generally preferred that an inmate should not be able to place a telephone call to the prosecutor who prosecuted the inmate's case or another attorney responsible for the sentencing of the inmate. In another example, it may be preferred that an inmate be prevented from contacting the victim of the inmate's crime or witnesses from the inmate's case.

It has also been documented that inmates have used previous penal institution call systems to perpetrate additional criminal activities such as fraudulent schemes or specific criminal conspiracies. Specifically, inmates have been known to arrange credit card fraud attempts, the smuggling of contraband into the facility, and have even been known to arrange escape attempts over the penal institution's telephone system.

In addition, individuals who, at one point, willingly receive calls from an inmate may later decide not to receive further calls from that inmate, or may desire to restrict the time that an inmate may call them. Therefore, it is critical in an efficient penal institution to carefully monitor all outgoing telephone calls making a regulated penal institution telephone system a necessity.

Therefore, a required feature of a telephone management system for a penal institution or similar facility is a means for restricting calls placed by a user (e.g., an inmate). It is well documented that inmates often try to harass individuals related to their arrest or confinement, such as judges, prosecutors or witnesses, etc., through telephonic communications. Penal institutions have attempted to prevent this by restricting the telephone numbers each inmate is able to access. For example, a system may utilize a PIN or other identification means to access a list of telephone numbers that the inmate may not call, or alternatively, the system may access a list of numbers that the inmate is authorized to connect to (i.e., the inmate can only call the numbers appearing on the list). Telephone numbers placed on the restricted list can include any individual related to the conviction (e.g., the arresting police officer, the prosecuting attorney, etc.), while telephone numbers placed on the permitted list may be, for example, close family relatives. The system may also limit the amount of time each inmate/user is permitted to conduct each outbound telephone call through the system. Furthermore, restrictions may be regularly updated. For example, if an inmate misbehaves, the inmate's telephone privileges may be further limited or revoked completely.

In order to alleviate some of the problems and concerns discussed herein, many penal institutions have implemented certain task-specific advanced systems. Generally, these "advanced" systems known in the art comprise several features.

For example, it is known in current systems to, employ permanent call blocking. Specifically, it is known in the art to block an inmate or group of inmates from dialing certain telephone numbers. Most systems also prevent inmates from talking directly to live operators. This prevents inmates from requesting that the operator forward a call or provide additional telephone numbers allowing the inmates to harass or locate additional parties. Furthermore, current systems block "1-800," "1-900" and other like telephone numbers including toll-free and pay-to-dial telephone numbers. In addition certain institutions may elect to block country codes, specific area codes, or other third-party numbers.

Current systems known in the art may also utilize a feature commonly referred to as "selective" call blocking. As discussed, "selective" call blocking may be employed to thwart inmates from establishing a connection with a selected group of individuals (i.e., with the home telephone of prison guards, wardens, indictment witnesses, trial witnesses, police officers, judges, etc.). It is also foreseeable that the telephone numbers of the family members of these specific individuals may also be blocked.

Some current systems also limit the use of specific long-distance carriers. This feature proves useful in limiting unnecessary costs incurred by employing alternating carriers.

Several current systems utilize features commonly referred to as "flash hook" prevention or "click" and "pop" prevention modes. These systems prevent inmates from extending the current outgoing telephone call and entering a new telephone call with a new number without fully terminating the original telephone call. For example, this prevents an inmate from utilizing common call forwarding features and the like.

In addition, some current institutional telephone systems electronically or manually disable the keypad after a telephone number is dialed and the telephone call is connected. This feature prevents inmates from interacting with telephone games and lotteries, and in certain older systems, prevents the inmate from achieving an unrestricted dial tone.

Another common feature employed by institutional systems is three-way call prevention. This feature prevents an inmate from instructing the called party to bridge the telephone call to another telephone number.

Other known systems in the art may exhibit other regulatory features. For example, generally, telephone communication systems allow an institution to limit the duration of a telephone call and/or to limit the cost of the telephone call. These types of features further allow a facility to customize the telephone call systems thereby preventing unrecoverable expenditures.

Certain features discussed herein are present in several prior art references. For example, one system known in the art exemplifies the need for a control management and monitoring system in institutional settings. The system discloses controlling, monitoring, recording and reporting telephone communications. The system deals primarily with the identification of a user through use of a PIN and restricting telephone communications through a profile accessed by the PIN. The system further contemplates means for monitoring and recording communications. For instance, the system includes a feature called "GOTU", where a called party enters digits associated with the letters G-O-T-U (4688) in order to prohibit calls from that user in the future. The called party is also provided other options, such as whether a message is played to the inmate in further calls. In addition, a called party may elect to refuse future calls from anyone at the institution, where the restriction is sent to other related institutions. However, the system only operates at a facility level, and does not describe a central monitoring site. Calls that are blocked are blocked at the facility level, and the system fails to implement a central verification of potentially blocked telephone numbers.

In view of the foregoing, clearly there exists a need for a method and apparatus for managing an institution's telephone call system. Furthermore, clearly there exists a need for a telephone call monitoring system for a penal institutions or similar facilities that addresses the increased concerns related to the placement of unwanted or even harassing calls to certain individuals. In particular, there exists a need in the art to provide a computer-based telecommunication system with the capacity to allow an institution and a central facility to cooperate in order to control access to certain called parties.

SUMMARY OF THE INVENTION

The invention embodies a telephone call management system including a local system and a central site server using improved blocked or restricted call means including network traffic management and verification of flagged called numbers prior to blocking a call. In addition, the invention incorporates identification means, control means, monitoring means, recording means, and a reporting means for an institution based telecommunication network. The invention may implement a debit card platform or other such payment methods. The system of the invention may be implemented in a variety of facilities including, but not limited to, penal institutions or similar facilities such as mental institutions, nursing homes, rehabilitation centers, correctional facilities, government agencies, private and public business, and the like.

The telephone system is controlled by a configurable switchboard device that routes calls, performs voice prompts, and responds to menu selections. The switchboard is connected to a site server, which is commonly referred to as an ITAC (Inmate Telephone Access Control) in penal institutions or UTAC (User Telephone Access Control) in certain other types of institutions. This device serves as the main database for the telephone management system.

Connected to the ITAC/UTAC are a number of administrative and investigative workstations used to create, edit, and monitor user accounts and telephone calls.

The system of the current invention is designed to operate in either a local area network (LAN) or a wide area network (WAN). In a LAN configuration, the site server is located within the LAN (e.g., within an institution using the telephone management system).

In a WAN configuration, the site server may be connected to multiple switchboard devices that are located in separate institutions. In this embodiment, the ITAC/UTAC serves as the database location for the entire system. Administrative and investigative workstations may be located at every facility. Alternatively, it is foreseeable that one or more sets of workstations at a central facility may be used to administrate all user accounts.

The switchboard device performs a first level check of the telephone number of the party being called to determine if there they have indicators or flags associated therewith. This first level check may verify, for instance, a data list stored within the switchboard for a flag associated with the called number. If so, a second level check is initiated, where the site server is queried to determine the proper course of action for the call (i.e., block or allow).

The data that is stored locally (e.g., within the switchboard device) is generally limited to a flag that indicates that the number is blocked at the central database (site server). The flag can be viewed by a local administrator, for instance, to inform the inmate as to why their call did not complete. The flag also could make is possible for the site administrator to log into the central database and change the status, depending on the level of access for the administrator. The actual blocked number database is at the central database stored at the site server. The switchboard will always query the central database if the flag is set at the local level. In the event that the WAN/LAN does is not functional, calls to flagged called parties may automatically be treated as blocked calls.

Calls placed by users of the system are routed through the switchboard device and connected to the proper outgoing trunk based on the type of call placed (e.g., collect, debit, etc.). The switchboard tests outgoing trunks as calls are placed. An integrated cross point switch enables any telephone to access any available outgoing trunk. The cross point switch also allows calls from other switchboard modules to be routed to alternate modules for completion. During periods when all trunks are in use on the module at the telephone connection, calls can still be completed provided that some trunks are available on alternate modules. The switchboard device also has an integrated channel bank, allowing for fully integrated T-1 capability. This allows calls to be processed either over analog or digital trunks as required. The architecture of the switchboard allows it to accommodate multiple processors, eliminating system overload during extremely busy periods of telephonic communications.

The main database (ITAC/UTAC) has the ability to log and record details of all telephone calls placed through the system and store them for a period of time defined by the institution.

In addition, the ITAC/UTAC contains a listing of blocked or restricted called party telephone numbers, which may be interrogated under control of the local systems (e.g., the switchboards) when a flagged called party telephone number is encountered. A recorder, which may be integral to the system or remote to the system as a separate storage means attached to the ITAC/UTAC, is responsible for recording the telephone calls and storing them in one or more databases depending on the size of the institution or the amount of data which must be archived by the institution and the capability of the storage means.

Connected to the ITAC/UTAC are a number of administrative and investigative workstations used to create, edit, and monitor user accounts and telephone calls. The investigative workstations may be used to listen to the outgoing telephone calls in real time or to access calls stored on the server or other type of database or storage means.

User-friendly software utilizing a GUI (graphical user interface) or other types of OSD capable devices may be employed to administer all user accounts of the telephone management system. The software allows a system administrator to provide user limitations at all levels of operation. Such user limitations may include, but are not limited to, the total number of minutes allowed, the total number of calls placed, dates and times calls are allowed, telephone exchanges allowed to be accessed, the number of times the debit inquiry system may be used, and other like restrictions. If a WAN configuration is being used, such limitations can be set for each institution on the network or for the entire telephone network. In addition, it is contemplated by the invention that different divisions of each institution, such as cell-blocks in a correctional facility, may also be given global restrictions. Since each division of the institution is linked by a LAN/WAN, changes can be made at any of the different institutions and then be applied globally or locally.

Additional limitations and options are available for individual user accounts. For example, each user may be assigned a language for the telephone system's voice prompts. Another option is the ability to limit the telephone terminals a user may call from or the payment method utilized for each call made.

The called party that a user may contact may also be limited. For example, certain exchanges or telephone numbers may be blocked. Alternatively, users may have to submit a pre-approved list of numbers to the system administrator. Once the user list has been checked to ensure that the inmate is allowed to call those people, the inmate may only call the people on this list.

A further feature of the system is that the people on the user list may choose to deny or restrict calls from certain inmates or users. Upon receiving a call, voice prompts will provide the option for a called party to deny the instant call. In addition, voice prompts will provide options regarding handling of future calls from that inmate or user, from one or more other inmates or users, from the institution, or from any institution under control of the system.

Certain options for contacts on the pre-approved list may be set for each person on the list. For example, a language for each person may be set. The voice prompts for that contact will then be in that language. Contacts may also be assigned specific recording restrictions. For example, a conversation between an inmate and an attorney may require specific recording restrictions. Other options, such as if a caller can only place calls collect or by debit, may also be specified.

An additional feature of the software is that it can create a debit account for each user and monitors the balance. The amount of each call is subtracted from the account after its completion. Also, an account administrator can manually add or subtract funds to individual accounts. The inmate's access to the account may alternatively be controlled by the inmate's family. In this configuration, the inmate's family controls the inmate's funds and thereby controls the inmate's access to the account.

Since the site server logs data about each call, the invention is designed to provide reports, either in electric or hard copy form, utilizing specific data from the database. Therefore, a system administrator can track important statistics such as the net profit of the telephone management system during a certain time period. It is foreseeable that the software may incorporate extensive data processing services for providing a user a multitude of correlated dates.

In one embodiment of the invention, when a user attempts to access his or her account to place a call, the user may be requested, via voice prompts, to select a voice prompt language and enter a user-specific personal identification number. The information entered by the user is compared with information stored in the database for that specific user. If a corresponding PIN match is not achieved, a verification error may be provided and the system may request a re-entry of the PIN. It is foreseeable that if the second attempt fails to provide a match, the individual may be denied access to the telephone system and an official may be notified.

Once the inmate's identity is verified, the system may announce the inmate's call options and limitations. For example, the system may access a pre-recorded menu of limitations informing the inmate of specific restrictions, such as total telephone usage time, individual call length, and different payment options, such as collect call means or debit account means. The system may then connect to the desired called telephone number, provided that the number is on the accessible number list for that user. Furthermore, if any flags are indicated related to the called telephone number, then further system interrogation is carried out to determine whether to allow or block the calls.

The system may first prompt the person called to select a language for future voice prompts. The language selected may then be saved in the database. Then, the called party may be informed, via voice prompts or other like means, the identity of the calling party and location from where the calling party is located (e.g., John Doe from Peters State Penitentiary). The called party can accept or reject the caller through voice response, DTMF tones, or other like input means. If the called party provides a negative response (i.e., rejecting the call), the called party may select an option blocking calls from this caller, institution or similar calls in the future. The data may then be stored in a central calling party accessible number list database, and a flag or indicator may be included in a local accessible number list database. If the called party accepts the call, they may then be prompted to supply information specific to the called party (e.g., social security number, user name, date of birth, etc.). Additionally, the called party may be asked to provide a PIN to be used for future authentication. The information may be used to later identify the called party and verify permission for communication with the calling party. Alternatively, if the called party is on a pre-approved list and the called party telephone number is not flagged or does not contain indicators or previously blocked or restricted calls, the call may proceed without any voice prompts in a similar manner as a normal PSTN telephone call.

The current invention may also utilize other authentication means to provide access to the telephone management system. For example, biometric data may be required to access the system. Biometric data includes, but is not limited to, voiceprints, face architecture, signature architecture, fingerprints, retinal prints, hand geometry, and the infrared pattern of the face. Such data may be acquired from users either from prior supplication to biometric systems or from the acquisition of the data from the user upon the creation of a telephone account for use with the system. This data may be stored along with the user's PIN in the user's account profile or another storage means to be used later as an authentication device.

When a user attempts to access the telephone system at a later time, the user may hear a series of voice prompts directing the user to first supply a PIN and then supply the same form of biometric information that is stored in the database. For example, if the user's thumbprint was stored digitally in the database, the user would have to supply a thumbprint to a device capable of scanning it and converting the resulting data to the same format as the information in the database. The scanned data would then be compared to the information maintained in the storage database. If a positive match occurs based on the PIN and biometric data entered, then the user would be granted access to the system subject to user specific restrictions.

Biometric authentication means may also be implemented to authenticate the called party. In this type of system, the authentication may include one or more biometric authentication means in addition to non-biometric authentication means. In this embodiment, before the called party is allowed to converse with the caller, the called party may be asked to supply voice authentication and/or provide a PIN. This information may be stored in a database either prior to a user's first call or when the first call is made. If the data has been stored prior to the call, the called party would have to state the pre-recorded phrase. The recorded data would then be compared with information in the database If the data is in compliance with the information in the database to within some pre-assigned statistical threshold, the system would allow the call to proceed and a connection would be made. If the data had not been stored prior to the call, it would be retrieved from the called party and used for future voice authentication.

A further authentication means that may be utilized by the invention is the use of radio frequency ("RF") authentication. The user can be required to have in the user's possession some type of radio frequency identification technology to access the telephone system. This may be accomplished in a number of ways.

In another example of the invention, a debit card may also be used in conjunction with a PIN in the invention. At each terminal, the user may be instructed to scan a user-specific debit card into a debit card reader and enter a corresponding PIN in order to gain access to the system. Alternatively, a user may enter information related to a debit card in any of a number of known procedures followed by a PIN. This method of authentication may also be combined with biometric and/or RF identification means.

After a user is authenticated and a calling party is contacted, the invention provides for a number of monitoring and safety means that are active when a call is in progress. Call recording is a primary security means. Third-party call detection is another security feature that the invention may utilize.

The main objective of the invention is to provide a telephone call system including that effectively manages blocked or restricted calls placed by an institutional calling party.

Another objective of the invention is to provide a means of flagging certain called party telephone numbers based upon the called party's selections, and storing records containing flagged called party telephone number information in a first level called number list or database.

A further objective of the invention is to compare a called number to first level called number list or database, and further interrogating a second level called number list or database only when a flagged called party telephone number is encountered (i.e., attempted to be accessed by certain users).

A further objective of the invention is to check the second level called number list or database upon encountering a flagged called party telephone number in the first level called number list or database, and using data from the second level called number list or database to determine whether the call should be blocked or allowed.

An additional objective of the invention is to incorporate biometric verification, including voiceprints, face architecture, signature architecture, fingerprints, retinal prints, hand geometry, infrared pattern of the face, etc., with a debit card system.

Yet another objective of the invention is providing called parties with the option of rejecting the call and blocking similar calls in the future.

BRIEF DESCRIPTION OF THE DRAWINGS

A further understanding of the invention can be obtained by reference to the preferred embodiment and alternate embodiments set forth in the illustrations of the accompanying drawings. Although the illustrated embodiments are merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which:

FIG. 16 depicts a sample telephone location maintenance screen for use with software contained in the call management system of an embodiment of the invention.

FIG. 17 depicts a sample facility number control screen for use with software contained in the call management system of an embodiment of the invention.

FIG. 18 depicts a sample telephone number control screen for use with software contained in the call management system of an embodiment of the invention.

FIG. 19 depicts a sample default maintenance screen for use with software contained in the call management system of an embodiment of the invention.

FIG. 20 depicts a sample multiple telephone list update screen for use with software contained in the call management system of an embodiment of the invention.

FIG. 21 depicts a sample first level called party control screen for use with software contained in the call management system of an embodiment of the invention.

FIG. 22 depicts a sample calls in progress screen for use with software contained in the call management system of an embodiment of the invention.

FIG. 24 depicts a sample manual financial transaction screen for use with software contained in the call management system of an embodiment of the invention.

FIG. 26 depicts a sample user manager screen for use with software contained in the call management system of an embodiment of the invention.

FIG. 30 depicts a sample financial history screen for use with software contained in the call management system of an embodiment of the invention.

FIG. 31 depicts a sample call records screen for use with software contained in the call management system of an embodiment of the invention.

FIG. 33 depicts a sample call limit status screen for use with software contained in the call management system of an embodiment of the invention.

FIG. 38 depicts a sample query result screen for use with software contained in the call management system of an embodiment of the invention.

FIG. 40 depicts a sample account telephone number list report for use with software contained in the call management system of an embodiment of the invention.

DETAILED DESCRIPTION OF THE INVENTION

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of a preferred embodiment as well as alternate embodiments such as a simpler embodiment or more complex embodiments for alternate devices of the invention.

Figure 1:
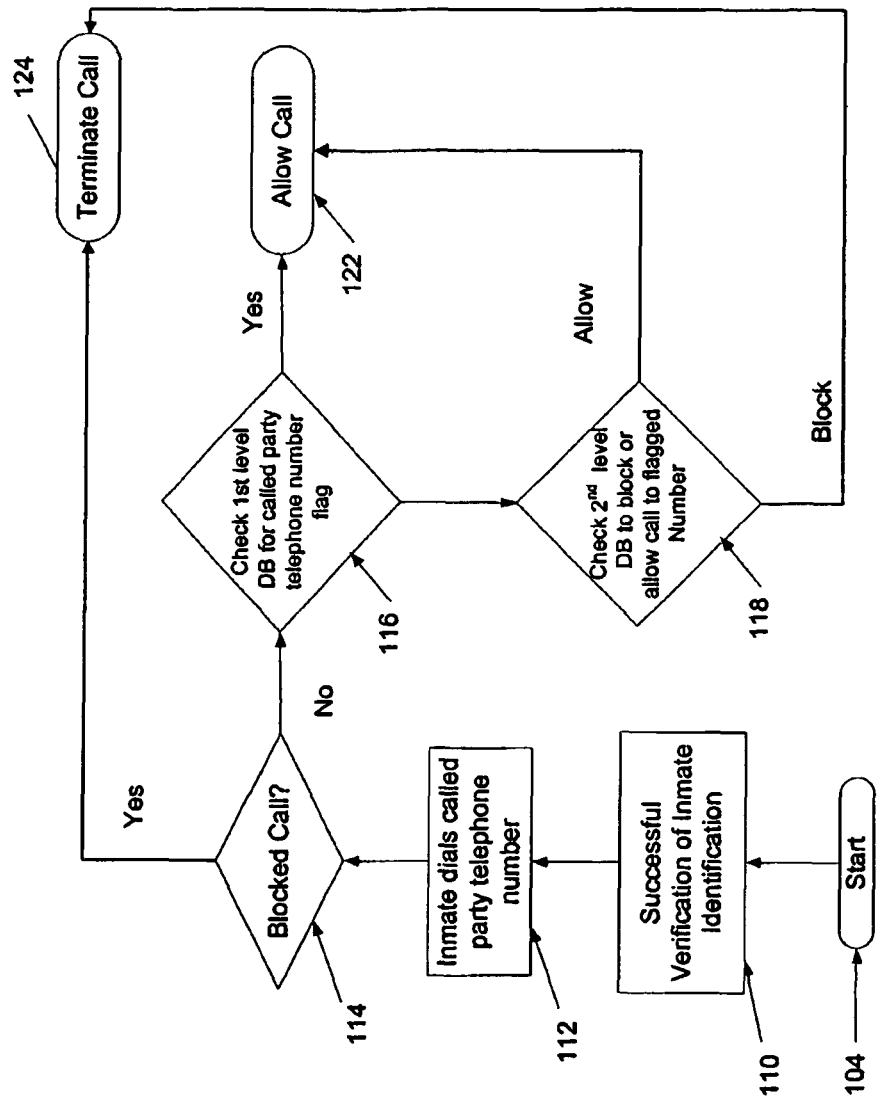
FIG. 1 depicts a generalized process flow diagram for placing a call including checking the called number at a list of telephone numbers having flags associated therewith, and if a flag associated with a called number, checking a central database prior to blocking the call.

Referring first to FIG. 1, a generalized process flow diagram for an inmate (or user, for instance, in a facility other than a correctional institution) placing a call is depicted and begins at step 104, where the called number is verified in multiple stages. Note that the inmate may first be required to enter certain identification information for verification, such as PIN numbers, biometric data, RF identification, or any combination including at least one of the foregoing, as discussed in greater detail. In addition, in the case of a direct call, financial data is verified to determine whether the user has sufficient funds to place a desired call. The verification of identity and financial information is described in greater detail herein.

If the identity and financial verification is successful as indicated at step 110, the inmate hears, for instance, a dial tone allowing them to dial a called party telephone number or alternatively, the inmate may be verbally prompted, for instance, to enter the digits of the desired called number, as indicated in step 112. Next, and as represented in step 114, the dialed number is optionally checked against a list of blocked numbers as specified by the particular facility (which will be described in more detail in FIG. 17), and/or against a list of blocked numbers as specified by system administrators of plural facilities (e.g., nationwide, statewide, or regional facilities) as will be described in more detail with respect to FIG. 18. If the number is on the list of blocked numbers as specified on a facility level or on a multi-facility level, then the call is terminated at step 124. Upon successful verification of the identity of the calling party (including identification of the calling party and verification of sufficient funds in the case of direct dial calls, and optionally upon determination that the called number is not on the list of blocked numbers as specified on a facility level or on a multi-facility level, the called number is checked against a list of flagged called party numbers in step 116. (such as called party numbers in the local user profile 354 that is stored in the local database 352 shown schematically and described further in FIG. 3). If there is no flag or other similar indicator associated with the called telephone number, the call is allowed in step 122. In this manner, called numbers that are not flagged proceed efficiently, obviating the need for further investigation, e.g., checking a database maintained at a central call management subsystem 370 as will be shown schematically with respect to FIG. 3, thereby minimizing network traffic. If there is a flag or other similar indicator associated with the called telephone number, then the flagged called number is checked in step 118 against a subsequent centrally maintained list (e.g., a database or list maintained at the central call management subsystem 370). At this stage, the called number is compared against a list of called numbers including blocks or restrictions associated therewith. Depending on the type of block or restriction, the call may be blocked and proceeds to step 124 to terminate the call or allowed in step 122, based on the data contained in a centrally maintained list or database. In the event that the call is blocked, special call treatment may be returned to the user, or the call may be directly terminated in step 124. Special call treatments can comprise voice prompts, busy signals, etc. For example, these special call treatments generally provide information concerning why the call could not be completed and processed.

In general, flagged telephone numbers that are described herein have special indicators because certain individuals (typically subject to previous calls from one or more inmates) indicated that future calls be blocked from an inmate. By way of example and referring now to FIG. 2, a process flow diagram is provided that schematically depicts a called party's options to block or restrict calls from a particular inmate. These called parties, for instance, may be on the personal list of the inmate, such as family members and friends. For instance, called parties who, at one point, willingly received calls from an inmate, may subsequently decide not to receive further calls from that inmate, or may desire to place other restrictions related to calls from the inmate or other potential calling parties.

The process begins in step 204 and proceeds to step 210 where a called party receives a call from a system user, such as an inmate in an ITAC system. Next, in step 212, the called party determines whether to accept the call. If the called party desires not to accept the call, then in step 214, the caller may decide whether to select further options to determine how future calls are to be handled. If no options are desired, then the process proceeds to step 216 where the called party may hang-up and the call is terminated in step 228. However, if the called party desires to select further options to determine how future calls are to be handles, then it proceeds to step 218 whereby the called party may be prompted to dial a certain series of digits (e.g., dialing "77" as shown). Next, in step 230, the called party may select call block or restriction options. These options may include, in some non-limiting examples, options such as whether to deny all future calls from the calling party; whether to deny all future calls from one or more other prospective calling parties; whether to deny all future calls from the institution, deny all future calls from any institution (e.g., within the control of the system 301 which will be shown and described in FIG. 3), or by transmitting requests to other institutions using systems other than system 301; whether to deny calls (from the particular calling party, from one or more additional prospective calling parties, the institution, and/or other institutions) during particular time periods (e.g., during certain hours of the day or days of the week as selected by the called party); whether to deny calls from one or more calling parties for a length of time (e.g., for a period of days, weeks, months, etc. as selected by the called party); or whether to deny calls within a given time frame after the most recent connected call (e.g., only allowing an inmate to call that called party a certain number of times per week, month, etc. as selected by the called party, or requiring a minimum period of time to pass as selected by the called party after a call is connected before a subsequent call may be placed). Any or all of these options may be presented to a called party to allow them control over whether or when they may receive calls from an inmate. After the called party has selected his or her desired options, the call is terminated in step 228.

However, in the event that a called party accepts the call from, in one example, an inmate in an ITAC system, the called party in step 220 may determine, in one non-limiting embodiment, whether to select future blocking or restriction options. If the called party decides to accept the call without selecting future blocking or restriction options, then in step 222, the called party may be prompted to dial a certain series of digits (e.g., dialing "55" as shown) and the called party is connected to the calling party in step 234 through an available trunk line as described in greater detail herein. Optionally, in step 224, the called party may desire to select future call blocking or restriction options and may be prompted to dial a certain series of digits (e.g., "77" as shown Next, in step 226, the called party may select call block or restriction options which are substantially similar to the options selected for block 230. For instance, a message prompt may be provided to the called party by the call system software stating "to request a block on all future calls to your number dial 7 now." Other similar prompts may be provided, for instance, to allow for other types of restrictions. A block or restriction notation is sent to the central server. In certain embodiments, depending, for instance, on the class of service, the central or local system may have the ability to prevent blocks or restrictions on certain types of numbers, for instance, those "approved" numbers (as described further herein with respect to FIG. 18). If the block is allowed, the central server may incorporate the number in the central database to block all future calls or take other appropriate restrictive action. Further, the central server sends instructions back to the local system to cause a flag to be placed on the number in the local site database. Accordingly, as described above, on every call from the local site system, the local site database is checked for called number flags, and if a flag is found a query is initiated from the local system to the central server. In certain embodiments, the central server may directly provide the determination as to whether to allow or block the call. In alternative embodiments, data is returned to the local system and the determination is made at the local system based upon the data in the central server. A block or restriction on a called number that has been set in the central server can only be modified at the central database. After the called party has selected his or her desired options, the called party is connected to the calling party in step 234 through an available trunk line as described in greater detail herein.

Figure 2:
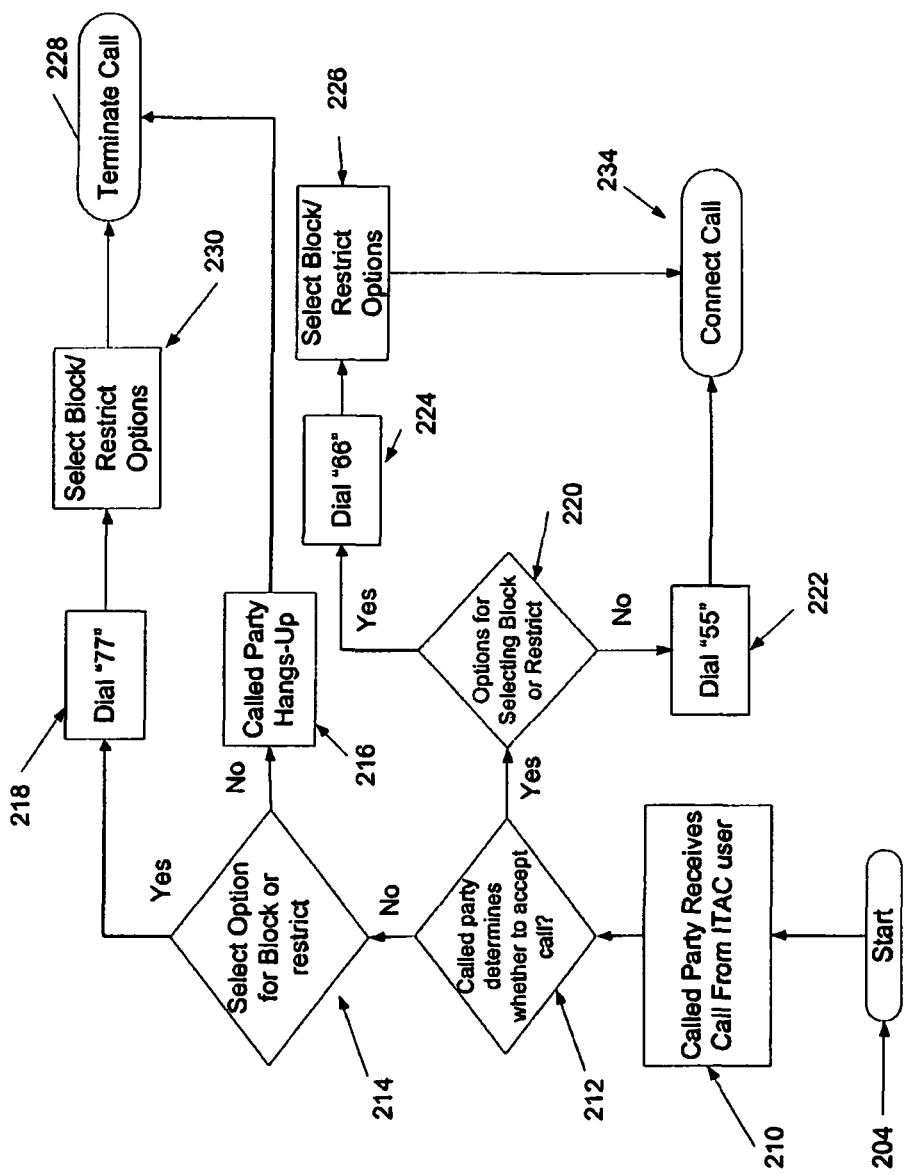
FIG. 2 depicts a generalized process flow diagram for a called party to block or restrict calls from certain individuals.

Although FIG. 2 shows that the options are selected before a call is connected in step 234, the options may be selected after the call is ended, for example, where the called party is guided by suitable voice prompts.

In the alternative, or in addition to telephonic options presented by the example of FIG. 2, an individual (i.e., called party) may control the block/restriction features by written request or by electronic request, such as over an Internet based subsystem or using electronic mail. This data is then stored in the central database 372 (described with respect to FIG. 3). In addition, flags are included in the database 352 (described with respect to FIG. 3) associated with the called number. In particular, the database 352 only stores the indicator (i.e., flag) and does not include details regarding the block or restriction. If a flag is associated with the called number, the system accesses the database 372 in order to obtain the information required to determine whether to block or allow the call. This facilitates control by individual called parties of their options, for instance, if the inmate is moved to another facility or location within a facility, without the need to reselect options.

Figure 3:
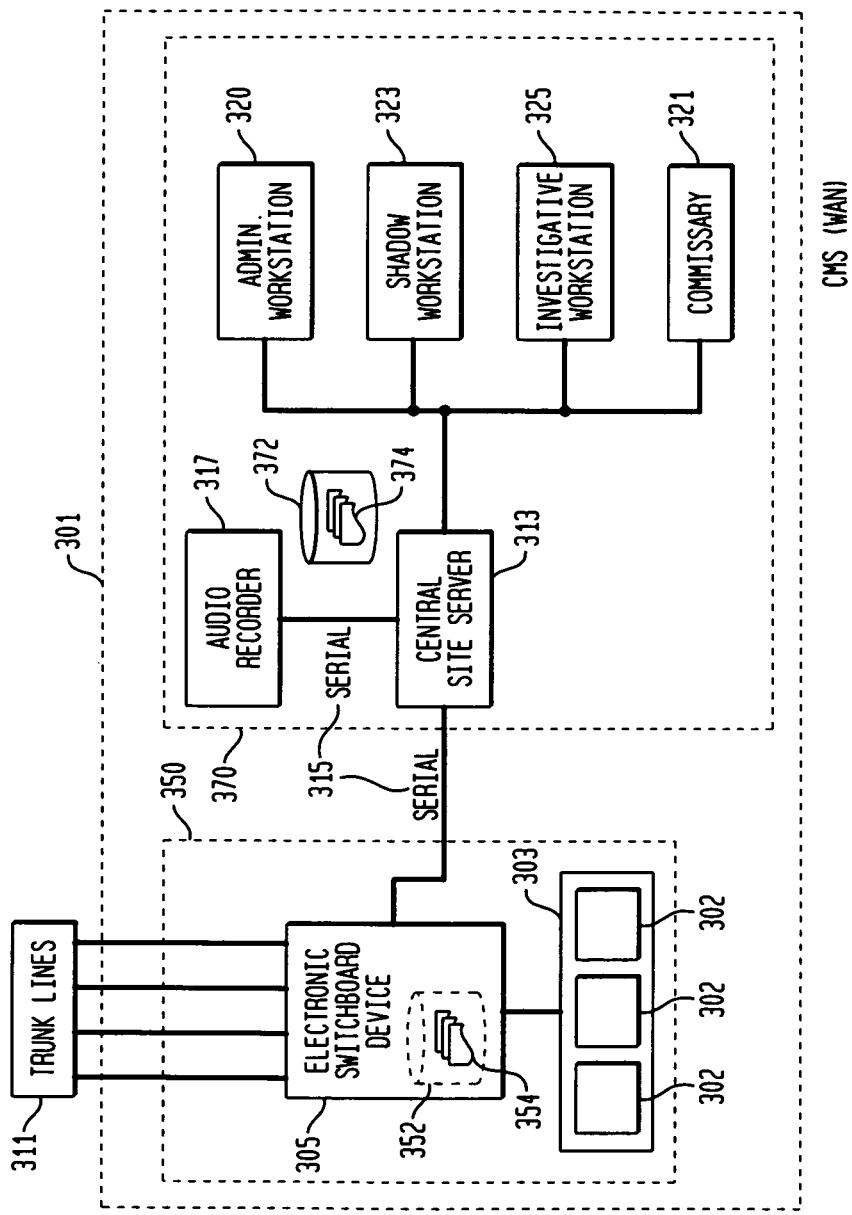
FIG. 3 depicts a schematic view of the call management system of the system configured to operate on a wide area network.

Referring now in detail to FIG. 3, shown is a call management system 301 configured to operate in a WAN (Wide Area Network) according to the invention. The call management system 301 includes a local call management subsystem 350, for instance, used within a particular facility or portion of a facility, which is in communication with a central call management subsystem 370. Call management subsystem 370 may also be in communication with other switchboards or local call management subsystems (which may be similar or identical to local call management subsystem 350). A plurality of user telephones 302, wherein the actual number of telephones depends on the desired capacity of the institution call system, are incorporated into a telephone bank 303 and are connected to an electronic switchboard device 305. Telephone bank 303 may be centrally located within a facility to allow for centralized monitoring. However, it is foreseeable that telephone bank 303 may be located at a multitude of locations internal or external to a facility to allow for efficient monitoring.

Electronic switchboard device 305 regulates calls and connects them to the proper outgoing trunk line 311 if the call is allowable as discussed with respect to FIG. 1. Trunk line 311 may consist of a multitude of connections to any number of local, long distance, or international telephone service providers. The number of trunk lines 311 depends on the outgoing capacity desired by the institution. In addition, trunk lines 311 may be analog, digital, or any other type of trunk lines not yet contemplated. Electronic switchboard device 305 further incorporates an integrated channel bank, allowing calls to be processed over either analog or digital trunks as required by the local call management subsystem 350 and/or the call management system 301. Specifically, when one trunk line 311 is occupied and handling an outgoing communication, electronic switchboard device 305 automatically accesses an alternate trunk line to handle the outgoing communication. If all trunk lines on the system are in use, the call may be routed to an alternate system (not depicted). For example, electronic switchboard device 305 may be interconnected to a multitude of switchboards to allow for expansion of the system to meet the capacity desired by the institution. A cross point switch integrated into electronic switchboard device 305 may also accomplish this routing.

Multiple processors may also be incorporated into the architecture. This allows call processing even after parallel component failure. The architecture also provides for a sharing of the load between processors, which eliminates system overload during extremely busy periods. The multiple processors enable the system to handle large volumes of calls at any time, and ensure system integration.

Electronic switchboard device 305 processes responses for action during a call and/or to store information or selections (e.g., for future call processing, or for monitoring activities). Called party telephone numbers are verified by electronic switchboard device 305 by querying a list of flagged called party numbers (as discussed with respect to block 118 of FIG. 1) in order to make a determination whether an indicator or flag is associated with that number, indicating that the called party desired to block or restrict calls from one or more callers. If there is a flag or indicator, then electronic switchboard device 305 queries the central call management subsystem 370 (as discussed with respect to block 120 of FIG. 1) to determine whether the call should be blocked or allowed. Additionally, electronic switchboard device 305 performs the voice prompts heard by the inmate and the recipient of the call allowing the parties to respond to the menu selections. Electronic switchboard device 305 tests outgoing trunk lines as calls are placed and digitizes telephone audio for recording and/or biometric voice identification purposes. If no dial tone is present, one of trunk lines 311 may be taken out of service for a pre-programmed amount of time for maintenance. These capabilities are pre-programmed into the device's firmware. However, it is foreseeable that software and software upgrades may provide these services in addition to other services useful in the invention.

A central site server 313, which is part of a central call management subsystem 370, interfaces within the telephone call system 301 to the local call management subsystem 350 via a first serial port 315. In one embodiment, an RS-232 serial port is employed for the interference connection. However, it is foreseeable that other types of serial ports 315 commonly known in the art may be utilized. Serial port 315 may also be comprised of a direct hardware connection or may consist of a series of ports and connecting means commonly known in the art for connecting electronic devices. Serial port 315 is designed to allow firmware driven systems, such as electronic switchboard device 305, to interface with software-based systems, such as a PC designed system operating as a site server. All inmate and call information collected by local call management subsystem 350 (and in certain embodiments a plurality of subsystems similar to local call management subsystem 350) is routed through central site server 313. At central site server 313, user call information is digitized for efficient data transfer and efficient record keeping. Central site server 313 stores at least each user's flagged called party data (for instance, in an integrated or accessible database 372). The central user profile database 372 may be within the central site server 313, or may be in maintained elsewhere and connected with the central site server 313, e.g., over a LAN.

It is preferred that central site server 313 also stores the digitized audio used for voice prompts as well as each user's financial transaction data, call limitations, PIN, etc. However, depending on the memory requirements, numerous site servers may be employed. It is foreseeable that older archived data may also be stored on an integral or a remote computer system database (not shown) or kept on additional storage devices on the central site server 313.

Connected to central site server 313 via one of serial ports 315 is audio recorder 317. In the preferred embodiment of the invention, an RS-232 serial port is employed for the interference connection. However, it is foreseeable that other types of serial ports 315 commonly known in the art may be utilized. Serial port 315 may also be comprised of a direct hardware connection or may consist of a series of ports and connecting means commonly known in the art for connecting electronic devices. Audio recorder 317 may either be a stand-alone unit or incorporated into the hardware of central site server 313, or incorporated into other hardware devices within the system. Audio recorder 317 is digital, may be or another known type of recording devices, as well as those not yet contemplated. Audio recorder 317 records the conversations performed under the direction of telephone call management system 301. Audio recorder 317 may be activated for each call unless the number being called is specifically noted for no recording or monitoring, such as calls to or from an attorney. Furthermore, audio recorder 317 can monitor multiple telephone lines simultaneously, using a different recorder channel number for each of trunk lines 311. The recorder channel number further enables the institution's staff to identify the call record they wish to review associated with a desired outgoing telephone call. Each user telephone 302 is further associated with a station identification number which allows the staff of the institution to identify the particular user telephone 302 a call was initiated and conducted from. It is foreseeable that the embodiment described herein supports up to 32 inmate telephone stations 303 and 24 trunk lines 311. However, multiple units 305 may be included in a local call management subsystem 350, each connected to the central site server 313 and configured to expand the system to meet the capacity demand for the institution.

Certain types of call recording that may be utilized by the invention are described herein. However, numerous other call recording systems in accordance with the concepts and objectives of the invention may be incorporated.

In a first call recording protocol, by default, all calls are logged and recorded unless it is specified in a user's contact file (e.g., calls to an attorney). When a user places a call, the called number is compared with a user contact file to determine whether the call to that particular called number may or may not be recorded. It is foreseeable that calls may be archived on a site server or other database storage means for future reference.

A second type of call recording implemented is referred to as passive recording. This type of recording may utilize voice recognition software to listen for certain key words or phrases in a conversation. If a key word is uttered, the system records the rest of the call and alerts the system administrator, proper authorities, or implements other security procedures. For example, in a penitentiary, if the word "drugs" is used in a conversation, the system may be activated thereby recording the remainder of the conversation.

Another type of call recording that may be utilized in the invention involves an operator scan of a user conversation. In response to a noted conversation, the operator may have the discretion to selectively record the conversation. For example, using the same software used to administrate accounts, an operator can selectively listen in on user conversations and record suspicious conversations for future reference.

Within the central call management subsystem 370, central site server 313 is controlled by software associated with administrative workstation 320. In the certain embodiments, administrative workstation 320 is connected to central site server 313 via a local area network (LAN). However, it is foreseeable that other types of electronic connections may be employed. The administrative workstation's 320 software can add or modify blocked called party data for individual users in addition to call limitations and all telecommunication activity of the institution. This blocked called party data may include, for instance, blocked numbers as specified by the particular facility (e.g., as shown with respect to FIG. 17), or blocked numbers as specified by system administrators of plural facilities (e.g., nationwide, statewide, or regional) as shown with respect to FIG. 18. In further embodiments, the administrative workstation's 320 software can add or modify flagged called party data, for instance, based upon instructions from a called party.

Additionally, the administrative workstation's 320 software can also track a user's commissary information, such as the account balance if a debit system is being used. Furthermore, depending on the needs of an institution, the database may perform other functions.

The central call management subsystem 370 also includes a commissary workstation 321 is used in conjunction with administrative workstation 320 to manage and record a user's financial transactions. In the preferred embodiment, commissary workstation 321 and administrative workstation 320 are connected to central site server 313 via a LAN. However, other known connections, or connections not yet contemplated may be utilized. Commissary workstation 321 can also record other financial information, such as the total amount spent on collect calls by each inmate, amount spent on debit calls, the total net financial transactions for each user, etc.

Shadow workstation 323 and investigative workstation 325 are also employed in the present embodiment of the system 301 and the central call management subsystem 370. Shadow workstation 323 and investigative workstation 325 are connected via the local area network linked to central site server 313 in the present embodiment. Shadow workstation 323 utilizes a live operator to monitor telephone calls without detection. It is foreseeable that this function may be performed by software integrated with shadow workstation 323. The shadow workstation 323 software provides a means for patching into a call using circuitry without alerting the user or called party to the operator's presence. If the operator finds that a call being monitored is suspicious, the operator may manually (or by using software) activate the audio recorder 317 to record a portion of an active telephone call. The called party's number may also be notes with instructions or an indicator in the inmate's profile (stored on administrative workstation 320 or central site server 313) to provide future monitoring of calls from the specific user to the specific called party.

The central call management subsystem 370 further collects data from parties that place certain restrictions or outright call blocks to specified called numbers. In the event that a called party decides to restrict calls from an inmate, that called party's number may be blocked or restricted in the inmate's profile (stored in a central database 372, which may be connected to or included in the central site server 313) to prevent or restrict calls from the specific user to the specific called party. If a called number is blocked or restricted in the central database 372, the called number is noted with a flag or other indicator at the local level (e.g., local database 352). A caller may enter their identify (e.g, verified with PIN or biometric data) and enter one or more called numbers, such as one's home telephone number, work telephone number and/or mobile telephone number.

Alternatively, software located on central site server 313 or investigative workstation 325 may be used to passively monitor calls. For example, when certain key words or phrases are spoken, voice recognition software may activate audio recorder 317 via electronic means and alert the proper authorities that a violation has occurred.

Furthermore, investigative workstation 325 controls other monitoring and security features interfaced in call system. For example, investigative workstation 325 can be used to access past conversations stored on audio recorder 317. Software on investigative workstation 325 may also be configured to detect if a third party is present during a user's conversation. Investigative workstation 325 or central site server 313 may also contain voice recognition software to aid in calling or called party voice authentication. Administrative workstation 320, shadow workstation 323, investigative workstation 325, and commissary workstation 321 may alternatively be combined into one or several units. Furthermore, administrative workstation 320, shadow workstation 323, investigative workstation 325, and commissary workstation 321 may be integral within the central site server. It is also foreseeable that any component may be alternately located off site from the other apparati of the invention.

Figure 4:
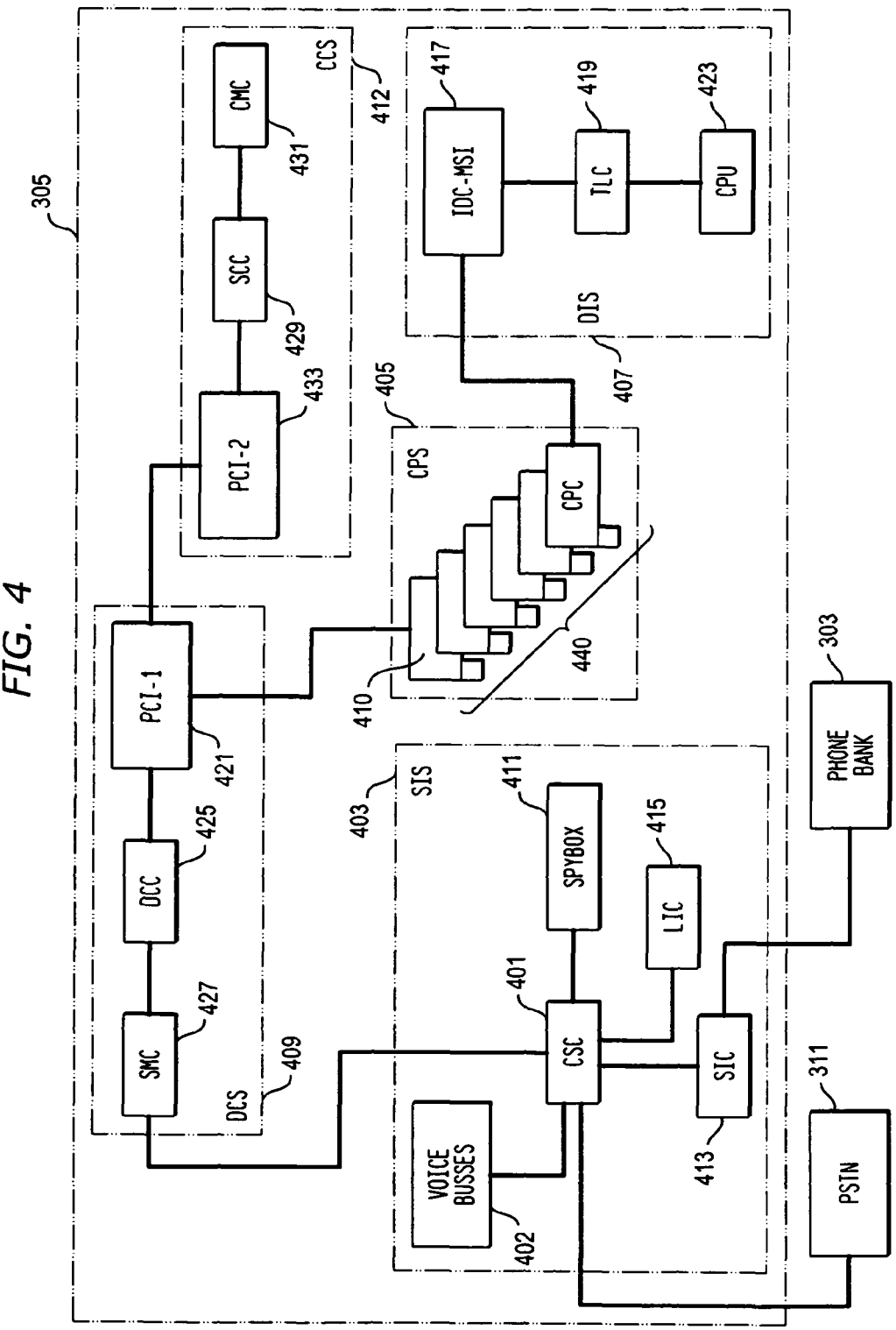
FIG. 4 depicts a schematic view of the call management system's hardware, specifically directed to the central electronic switchboard device wherein a single electronic switchboard device is utilized.

Referring next to FIG. 4, shown is an internal hardware diagram of electronic switchboard device 305 of the preferred embodiment of the telephone call management system depicted in FIG. 3. Stations equipped by electronic switchboard device 305 can access all trunk lines 311 accessed by electronic switchboard device 305 through a public switched telephone network (PSTN). Connections between trunk lines 311 and electronic switchboard 305 are supported by crosspoint-switch matrix card (CSC) 401 in each unit and a set of associated unit-to-unit voice busses 402.

In the present embodiment of the call system, a series of bilingual voice prompts are provided. These voice prompts guide the user through placing a call through the telephone call management system. Pre-recorded voice prompts instruct the user how to place the call and announce the call to the called party, providing identification of caller and location of call. These voice prompts may be digitally produced and presented in a concatenated form as is presently known in the art or other common form in the art. The voice prompts may be pre-recorded by the institution and retained in an integrated or remote database, or may be recorded in any form as is known in the art. Furthermore, these voice prompts can be played in the language specified by the user's profile, the language specified by the institution, or in a multitude of languages.

In order to operate the telephone call management system and place a telephone call, the user may be required to enter a PIN. The PIN is validated and allows the call system to access a user index or a discreet user telephone account file. These files contain lists of valid telephone services and types of screening used for that specific user. The information may be displayed to a user via an associated display means, may be electronically provided via a verbal call prompt or may be hidden from the user. During the user's initial call, a voice prompt (e.g., "At the tone please state your name") is used to pre-record the user's name. The user's name is recorded for playback to the called party during the calling process. This information is also stored on the central site server, for instance, in a central user profile database 372 (shown with respect to FIG. 3), or alternate storage device.

Figure 5:
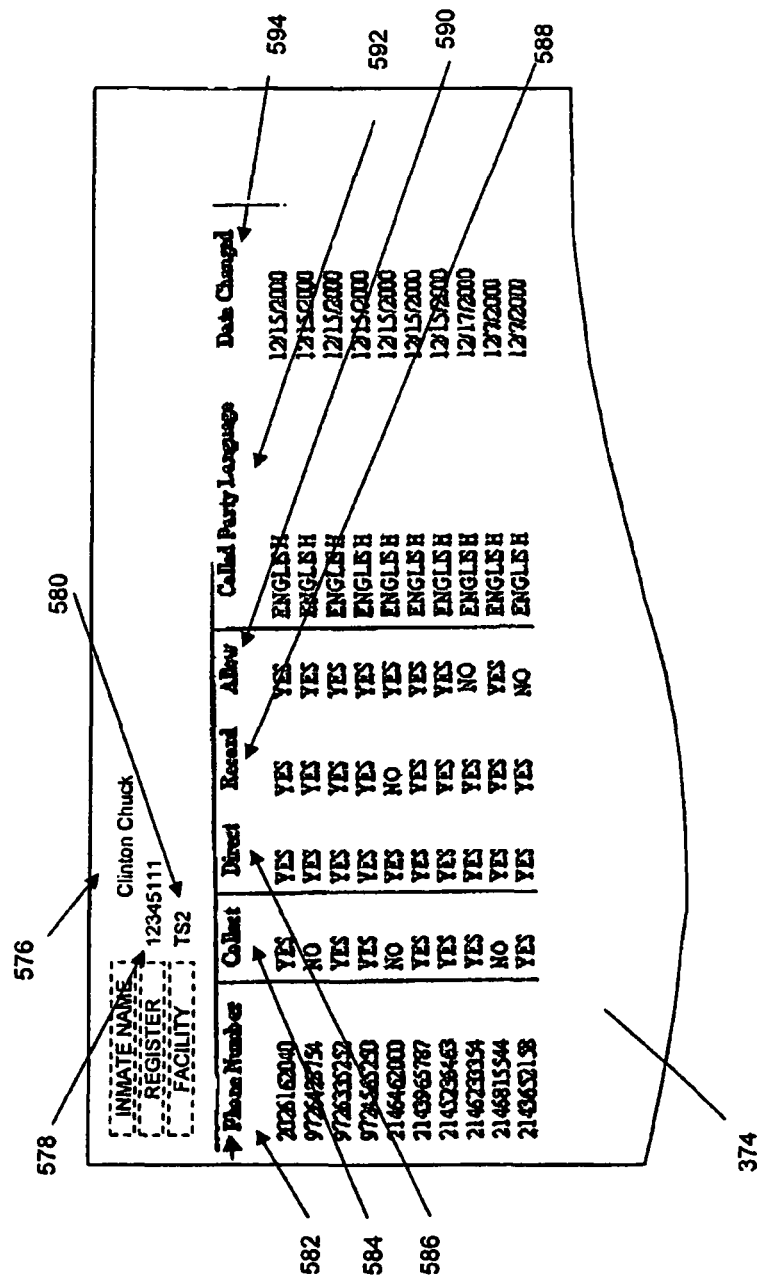
FIG. 5 depicts a sample data record stored at a central user database.

Next, in certain optional embodiments, a user is prompted to enter biometric information (e.g., verbal, thumbprint, retinal scan) to be retained by the call system for future authorization. After a user provides the necessary verification information, a central user profile can be established, which may include data regarding restricted call numbers, amount stored in a debit account, call time limitations, and other such information. In an embodiment shown in FIG. 5, a sample record of a central user profile 374 (e.g., stored in central database 372 shown schematically in FIG. 3) may include a listing of allowed called party numbers (indicated with a "YES" in the ALLOW column 590) and blocked called party numbers (indicated with a "NO" in the ALLOW column 590). In particular, central user profile 374 includes an inmate name field 576, register number field 578 which displays the unique eight-character number associated with each user authorized under the call management system to place outbound telephone calls, and facility block 580 indicating the facility of the user. Additional fields or columns are also provided. While central user profile 374 is shown as in tabular view, individual called numbers may also be viewed or edited in a form based view, for instance, wherein each column as shown in FIG. 5 is a field in a form associated with the called party and/or the user. The central user profile 374 includes the called party telephone number 582, which may be based on a user's personal list (a list of numbers that the inmate is authorized to connect to). Further, the central user profile 374 includes the permission field 590 indicating whether calls are allowed to the called party telephone number. A called party telephone number is on a user's personal list may subsequently be blocked, for example, as described herein with respect to FIG. 2.

The central user profile 374 also may contain a collect call field 584 indicating whether collect calls are allowed to the called party telephone number, a direct call field 586 indicating whether direct calls are allowed to the called party telephone number, and a record field 588 indicating whether calls to the called party telephone number are to be recorded (e.g., where exceptions exist for conversations between an inmate and an attorney). In addition, the central user profile 374 may include a called party language field 592 indicating the called party language (e.g., to determine the language of voice prompts or messages to a called party), and a date changed field 594 indicating the date that information associated with a called party telephone number was most recently updated.

Figure 6:
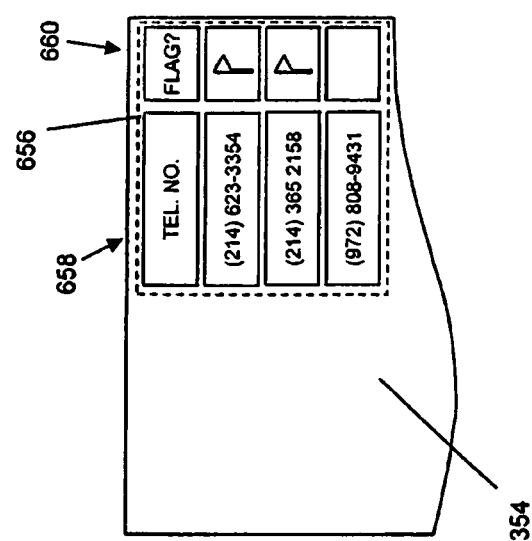
FIG. 6 depicts a sample data record stored at a local call management subsystem depicted including a list of numbers that a user may be allowed to call, with associated flags that indicate that the number is blocked centrally.

In addition, referring to FIG. 6, a local user profile 654 may be created and stored (in local database 352 shown schematically in FIG. 3), which contains a listing 656 containing called party telephone numbers 658 with indicators 660, such as flags, associated with at least certain of the called party telephone numbers. Local database 352 may be stored within the electronic switchboard device 305. However, local database 352 may alternatively, or in combination, be stored within the local call management subsystem 350 and external to the electronic switchboard device 305, for instance, associated with plural switchboards 305, while still performing the basic functions described herein.

Accordingly, and referring back to FIG. 3, the local call management subsystem 350 does not block calls without interrogation of the central site server 313 (as described herein with respect to FIG. 1), including the central user database 372. This allows for efficient call processing, as network congestion is minimized because requests for information and associated responses, related to called number blocks, restrictions or other rules, that occurs between local call management subsystem 350 and central site server 313 are limited to situations when a user or inmate attempts to call a flagged telephone number.

The user's transmission receipt paths can be controlled during the call processing, thus providing control of the user's communications with interactive call progress prompts and responses, network call progress information and tones and the called party during call announcement and acceptance. For example, after the call is outpulsed to the public switched telephone network (PSTN), the user can listen to normal network provided tones, announcements, call answer, and caller acceptance. Before the call is outpulsed to the public switched telephone network (PSTN), local data is checked to ensure that there is no flag or indicator associated with the prospective called number. In the event that the user attempts to reach a party with a telephone number having an indicator associated therewith, such as a flag associated with a block or restriction related to calls to the telephone number, the local call management subsystem 350 accesses the central site server 313 prior to proceeding with the call. The call is connected if the call restrictions do not apply (e.g., if the call restrictions are based upon certain times of the day). The call is prevented and the calling party's connection with the system is disconnected or otherwise terminated if the block or restriction applies.

Multiple trunk lines 311 are supported by electronic switchboard device 305. In addition, different routing to the PSTN may be assigned across multiple trunk groups. Use of multiple trunk groups may be required or preferred due to lower network access charges, routing facilities and usage costs, (i.e. local, international, long distance debit, long distance collect, etc.).

In addition, electronic switchboard device 305 can provide digit analysis based on dialed number identification system ("DNIS"), other dialed digits, etc., and can route a call via the appropriate trunk lines 311. Trunk lines 311 may interface the network on direct digital T1 circuits, analog circuits, or other like network interfaces. During the call routing process, if trunk lines 311 in the primary trunk group are all occupied, a variation of call treatments may be implemented. For example, the call may be routed to a secondary trunk group, a voice message may be played, a congestion busy signal may be provided, etc.

Furthermore, in the event that a dialed number is a number having an indicator, access to a central database 372 is selectively provided. In this manner, the particular restrictions related to a potential dialed number or called party may be centrally stored and maintained (e.g., updated as to content and/or format). This allows the central database 372 to be accessed by more than one local call management system 350 identical or similar to call management subsystem 350.

Referring back to FIG. 4, The distributed architecture of the hardware and associated software of the electronic switchboard device 305 comprises Station Interface Subsystem (SIS) 403, Call Processing Subsystem (CPS) 405, Digital Interface Subsystem (DIS) 407, Data Communication Subsystem (DCS) 409, and Concentrator Communication Subsystem (CCS) 412.

Station interface subsystem (SIS) 403 provides switched connections to call processing subsystem (CPS) 405. CPS 405 controls digit collection, interactive voice prompts, call screening, network access, etc., during the inmate calling process.

SIS 403 generally contains four main components including SIC (Station Interface Card) 413 which provides power to all telephones, CSC (Cross-Point Switch) 401 which routes telephone calls from telephone bank 303 to the proper outgoing trunk line 311, LIC (Line Interface Card) 415 which converts analog telephone signals to a format compatible with the call management system, and Spybox 411 which is used for audio monitoring of user telephone calls. The basic function of SIS 403 is to detect and process off/on-hook call service requests from the telephones located at inmate telephone bank 303. SIS 403 also connects the line to an available call processor card (CPC) 410 port for processing the inmate call. In addition, SIS 403 provides switched audio connections to Spybox 411.

The originating user off-hook requires connecting SIC 413 voice paths via CSC 401 to line interface card (LIC) 415. Voice path connections are switched and controlled by CSC 401. The selected LIC 415 outbound port connects the line to CPC port 410 for processing the call. A dial tone or other suitable signal may be provided to the inmate when CPC 410 is connected and ready for the inmate to enter digits.

Call processing system (CPS) 405 controls all routing and subsystem interaction processes required by the call management system. CPS 405 contains one or more CPCs 410 which provide voice prompts to users and receives and record DTMF and voice responses.

Station voice paths switched through the SIS subsystem 403 are connected to CPC 410. In the present embodiment, CPCs 410 have four ports per card. However, additional ports per card may be utilized in accordance with the objectives of the invention. For example, in the preferred embodiment, CPS 405 can accommodate up to six CPCs per call system unit allowing each electronic switchboard device to support up to twenty-four call processing ports.

CPS 405 can accommodate multiple CPCs 410 which allows for system redundancy and system availability. Real-time call processing loads are distributed across the number of configured CPCs 410. In the preferred embodiment, the subsystem is configured with a minimum of two CPCs 410 per electronic switchboard device. For example, it is preferred that a minimum of two CPCs 410 are utilized as a fault protection. If one CPC fails, call processing would continue on the other active CPCs 410.

CPCs 410 support the specialized call processing features and controls required for an institution telephone service. When a user originated call is connected to CPC 410, a dial tone is returned to the user. The dial tone indicates that the call system is ready for the caller to enter digits. During the call process, CPC 410 interacts between other subsystems (including other sub-subsystems within the local call management subsystem 350 and the central site server 313) and the call, thereby supporting the necessary system call sequence control and prompts for completing (or denying) the call.

CPCs 410 collect dial tone multi-frequency (DTMF) digit information, or like information, entered by the user and provides pre-recorded voice prompts stored in system memory card (SMC) 427 delivered to the user via an audio record/playback buss. CPCs 410 connect the audio/record playback to the user telephone. Interactive voice prompts instruct the user to enter a series of identification and/or authentication information. For example, a user may be required to provide voice information for authentication or recording, DTMF information responses such as a PIN, biometric information for authentication, or provide RF data. Prompt responses are detected and recorded via CPCs 410. Biometric responses may be recorded via separate hardware in the call system using a voice buss that couples to the DIS. Voice responses are played on the audio record/playback buss to SMC 427 for processing. Processed voice signals are digitized and stored in memory (not shown).

CPS 405 (e.g. via CPCs 410), can also interact with the local database 352 and the central database 372. For instance, after a user enters the called number, the local database 352 is checked to determine if a flag or indicator is associated with called party telephone numbers. If so, then the central database 372 is queried to determine how to handle the call. If a call is not allowed, then a special call treatment may be returned to the user, or the call may be directly terminated. Special call treatments can comprise voice prompts, busy signals, etc. For example, these special call treatments generally provide information concerning why the call could not be completed and processed.

In certain embodiments, the processing subsystems within the central site server 313 determine the appropriate action and present denial or allowance of a call, without further details. In other embodiments, the processing subsystems within the central site server 313 determine the appropriate action and either allow the call or present a specific reason for denial. In still further embodiments, the CPS 405 can interact with the database 372 (e.g., though concentration communication subsystem (CCS) 412) and determine the appropriate action. For instance, a call may be allowed if cross referencing the flag with database 372 indicates that the block is outdated, or that a restriction does not apply (e.g., restriction criteria such as time of day or duration between calls to that called number are not satisfied).

Once the originating call is processed and approved, CPC 410 will either connect the call to its associated network trunk lines 311 and outpulse the call or otherwise be released from the call so that the call can be connected by SIS 403 to an alternate CPC 410 for outpulsing the call. If the user's call is not approved, for instance, due a blocked or restricted called number as determined upon query of database 372 at the central call management subsystem 370 (after, lack of funds, unauthorized biometric data, etc., a special call treatment may be returned to the user.

When the call is outpulsed and answered, CPC 410 provides called party prompts to announce the call, which may include asking the calling and called party for voice verification. The called party may also have to enter a PIN to be authenticated. CPC 410 may also control the voice prompts and connect responses related to the options related to future call handling, such as described with respect to FIG. 3. Call connections are monitored by the CPC 410 for the duration of the call. This allows CPC 410 to detect answer, call acceptance, switch-hook flashes, disconnect and provide other supervisory signals. SMDR data (or other like call record information) is collected by CPC 410 and buffered in SMC 427.

The CPC hardware is laid out on a PC board design that supports two plug in daughter boards. The main PC board is identified as the line card. The larger daughter board is identified as the line card extension board. The smaller board of the two is identified as the CLICK board.

Digital interface subsystem (DIS) 407 converts analog voice information to a digital format. Integrated analog/digital conversion card (IDC-MSI) 417 handles analog to digital (A/D) conversion for the telephone call management system. Digital T1 interface card TLC 419 routes calls to CPU 423. CPU 423 contains software which controls user access to the telephone call management system. Furthermore, CPU can be capable of processing any other data as may be required within the system.

Digital interface subsystem (DIS) 407 provides an integrated digital T1 network interface capability for the call system. DIS 407 interfaces call processing system (CPS) 405 lines/trunk ports. DIS 407 formats the digital voice signals into a 24 channel digital T1 interface. In addition, DIS 407 processes user inquiries and performs account update transactions via the LAN. DIS 407 can include an integrated analog/digital conversion card (IDC-MSI) 417, digital T1 interface card (TLC) 419, PCM extension buss (PEB) 421, and a digital subsystem CPU controller card (CPU) 423.

The integrated analog/digital conversion card (IDC-MSI) 417 is a commercial design commonly employed in the art. The design is a proven technology and is utilized in a large number of switching applications.

This design is based on a Dialogic® modular station interface (MSI) board or other similarly designed boards. A PC-AT form factor board was developed by Dialogic® to support integrated digital switching functions. The board is compatible with PCM extension buss (PEB) 421 based designs. Furthermore, the board is compatible with the North American (1.544 Mb/s transmission rate, u-law PCM coding) and European (2.048 Mb/s transmission rate, A-law PCM coding) digital interface standards.

The Dialogic® MSI board consists of a motherboard that can accommodate up to six base modules or two add-on modules. The six-module version supports four analog port interfaces per module. The two add-on module version supports twelve analog port interfaces per module. Each version fully configured supports up to 24 inbound analog ports. These analog ports are connected to distribution blocks for grading to the CPC's line-side interface ports. The CPC and IDC blocks are used for cross-connection the CPC ports 440 to the IDC ports.

Data Communication Subsystem (DCS) 409 controls data communications between multiple call management systems. DCS 409 contains data communication card (DCC) 425, system memory card (SMC) 427, and PC Interconnect Card (PCI-1) 421.

Multiple unit systems require communications between units. This is supported by equipping one of the units with a communications concentrator subsystem (CCS) 412. CCS 412 contains system concentrator communication card (SCC) 429, concentrator memory card (CMC) 431, and a second PC interconnect card (PCI-2) 433.

Completed calls to trunk lines 311 require that caller identification and instructions be provided to the called party. A variety of programmed voice prompts can be used to announce the call and to instruct the called party. Typical voice prompts include information regarding where the call originated from, the type of call (i.e., collect/prepaid), how to accept or decline the call, how to deny future calls from the same caller, etc. For example, if the user (John Doe) places a collect call, the message "You have a collect call from John Doe. Dial—55—to accept the call or hang-up to decline the call," may be played. If the called party enters positive acceptance, the caller is provided a transmission path. If the called party enters negative acceptance, the call is denied to the caller. Call denial may be disconnection, or may include a voice message, busy signal, or other signal.

Furthermore, the called party is provided further options, as described with respect to FIG. 3. For example, if the user (John Doe) places a direct call, the message "You have a call from John Doe. Dial—55—to accept the call, hang-up to decline the call, or dial—77—to decline the call and select further options," may be played. These further options related to called party telephone number blocks or restrictions may include, but are not limited to, one or more of: determinations as to whether to deny all future calls from the calling party; whether to deny all future calls from one or more other prospective calling parties; whether to deny all future calls from the institution, deny all future calls from any institution (e.g., within the control of the system 301, or by transmitting requests to other institutions using systems other than system 301); whether to deny calls (from the calling party, one or more other calling parties, the institution, and/or other institutions) during particular time periods (e.g., during certain hours of the day or days of the week as selected by the called party); whether to deny calls for a length of time (e.g., for a period of days, weeks, months, etc. as selected by the called party); or whether to deny calls within a given time frame after the most recent connected call (e.g., only allowing an inmate to call that called party a certain number of times per week, month, etc. as selected by the called party, or requiring a minimum period of time to pass as selected by the called party after a call is connected before a subsequent call may be placed). Any or all of these options may be presented to a called party to allow them control over whether or when they may receive calls from an inmate. In certain embodiments, a called party may be required to enter a PIN for authentication prior to changing a selection of blocking or unblocking calls, or changing other restrictions. In other embodiments, one or more of these features may be controlled by a called party by written request or by electronic request, such as over an internet-based subsystem or using electronic mail, with proper authentication measures. This data is then stored in the central database 372. In addition, flags are included in the database 352 associated with the called number. In particular, the database 352 only stores the indicator (i.e., flag) and does not include details regarding the block or restriction. If a flag is associated with the called number, the system accesses the database 372 in order to obtain the information required to determine whether to block or allow the call, or for the determination itself.

Third-party call detection is another security feature that the invention may utilize. The system software may have the ability to detect whether a third party is connected upon the origination of the call. If a third line is detected, but not authorized, the software will end the communication and notify the authorities that such an event has occurred. The telephone management system may also include a feature that terminates the telephone call if more then a certain number of individuals are included in the conversation. It is foreseeable that this may be accomplished by voice recognition means.

Another type of third-party call detection involves the detection of hook-flash events. A hook-flash event occurs when a user hangs up the telephone for only a brief instant during a telephone call, just long enough to not disconnect the line. This is usually characteristic of a switch between lines on call waiting or to initiate a three-way conference call. Throughout the duration of the call, the system monitors the called party line for switch hook flashes. Detection of these flashes may indicate potential three-way calling/conference feature activation by the called party. If a hook flash is detected, the system may be programmed to limit the call to a certain time duration, to play a warning tone or play an announcement to both parties thirty seconds prior to disconnect, to terminate the call, and/or alert the authorities. This feature of the system prevents unauthorized third parties from taking part in telephone conversations.

In addition, design features prevent the user from reaching live operators or the ability to chain dial. Each call process requires that a specific disconnect duration to the network is completed. New call attempts are forced through a rigid call state sequence and screening, which includes a number of authentication means such as a PIN, biometric information, and/or RF authentication.

An additional security means that may be incorporated in the invention is the locking of the telephone keypad after a connection is made. This prevents the caller from possibly dialing out to a third party that has not been approved after a pre-approved connection has been made. Alternatively, the system may allow the user to press a pre-determined number of keys after a connection has been made. This allows an authorized user to access an automated service and enter menu selection keys.

The human voice has the capability of creating DTMF tones also. In order to differentiate tones created by a user's voice from tones created by the telephone keypad, the invention incorporates software which monitors the frequency of DTMF tones. Such software is capable of determining the source of the DTMF tones.

A number of features are provided to aid in call screening. Each user profile may contain a list of telephone numbers to which calls may be placed. Certain exchanges or prefixes, such as 1-800, may also be blocked. Other options, such as the number of calls allowed, call minutes allowed, or limitation to specific forms of call payment may be specified.

Concentration communication subsystem (CCS) 412 is responsible for supporting communications between the call system units and to the servers. CCS 412 includes a system concentrator communication card (SCC) 429, a concentrator memory card (CMC) 431, and a second PC interconnect card (PCI-2) 433.

CCS 412 is configured using the same basic hardware cards as utilized in the data communication card system. However, each memory card is independent and operates under different software systems.

Call detail records (CDRs) collected in the CPCs 410 are typically communicated to DCS 409 over the CPC COM port disposed within call processing system (CPS) 405. The CDRs are then buffered in SMC 427. The CDRs may also be transmitted to CCS 412 and buffered in CMC 431. CMC 431 may act as an interim backup for the CDR records. When requested, the buffered CDR's are also transmitted via CCS 412 to the server(s).

Each CDR transmitted and acknowledged by the server is acknowledged by the memory cards. Servers use a polling method during low traffic periods to upload CDRs from the memory cards. During the next polling sequence, only the CDRs that have not been acknowledged are transmitted to update the server CDR database. Basically, CDRs may at one point be buffered in a DCS memory card (SMC 427), a CCS memory card (CMC 431), or a server database (located in central site server (313 from FIG. 3). This capability enhances CDR reliability and recovery.

Figure 7:
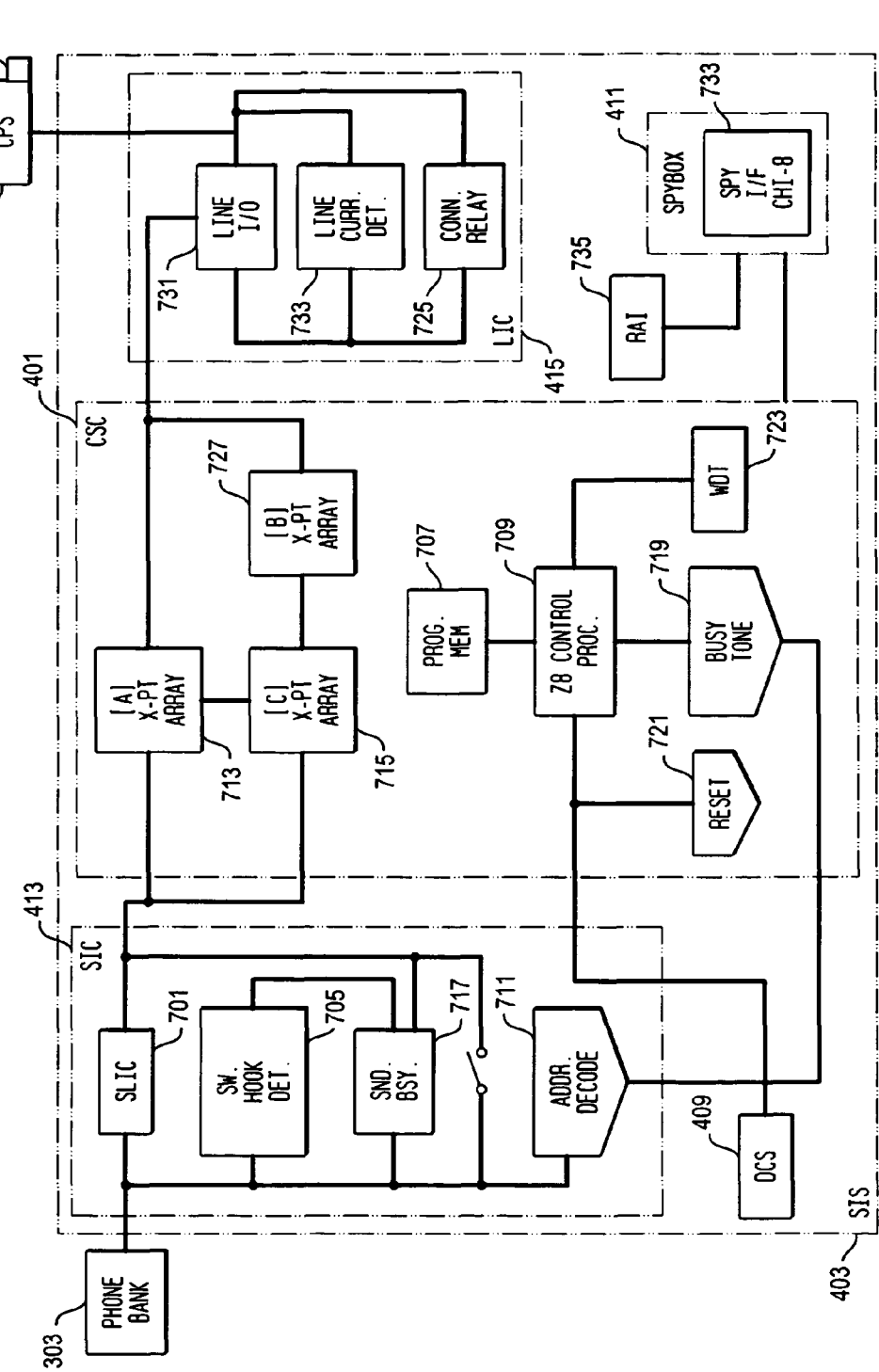
FIG. 7 depicts a schematic view of the Station Interface Subsystem (SIS) of the call management system located within the electronic switchboard device as disclosed in FIG. 4 of the invention.

Referring next to FIG. 7, shown are Station Interface Subsystem (SIS) 403 and its four main components, namely station interface card (SIC) 413, cross-point switch card (CSC) 401, line interface card (LIC) 415, and spy remote audio interface module (RAI) 735. As described above in FIG. 4, SIS 403 is integrated within electronic switchboard device 305 and provides a connection point between telephone bank 303 and Data Communication Subsystem 409. Generally, SIS 403 detects the on-hook status of user telephones and provides the appropriate response signal (e.g., dial tone, busy signal, etc.).

As shown in FIG. 7, the first main component of SIS 403 is station interface card (SIC) 413. In the invention, each user telephone in telephone bank 303 is connected to the system via a two wire (tip/ring) cable pair used for each communication line. These lines are connected to individual subscriber line interface circuits (SLICs) 701 on SIC 413. In this embodiment, SIC 413 supports 32 SLICs 701 per SIC 413. One SIC 413 is equipped per electronic switchboard device configured in the call processing system.

SIC 413 has subscriber line interface circuits 701 to connect and provide power to user telephones 303. Individual switch-hook detect circuits 705 monitor the telephone lines for on/off-hook states. Generally, the normal line state is either idle or on-hook. However, detection of an off-hook state represents a new call service request.

SIC 413 converts the 32 balanced 600 ohm two wire line circuits into 32 individual single wire two-way voice busses. The 32 voice busses connect to [A] point array 713 and [C] X-point array 715 on CSC 401. Busses then may be connected via CSC 401 to idle CPC ports 440 for call processing. When a valid connection is established, the CPC returns a dial tone to telephones located within user telephone bank 303.

Calls originating from SIC 413 that cannot be connected to idle paths generate a busy tone from generator 717. CSC Z8 control processor 709 selects the send busy circuit in the SIC 717 (via circuitry not depicted). SIC 413 connects the busy tone signal 719 to a telephone in phone bank 303. When the telephone disconnects, the circuit is released and the telephone is ready for a new call origination.

CSC Z8 control processor 709 on CSC 401 continuously queries switch hook memory detect circuit 705 to detect new off-hook service requests. When a permanent off-hook or an invalid connection is detected, CSC Z8 control processor 709 enables send busy signal 717. This places the station line in a permanent or lockout busy state. The condition may be cleared when the telephone or faulty off-hook status is restored. When a condition is restored, the station line can originate new calls.

The second main component of SIS 403 is cross-point switch card (CSC) 401, which provides a 32 by 24 cross point switching matrix for connecting stations to call processors and network trunks. In addition, it also performs switch connections for Spybox 411 monitor access.

CSC 401 supports an automatic reroute feature. Connections to CPC ports 440 during the call process may be switched to a second CPC port. This reroute may be required to access an idle trunk for a different call type route. This feature allows call connections to be rerouted in the system to pre-designated call treatment types or alternate trunks.

Upon initialization, CSC Z8 control processor 709 reads and loads programs from onboard E-PROM based program memory 707. During initialization, CSC Z8 control processor 709 performs subsystem reset 721. At this point, CSC Z8 control processor 709 performs hardware diagnostics and data validation. Configuration control information is sent to the Data Communication Subsystem (DCS) 409 concerning the in-service station location addresses which are mapped into program memory 707. Under control of CSC Z8 control processor 709, address decoders decode the on/off states. The CSC 401 decodes the addresses to select [A] X-Point array 713 or [C] X-Point array 715 X-Address location for that individual station.

During operation, onboard watch dog time (WDT) 723 monitors the processor operation and sanity. WDT 723 will automatically reset the hardware if any abnormal condition would prevent the recovery of CSC Z8 control processor 709. Reset 721 then causes the subsystem to re-initialize and return to a normal in-service state. In the case of an invalid on/off hook state or connection, CSC Z8 control processor 709 reset logic can restore the call connection to an idle state, set busy connect for permanent off-hook stations, or reset LIC connect relay 725. LIC connect relay 725 may be enabled or reset under control of the CSC Z8 central processor 709 to connect or release the CPC port. Release of the CPC port will disconnect the forward connection to the network.

In the present embodiment, concentration may be introduced by CSC 401 between its 32 station ports and 24 LIC ports. The level of concentration per unit, provided all 32 stations and 24 trunks are assigned, is 32:24. This would limit the number of simultaneous calls per unit to 24. Concentration levels may be varied by the assignment of stations and trunk lines across the equipped unit. For example, these levels can be 1:1 for a non-concentrated configuration. It is foreseeable that alternate concentration levels may be provided depending on the number of stations and trunk lines utilized in the telephone call management system.

Still referring to FIG. 7, [A] X-point array 713 provides a 32 by 24 matrix. This array cross connects the 32 SIC 413 voice busses to any of the 24 LIC 415 voice busses. The 24 LIC outbound circuits are connected to individual CPC ports 440 in the unit's call processing subsystem (CPS) 405.

When CSC Z8 central processor 709 detects a new call origination, the outbound 24 voice busses on [A] cross-point array 713 are selected first. The first choice routes are to the CPC ports 440 within the same unit. Secondary routes to CPC ports 440 in other companion units are connected through the [C] X-Point array 715.

[B] X-point array 727 provides a 16 by 24 matrix. Eight of the sixteen voice busses represent the inbound unit/unit OUT and unit/unit IN busses. These busses are used to switch station connections to and from other companion units. Outbound access to the busses is via [C] X-Point array 715. Unit/unit inbound access to the 24 LIC 415 voice busses is through [B] X-Point array 727.

The other eight busses are unit/unit IN busses, commonly referred to as half busses. These busses support inbound voice connections for Spybox 411 monitor connections. Monitor access is provided through [B] X-Point array 727, establishing the monitor connection on the trunk side of the call path. A set of dipswitches (16 switches) on CSC 401 provides the option to connect or disconnect the unit/unit voice busses.

The processor's serial COM port (located on the processor) provides data communications between CSC 401 and data communication subsystem (DCS) 409. COM port 440 supports inter-processor communications between units for call connections and unit/unit call control. In addition, in an offline mode, the port may be used to support external maintenance and debug access.

A third main component of SIS 403 is line interface card (LIC) 415, which interfaces SIS 403 to call processor subsystem (CPS) 405. LIC 415 converts the 24 outbound voice busses from CSC 401 to 24 (balanced 600 ohm) two-wire interface circuits. These circuits are connected to individual CPC ports 440. The CPC ports 440, under control of CSC Z8 control processor 709, provide access for call processing and network trunk lines.

Each of the 24 LIC inbound ports directly interface the voice buss from CSC 401. The audio path conversion includes a balanced 600/600 ohm transformer coupled circuit (not shown) and connect relay 725.

Connect relay 725 controls the seizure and the release of the associated CPC port 440. When the relay circuit is enabled, the LIC port extends an off-hook to CPC port 440. In a normal or release state LIC 415 extends on-hook status to CPC port 440. Control of the relay is performed by CSC Z8 control processor 709 address/data buss via I/O address decoder 731. A current detect circuit 733 output is read by CSC Z8 control processor 709. Current detect circuit 733 monitors the loop current in the connection to the CPC port. This permits CSC Z8 control processor 709 to detect the call path connect and disconnect status.

A coupled component of SIS 403 is Spybox card (SBC) 411, which supports non-intrusive access to monitor and record user calls. In the present embodiment, the eight SBC inbound ports interface to the CSC X-point single wire voice busses, which then convert the single wire technology to a balanced 600 ohm two-wire tip and ring voice circuit. The eight outbound two-wire ports connect to remote audio monitor devices. Monitor access in each unit is connected by X-point array [B] 727. Each monitor path is cross connected to one of the 24 inbound voice paths to the LIC.

Spy channel access is connected through the [B] X-Point array 727. The actual monitor connection is made at each unit's LIC inbound voice buss. Therefore, each monitor point connection is made at the trunk side of the telephone call.

The eight spy channel busses have access to a set of eight unit/unit voice busses. These unit/unit buss connections provide access to other companion units in the system. The unit/unit busses connect to the [B] X-pt array 727 in each equipped unit.

The CSC Z8 control processor 709 controls activation of a spy channel connection to an individual telephone call. A monitor request by a spybox workstation routes a unique broadcast message to the call system units. The broadcast message is sent to each equipped CSC 401 via the COM port. CSC 401 (with the actual telephone call) acknowledges the broadcast message and then completes the monitor connection.

The eight inbound spy busses connect to line current detect circuit 733 on SBC 411. This interface circuit converts the voice buss into a 600/600 ohm balanced two-wire tip and ring line circuit. These line circuits from SBC 411 connect to Remote Audio Interface (RAI) circuit module 735. Each SBC line circuit to RAI 735 has a line current regulator and a line current detector circuit.

The line current regulator is enabled or disabled under control of CSC Z8 control processor 709. The line current regulator controls loop current to RAI 735 when the monitor connection is established. The line current detect circuit senses the loop current to RAI 735. Output of the detect circuit is addressed and read by CSC Z8 control processor 709. This allows the processor to determine the RAI module line connection state.

The final component of SIS 403 is spy remote audio interface module (RAI) 735, which is a single port audio monitoring module. Each RAI 735 uses line power from SBC 411 to detect an active monitor connection. An isolation transformer connects the inmate audio to the monitor OUT and speaker jack. RAI 735 can be placed at various monitor locations at the inmate facility. Each RAI 735 provides a control circuit for activating the recording device. An isolation transformer provides a balanced 600 ohm tip and ring circuit to the device for recording the inmate conversations. A ⅛" speaker T, R, and S stereo jack located on the module may be used to support an external speaker connection.

Figure 8:
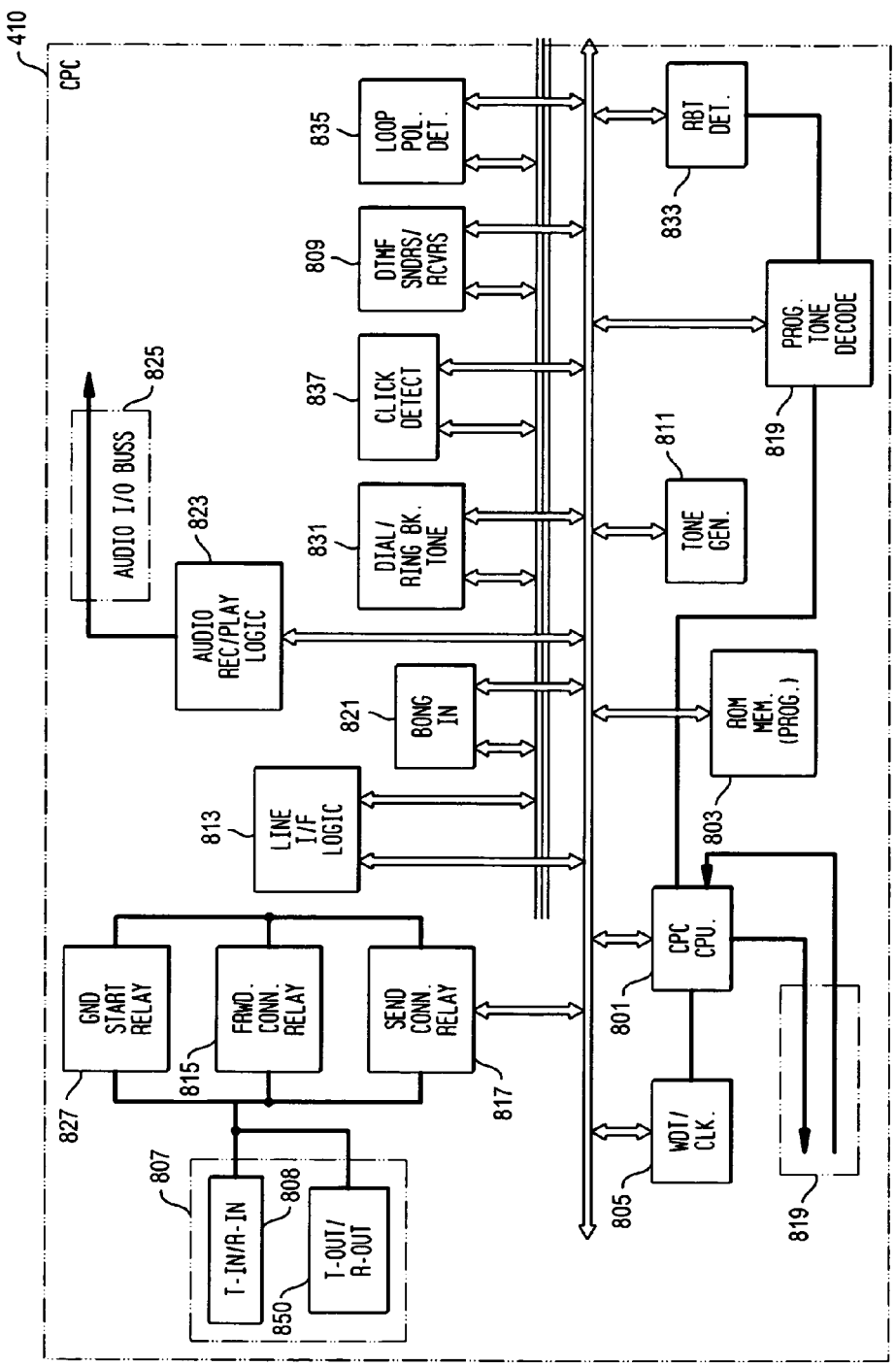
FIG. 8 depicts a schematic view of the call processing control card's (CPC) block diagram which is integrated into the electronic switchboard device of the preferred embodiment of the invention as depicted in FIG. 4.

Now referring to FIG. 8, shown is a schematic diagram of call processing card (CPC) 410. CPC 410 is an integral device located within the electronic switchboard device. However, CPC 410 may be located external to the electronic switchboard device while still performing the basic functions described herein. Call processing card processor 801 is initialized from E-PROM based program memory 803 when the system powers up. Onboard watch dog time (WDT) 805 monitors sanity of the processor. Call processing card processor 801 will automatically try to recover from abnormal hardware or software error conditions that affect processing. If this error state is persistent and call processing card processor 801 is unable to recover, onboard WDT 805 will automatically force reset call processing card processor 801. This will cause CPC 410 to reinitialize and return to service. The onboard RAM supports real time database access and is battery-backed for data integrity.

The LIC outbound ports connect to CPC telephone side ports 807. The telephone side port signal leads 850 are identified as T-out and R-out.

The LIC outbound ports extend a loop closure signal to the CPC 410. This initiates CPC 410 seizure and connects the station voice path. CPC 410 enables DTMF receivers 809 and returns a dial tone that confirms originating access. This signals that the system is ready for the system user to press digits on the telephone keypad. In addition, onboard tone generator 811, which is under control of the call processing card processor 801, sends a dial tone to the station via the line interface logic.

CPC line interface logic design 813 includes both forward connect circuit (FCR) 815 and second connect circuit (SCR) 817. Processing a call requires the station and line side paths be independently controlled by call processing card control processor 801, allowing path information transfer and receipt to be controlled by call processing card control processor 801 during the call process.

After the initial seizure of CPC telephone side port 807, the station and line side are split via FCR 815. Enabled DTMF receivers 809 detect the information digits entered by the user. A typical dial plan allowed may include 1+10 digits for debit account type calls terminated to national numbers, 0+10 digits for collect type calls terminated to national numbers, or any other foreseeable combination of digits. Optional biometric and/or voice verification may occur either before or after DTMF tones have been entered.

Call processing card control processor 801 collects the digits entered by the user and routes the digits to a database capable of providing digit comparison. Digit analysis is performed to determine the call type (collect, debit, speed dial, national, international, etc.). The call system may require users to enter a Personal Identification Number (PIN). Any range of digits may be used. However, to handle most institution requirements, the range of the PIN is one to nine digits or characters typically. Each number is unique to a user. The PIN may be used to index a discrete user file by the User Telephone Account Control (UTAC) server or an inmate telephone account control (ITAC). COM port 819 on CPC 410 supports communications with the server via data communication control card (DCC) (i.e., 425 of FIG. 4). The CPC subsystem design supports up to six COM ports, one for each CPC control processor 801.

Bong tone 821 is played to the user after the digits are entered. Bong tone 821 signals the user that the system is in the auto attendant mode. In the auto attendant mode, interactive voice prompts will interface to the user and guide the user through the calling process, possibly asking for biometric authentication, and providing a means to interface the user entered data to the call system.

Furthermore, the digits entered associated with the called party are compared with a listing of called party telephone numbers (e.g., in the local user profile 354 that is stored in the local database 352 shown in FIGS. 3 and 6), which contains restricted or blocked called numbers with indicators or flags associated therewith. Local database 352 is stored, for instance, within the electronic switchboard device 305. However, local database 352 may be stored within the local call management subsystem 350 and external to the electronic switchboard device 305, for instance, associated with plural switchboards 305, while still performing the basic functions described herein. In the event that an indicator or flag is associated with the called party telephone number, then the central user database 372 will be interrogated, for instance, under control of the call processing card control processor 801 in the CPC 410. In the event that the central call record 374 indicates that the flagged called party telephone number has a block or restriction having restrict conditions satisfied (e.g., the call is within a time of day period for which the called party has indicated call denial), for instance, in the form of a negative indication in a called party permission field 590 (shown in FIG. 5), a special call treatment may be returned to the user, or the call may be directly terminated. Alternatively, if the central call record 374 indicates a restriction with restrict conditions that are not satisfied, then the call may proceed.

Each CPC has audio record/playback logic 823 interfaced to four I/O busses 825. I/O busses 825 connect to the call system voice memory card (SMC) (i.e., 427 of FIG. 4). Each of the four I/O busses 825 may be a single wire audio buss, although other configurations may be used. Each I/O buss 825 supports one of four CPC telephone side ports 807. Audio record/playback logic 823 under control of CPC processor 801 permits individual record/playback on either audio I/O buss 825. Audio buss 825 can be enabled to play or record on either the station and/or the line side of the connection.

The telephone call management system generally supports playing voice prompts that guide a user through the call process. Audio record/playback logic 825 supports recording of the user's name and the called party's name for later use in voice prompts and/or voice authentication functions. In addition, audio record/playback logic 825 supports playback of pre-recorded voice announcements to the called party when answered. Based on call type and the user data profile, different voice prompt menus may be selected according to the user's preferred language and other like options. In addition, as described above, the called party may be provided with various voice prompts with instructions to accept a call, accept a call with further options, decline a call, or to decline a call with further options. These voice announcements may be provided under control of audio record/playback logic 825.

The interface logic's line side is open until CPC control processor 801 is ready to extend the call. Line side ports interface and connect toward the network. Port signal leads 808 are identified as T-in and R-in. Port signal leads 808 connect to either PSTN network analog trunk line 311 facilities or integrated analog/digital conversion card (IDC-MSI) (i.e., 417 of FIG. 4, not shown in FIG. 8) for direct digital T1 network facilities.

A trunk group is determined during the digit analysis based on the dial plan. If the current CPC trunk interface is a member of the selected trunk group, the trunk can be seized. CPC processor 801 enables SCR circuit 817 to seize the appropriate trunk circuit.

Each line side port may be either a loop or ground start operation. Ground start relay circuit 827, under control of CPC processor 801, provides the ground start feature.

When the CPC trunk interface is not in the trunk group selected, the call must be switched to an alternate CPC path. The alternate CPC path selection is initiated by message via COM port 819 to the DCC (i.e., 425 of FIG. 4, not shown).

DTMF senders 809 under control of CPC processor 801 are attached to outpulse the network information digits. Based on the network trunking plan, various interface protocols may be supported (debit, collect, long distance, etc.).

During network seizure, information outpulsing and call setup, various call progress tones or states may be encountered. The CPC line interface logic supports detection of these network progress tones and supervisory states. Progress tone decoder circuit 829, under control of CPC processor 801, detects the various network progress tones. Complex software and hardware algorithms are used to detect network progress tones and states. The states include dial tone 831, congestion busy signal, subscriber intercept tone, call intercept announcement, line busy signal, ringback tone 833, ring no-answer, answer supervision, and quiet. Loop polarity detection circuit 835 in CPC 410 supports hardware answer supervision. The detect circuit looks for a reverse tip and ring loop polarity.

Optionally, CPC 410 has "CLICK" detect circuit 837 which monitors the network line when answer supervision has been declared. The circuit supports detection of a rotary dialed called party acceptance. Call acceptance by the called party using a touch-tone telephone is detected via an enabled CPC DTMF receiver. "CLICK" detect circuit 837 also supports flash-hook detection used for third-party/conference call setup by the called party telephone.

In addition, other called party data may also be collected. Called party data (which may be specific to a user profile 374 or may be linked to multiple user profiles 374 may include, but is not limited to, one or more of: indication of call acceptance or denial for a particular calling party, for multiple calling parties, and/or for one or more institutions; time of day call restrictions for a called party; alternative telephone numbers for a called party; time of day call restrictions for alternative telephone numbers of a called party; etc. In certain embodiments, the collected called party data is stored in the central database 372 within one or more user profiles 374.

The PSTN analog trunks utilized with the invention are typically two-wire line interfaces used for local TELCO access. For this type of line, CPC 410 connections appear on type 66 distribution blocks, which are used to cross-connect the CPC ports 440 to the TELCO lines, or to the IDC ports.

Figure 9:
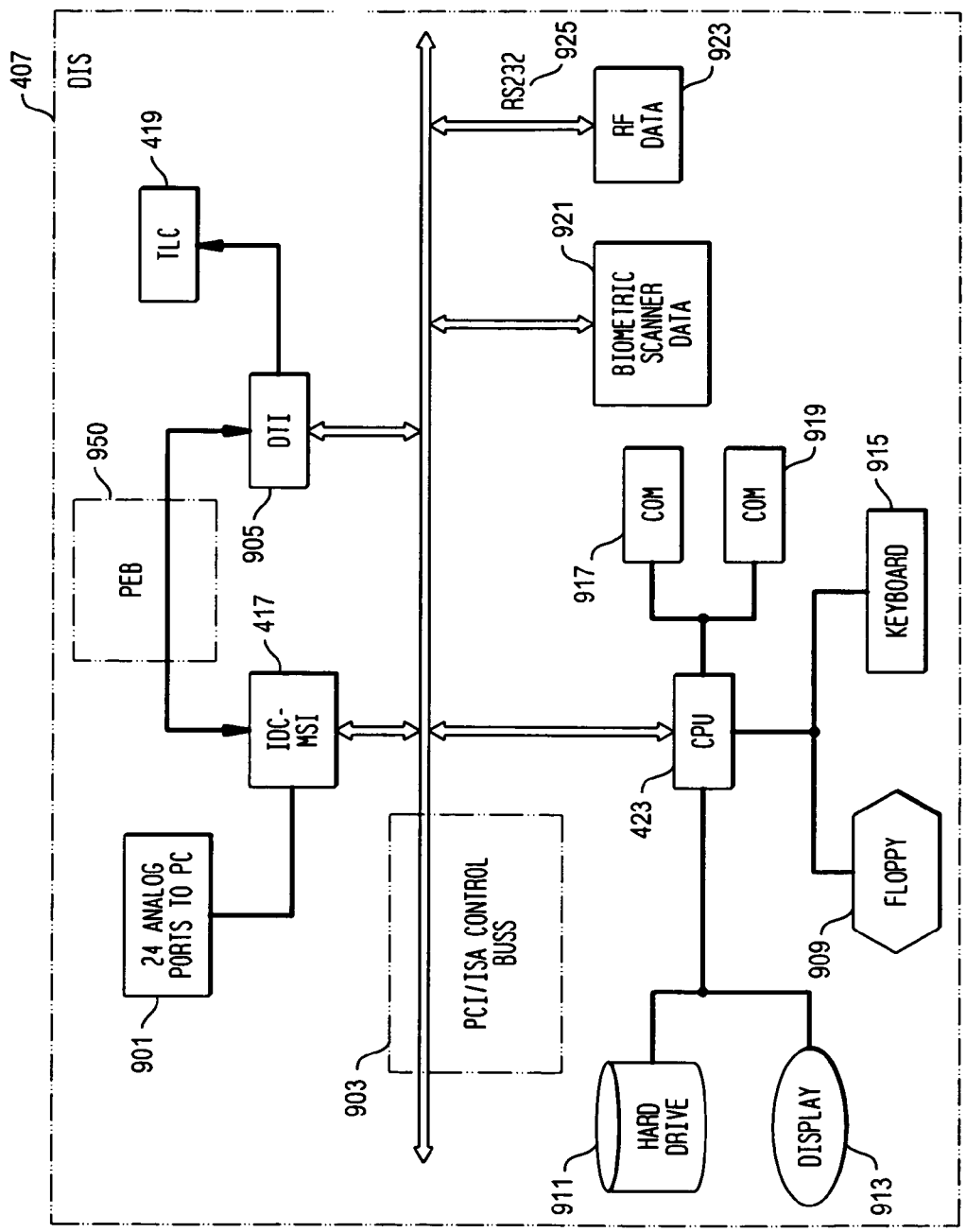
FIG. 9 depicts a schematic view of the Digital Interface Subsystem (DIS) block diagram which is an integrated device in the electronic switchboard device as disclosed in one embodiment.

Referring next to FIG. 9, shown is a block diagram of digital interface subsystem (DIS) 407. IDC-MSI card 417 provides integrated analog to digital (A/D) conversion. A/D conversion is performed on the voice circuits from the CPC ports 440 to the digital T1 interface card (TLC) 419. Analog ports from CPCs connect to IDC-MSI card 417 at IDC analog interface port 901. Each analog interface port 901 contains electrostatic discharge circuits to filter out sharp high voltage transients. A line interface circuit provides loop control and transmission battery feed. The coder/decoder (CODEC) converts inbound audio from analog to 8-bit digital audio signals and outbound audio from digital to analog, aiding in voice recording, biometric authentication, and the like.

The CODEC's digital audio signals are gated onto the time slot interchange (TSI) switch. The TSI receives digitized audio signals from the CODEC. Channel switching/connection signals are provided from the onboard control processor for each of the 24 channels.

In certain embodiments, the TSI switch acts as a traffic coordinator to buffer and gate the digital data from each channel. After the digital data is managed by the TSI switch, the digital signals are routed to PCI-1 421 (shown in FIG. 4). Digital signals are in a Digital Service Level 0 (DS0) format. DS0 channelized signaling is a 64 Kb/s data digitizing rate used for T1 and E1 systems. Although Digital Service Level 0 (DS0) is utilized in the present embodiment, other formats compatible with the objectives of the invention may be utilized depending on the requirements of an institution call system. PEB buss 950 links IDC-MSI card 417 PCM channels to TLC 419 and DTI 905.

IDC-MSI card 417 is slave to the digital subsystem CPU card (CPU) 423. In the present embodiment, IDC-MSI card 417 edge connector supports PCI/ISA control buss format, however, other formats may be supported.

DTI hardware 905 may be a commercial design presently known in the art. Deployed in a large number of switching applications, the design is a proven technology. Specifically, the design may be a derivative of a hardwire design similar to Dialogic's® D/24-SC-T1 digital T1 interface card.

The basic function of TLC 419 is to provide an integrated digital T1 network interface. When using the institution call system of the invention, it replaces the need to use special channel bank type equipment.

Digital subsystem CPU controller card 423 hardware is a commercial design. The design is a proven technology and supports various TELCO system applications. Key functions of CPU 423 include the processing of the digital interfaces, subsystem statistics, user inquiries, etc.

Digital subsystem controller card 423 is a full size card. The Pentium processor based CPU 423 accommodates up to 256 MB DRAM memory. A secondary level 512 KB cache is also provided. Communications between digital subsystem CPU controller card 423, TLC 419, and IDC-MSI 417 is provided by the PCI/ISA buss. Floppy disk controller 909 supports loading updated programs/data files. Hard disk 911 provides storage media for digitized voice and data files.

Inquiry requests may be initiated by a user of the system from one of the available telephones. Unique access codes along with the PIN number, biometric authentication, or RF authentication, may be entered once the user receives dial tone from digital subsystem CPU controller card 423. When digital subsystem CPU controller card 423 receives the digits, it connects to the line side and resends the digit information to IDC-MSI 417. The analog information is digitized by IDC-MSI 417 and routed via PEB buss 950 to TLC 419. Information digits may then be processed by digital signal processors (DSPs) in TLC 419.

TLC 419 has drop-and-insert capability to support digital data outputs that may be processed by digital subsystem CPU controller card 423. The drop-and-insert feature in addition supports playback of digital voice prompts during the inquiry process.

Digital voice files may be stored on hard disk 511 of digital subsystem controller card 423, although the digital voice files may be stored anywhere accessible to the system, whether local or remote. The processing of digit information and the use of special menus support the interactive inquiry process. The recorder may be incorporated into CPU 423. CPU 423 also may contain software capable of analyzing biometric data from a biometric sensor via COM port 921. It also contains software that may analyze RF data 923 from an RF receiver via COM port 925.

Digital subsystem CPU controller card 423 LAN interface supports communication with the servers and associated inmate account information. This supports account transaction processing between ITAC and other inmate data files, for instance, when a flagged called party telephone number is encountered. Digital subsystem CPU controller card 423 board connectors support connection to external I/O devices. For example, CPU 423 may include display 913, keyboard 915, and/or COM ports 917 and 919.

Figure 10:
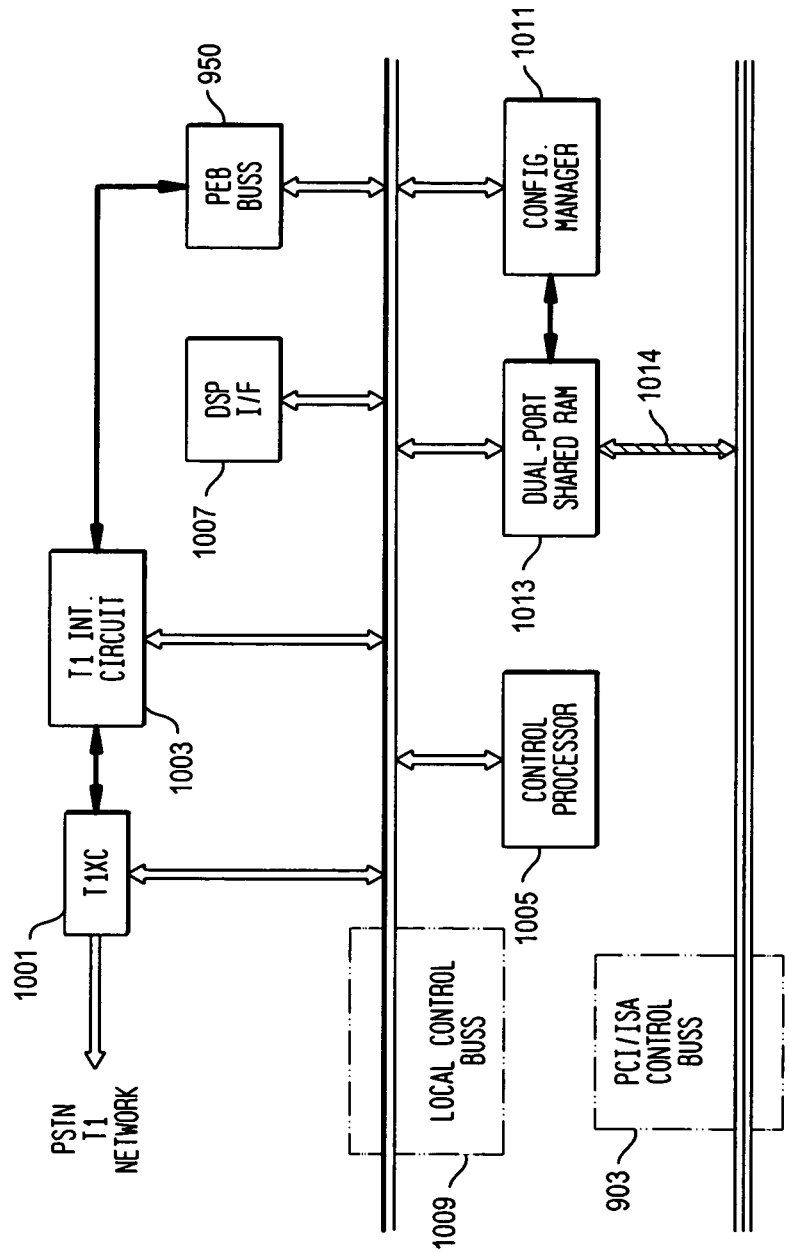
FIG. 10 depicts a schematic view of the digital T1 interface card (TLC) which is an integral device of the electronic switchboard device as depicted in FIG. 4 and is located in the Digital Interface Subsystem (DIS) set forth in FIG. 9.

Now referring to FIG. 10, displayed is a schematic diagram of the interface structure of TLC 419. The TLC 419 is an integral part of the digital interface system of the telephone call management system of the invention. Digital T1 signals from the network enter the DTI-IDC card (not shown) via T1XC line interface 1001. The incoming T1 bit stream is interfaced to T1 interface circuit 1003. T1 interface circuit 1003 acts like a traffic coordinator for gating the digital signals. It buffers the digital data received for each channel and interfaces the data to PEB buss 950. The serial bit stream contains the digitized voice and signaling information for each channel. Under the control of TLC onboard control processor 1005, T1 interface card 1003 can route a channel being processed to any available PEB buss 950 time slot.

PEB buss 950 supports up to 24 time slots in certain embodiments of the invention. However, the number of time slots may be altered depending on the desired capacity of the call system of the invention. This enables the telephone call management system to route channels to/from the IDC-MSI card. Each time slot is a digitized bit stream and represents one voice channel. This enables T1 interface card 1003 to switch voice channels on PEB buss 950 to and from the IDC-MSI card analog interface ports.

PEB buss 950 time slot data may be routed to a series of digital signal processor (DSP) 1007 interface. DSP 1007 processes the digitized audio signals data on each channel. This design supports channel drop-and-insert capability. Under control of TLC onboard control processor 1005, digital data may be extracted from the bit stream and/or inserted into the bit stream.

Digital signal processor 1007 supports user inquiry features of the call system and any voice authentication that may be employed. Digital signal processors 1007 may be programmed to perform signal analysis, to automatically adjust gain control, to compensate for variations in the level of incoming audio signals, to compress digitized voice data compression, to send and/or receive DTMF or in band signaling, to monitor channel conditions and status, to detect presence of tones (DTMF, MF, etc.), detect silence/quiet, to determine if a caller is not responding, to decompress stored audio data, to compress audio data for playback, to adjust the volume and rate of speed of playback, to signal bit control (off-hook, on-hook, etc.) based on trunk types (FXS, E&M, etc.), etc.

TLC onboard control processor 1005 controls TLC 1003 operation via local control buss 1009. Local control buss 1009 interprets and executes commands from TLC onboard control processor 1005. Communications between TLC onboard control processor 1005 and the host CPU is via dual port shared RAM memory 1013. Dual port shared RAM memory 1013 acts as an input buffer and/or output buffer. Upon initialization, the operating firmware that controls TLC 1003 is downloaded from the CPU. It is downloaded into the onboard code/data RAM via dual port shared RAM interface 1014 via PCI/ISA control buss 503.

Specifically, control of the digital interface subsystem is provided by configuration manager 1011. Configuration manager 1011 determines and sets various board level operational parameters. This feature eliminates the need to set confusing jumpers or dipswitches.

Figure 11:
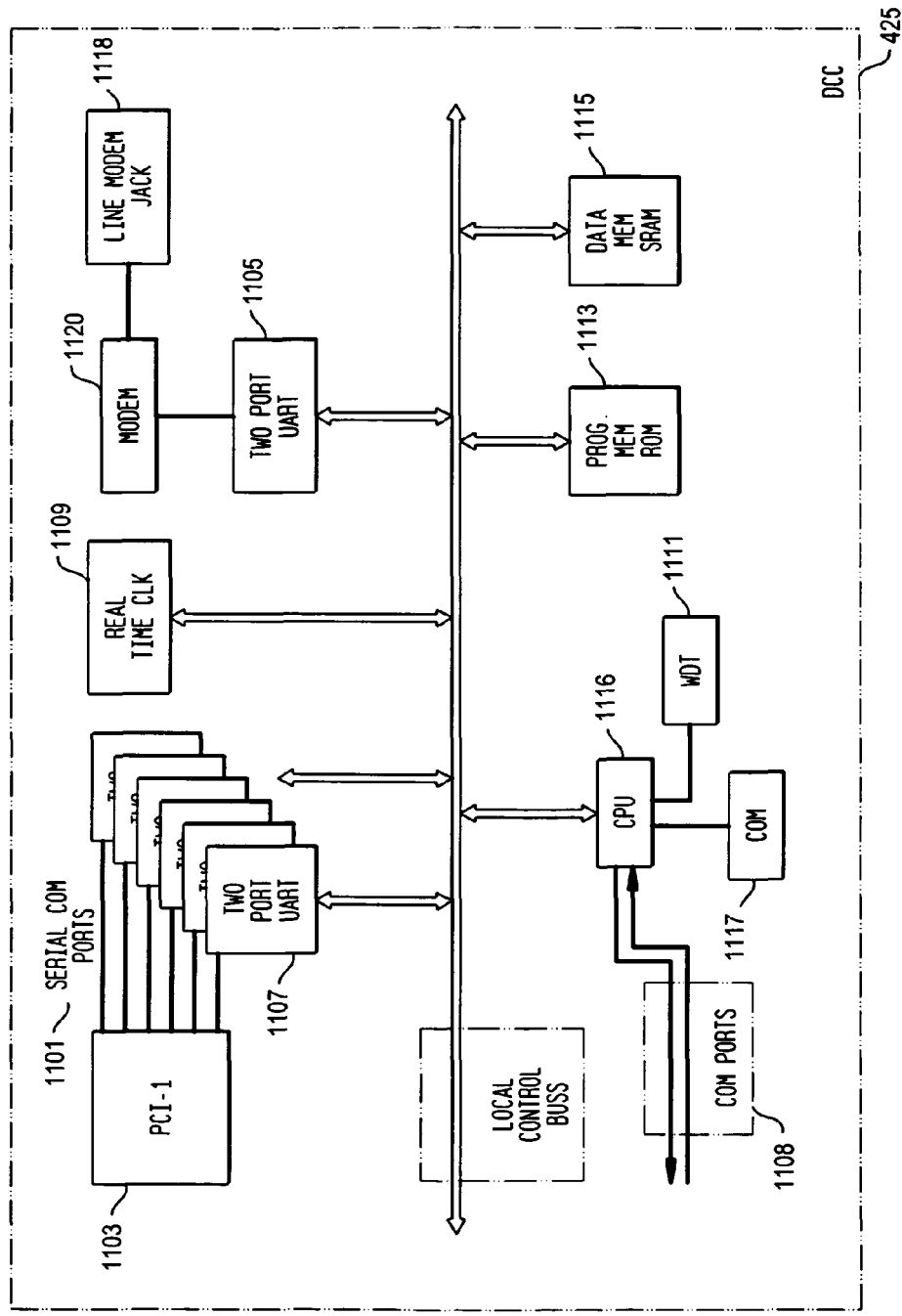
FIG. 11 depicts a schematic view of the data communications control card (DCC) as set forth in the electronic switchboard device in FIG. 4.

Referring next to FIG. 11, shown is a block diagram depicting the performance of the data communication card (DCC) 425, as depicted in FIG. 4. In the design of the preferred embodiment, DCC 425 supports up to 15 serial communication ("COM") ports 1101. However, any number of serial COM ports 1101 may be utilized depending on the capacity requirements of the telephone call management system. Server UARTS (Universal Asynchronous Receiver Transmitter) (2 ports per UART, however, any number may be utilized) (i.e., 1105, 1107) and internal central processor's COM port 1117 effect communication between subsystem cards.

In certain embodiments of the invention, one of UART ports 1105 supports an internal modem circuit for remote dial access. In addition, six of UART ports 1107 are dedicated for connecting up to six CPC serial COM ports 1101 from the CPS. Other serial COM ports 1101 include one port dedicated for CSC communications and a second COM port dedicated for communications with the system concentrator communication card. Communications between the data communication card and the system memory card is via internal processor COM ports 1108.

A battery backed real time system clock 1109 on DCC 425 supports an accurate date and time stamp function. This capability is used for time stamping call detail records (SMDR) and reports.

Data communication card central processor 1116 sanity is monitored by internal watch dog timer (WDT) 1111. This feature provides a hardware type reset for data communication card central processor 1116. For example, if a non-recoverable error condition affects the processor sanity, the feature would force reset data communication card central processor 1116. Furthermore, WDT 1111 feature may force data communication card central processor 1116 and/or SMC processor to reset.

DCC 425 has two types of memory located on the board, which include ROM (read only memory) 1113, equipped at either 256 or 512 kB in the present embodiment, and SRAM (static random access memory) 1115, equipped at 512 kB in the present embodiment. ROM 1113 contains the operating programs for DCC 425. On power-up, data communication card central processor 1116 boots and initializes the operating programs.

Battery-backed SRAM 1115 supports real time and configuration data requirements. Configuration data may be site specific. Alternatively, site programs can be downloaded from remote operations centers.

PCI-1 1103 is based on a passive card design. It consists of connectors that distribute and connect signals between subsystem cards. Each call system unit is equipped with one PC card referred to as PCI-1. The PCI-1 card supports the distribution of signals between DCS, SIS, and CPS in each unit. The PCI cards plug into a standard card slot in the Call system unit.

DCC 425 controls and performs communications functions between electronic switchboard unit subsystems. In addition, DCC 425 supports communications with units and subsystems via the CCS. Some operational and maintenance features of the DCC 425 hardware include visual indicators, special line modem access jacks, external serial COM port access jacks, reset & write protect switches, memory equipped options, etc.

In certain embodiments, modem access for remote maintenance and administration is supported by line modem 1120 and line modem jack 1118, such as a RJ14 telephone jack. Generally, the access line usage is low and may be controlled. Therefore, an option makes it possible to share the line for user calling to allow for efficient operations of the call system.

Figure 12:
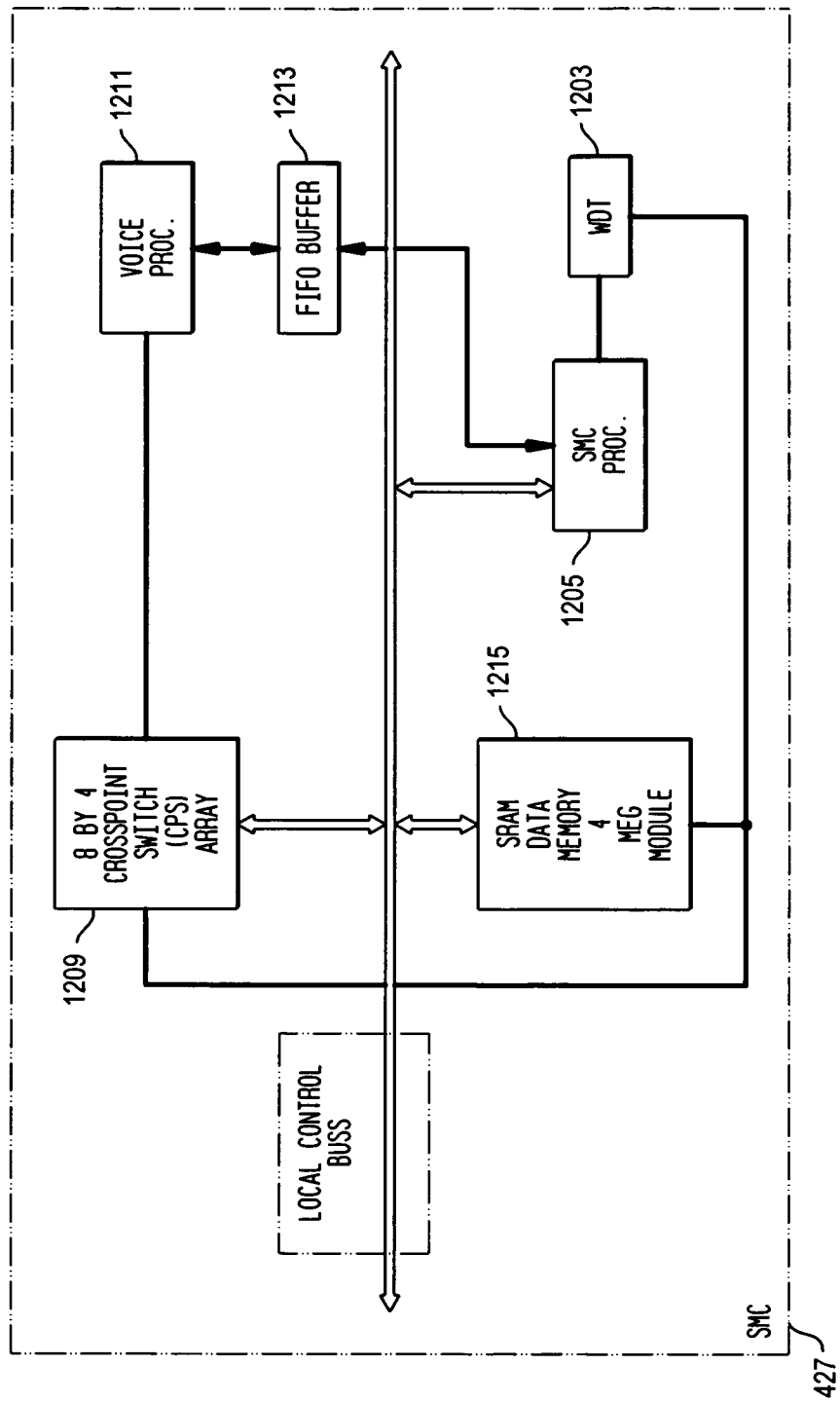
FIG. 12 depicts a schematic view of the system memory card's (SMC) block diagram integrated within the electronic switchboard device of the embodiment in FIG. 4.

Next referring to FIG. 12, shown is the architecture of system memory card (SMC) 427 of certain embodiments of the invention as disclosed in FIG. 4. Functionally, system memory card 427 provides voice processing and buffering of digitized voice files for use as interactive voice prompts and/or use as voice authentication. SMC 427 also performs buffering for called party flag records (e.g., from database 352) and called party block/restrict records (e.g., from database 372). SMC 427 further performs buffering for call detail records and inmate voice recordings. SMC 427 communicates with the data communication card via the SMC processor 1205 internal COM ports. SMC 427 and SMC processor 1205 support data and voice communications in the electronic switchboard device of the call system of the invention. Watch dog timers 1203 on processors 1205 monitor sanity. SMC processor 1205 will reset the internal control of the DCC of the invention and vice-versa.

Certain embodiments of invention provide for four (8 by 4) cross-point arrays 1209. However, other crosspoint arrays and configurations may be used. Each cross-point array 1209 provides access to the four voice processing circuits on the SMC provided in the preferred embodiment of the invention. Each equipped CPC provides four audio line record/playback buss connections to SMC 427. Based on a fully equipped unit (6 CPSs per unit at 4 audio line busses each) a total of 24 audio line buss cross-connections are used in the present embodiment. For example, each one of the first three arrays supports four audio line busses from 2 call processing cards. Specifically, each array may access any of the four voice processor circuits 1211 of the present embodiment.

Voice processor circuits 1211 code user voice signals into digitized voice files for recording and use for authentication. Voice processor circuits 1211 also decode user digitized voice files and convert the digital signals to audio signals for playback.

Furthermore, first-in, first-out (FIFO) buffer 1213, along with the SMC processor's 1205 DMA buss allow larger digitized voice data files to be moved fast and efficiently to and from memory. A multitude of FIFO buffers 1213 may be utilized for providing a more efficient call system.

Alternatively, or in addition to the FIFO buffers, memory extension modules 1215 may be utilized and designed as plug-in modules for the SMC 427 (as depicted in FIG. 4, not shown). Memory extension modules 1215 contain four Meg memory expansions per module in the preferred embodiment of the invention.

Figure 13:
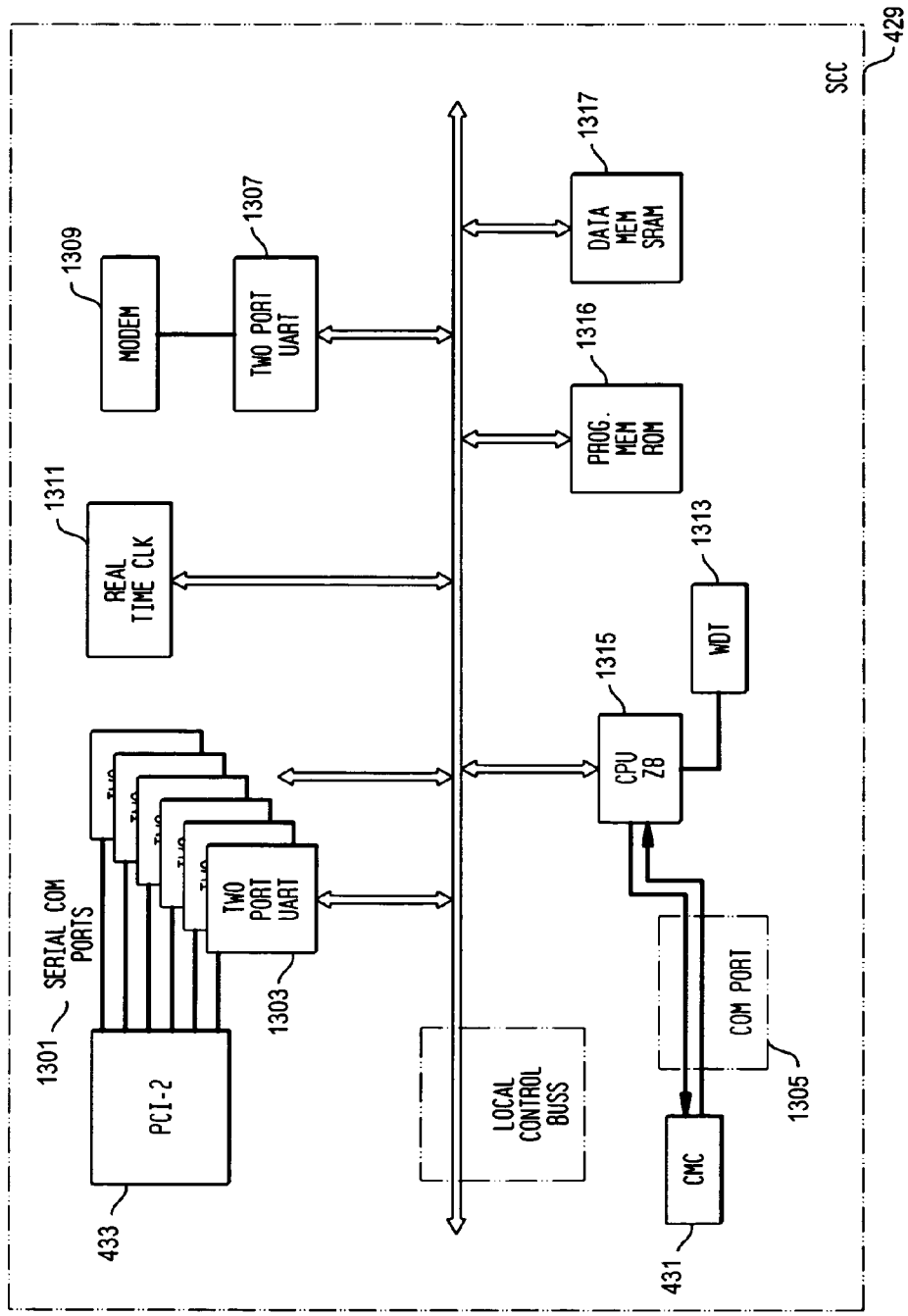
FIG. 13 depicts a schematic view of the concentrator memory card's (CMC) block diagram integrated in the electronic switchboard device as depicted in FIG. 4.

Referring next to FIG. 13, depicted is a block diagram of the system concentrator card (SCC) 429. SCC 429 is a communications interface controller between multiple electronic switchboard devices and is generally integrated within the electronic switchboard device of the invention. SCC 429 supports and controls up to 15 serial COM ports 1301 in the present embodiment of the invention. Serial COM ports 1301 generally comprise 7 UARTS 1303 (2 ports per UART) and the SCC internal processor's serial COM port 1305.

Specifically, in this embodiment, one UART port 1307 supports an internal modem circuit 1309 for remote dial access. Typical COM ports used in SCC 429 include four serial COM ports which are used to connect to the DCC in each electronic switchboard device unit equipped and one serial COM port used to connect to a server COM port. In the present configuration, the SCC processor's COM ports 1305 connect directly to the CMC 431 COM port. Furthermore, a battery backed real time clock circuit 1311 is also part of the SCC design.

SCC internal processor 1315 sanity is monitored by an internal watch dog timer feature 1313. This feature provides a hardware type reset for SCC internal processor 1315. If a non-recoverable error condition affects the processor sanity, the feature forces reset of the SCC internal processor 1315.

SCC 429 comprises two types of memory located within the system. Specifically, SCC 429 includes programmed memory ROM 1316 (read only memory), equipped at either 256 or 512 kB in the present embodiment, and data memory SRAM 1317, (static random access memory) equipped at 512 kB in the present embodiment. Although the specific memory capacity for the system is provided for disclosure purposes, it is foreseeable that additional memory, either internal or external to the system, may be provided depending on the desired capacity of the call system. Generally, ROM is used for program memory and contains the SCC's operating software.

In certain embodiments, CMC 431 performs buffering for called party flag records, called party block/restrict records, and call detail records as a backup to the system memory card.

The CMC 431 communicates with the system concentrator communication card via the processors internal COM ports 1305. Together they support data communications in the telephone call management system. Watch dog timers 1323 on the CMC and SCC processors monitor sanity. A reset from either processor will reset the companion processor. The CCS's CMC uses the same basic hardware as the SMC equipped in the DCS.

Call system software controls called party telephone blocking functions, including initial checks for flags within called party telephone number records stored in first level database 352, and also directs interrogations of the central site server 313, for instance, by querying the database 372, to determine if a flagged record is to be blocked or restricted. In addition, call system software controls the interface with called parties, for instance, as described with respect to FIG. 2.

Call system software also controls all monitoring, recording, financial transactions, and other call processing features. Call system software may have the ability to control and view data from multiple sources, including those on site with respect to a switchboard (e.g., data stored in hard disks 911 (shown in FIG. 9) or other local memory devices including the database 352) and those off site with respect to the switchboard, for example, associated with the central site server 313 including the database 372.

In one embodiment of the invention, call system software contains several main components. A general description of the call system software is provided herein to offer a general understanding of the possible software for use with an investigative call system. However, the description provided is not intended to provide the full scope of software functions compatible with the invention. For example, a system administrator section controls which institution authorities have hardware and telephone access to the system. A user administrator section controls which prison authorities have access to the software. Specifically, in a prison environment, the warden may have access to modify all features within the system whereas a guard may only be able to change user profiles in his own cellblock. The account section allows inmate profiles to be created and modified. It monitors the inmate's calling data and financial transaction data. A called party administration section allows the software to control access to the first level database to determine if a called party telephone number is flagged, and also controls access to the second level database to determine whether a call placed to a called party telephone number that is indicated as flagged should be blocked or allowed to proceed. A shadow section allows the software to control the various Spybox monitoring stations to listen to inmate calls. A sixth section allows users of the software to compile various system reports, such as net monthly financial transactions and an extra digits dialed report. An additional section may process the biometric information and the RF data for use in authentication. This section uses various algorithms to check a user's recorded information against data supplied to the biometric scanner and RF receiver.

System administration software allows an institution staff member to define defaults and to customize the system. Generally, only authorized staff members may have access to customize system settings, based on individual staff member security levels. However, a user security level may be determined when a user first logs into the system containing the call system software based upon username and the access level that has been set for each user name by a user manager. The sub-menus of software may include class of service (COS) maintenance, living unit maintenance, telephone location maintenance, facility telephone number control flag list, nationwide telephone number control, call pricing, facility default maintenance, transaction type maintenance, etc. In addition, the institution employees may have access to update multiple telephone lists, view calls in progress, monitor calls in progress, manually modify transactions, enable/disable telephones, modify the class of service, etc.

Figure 14:
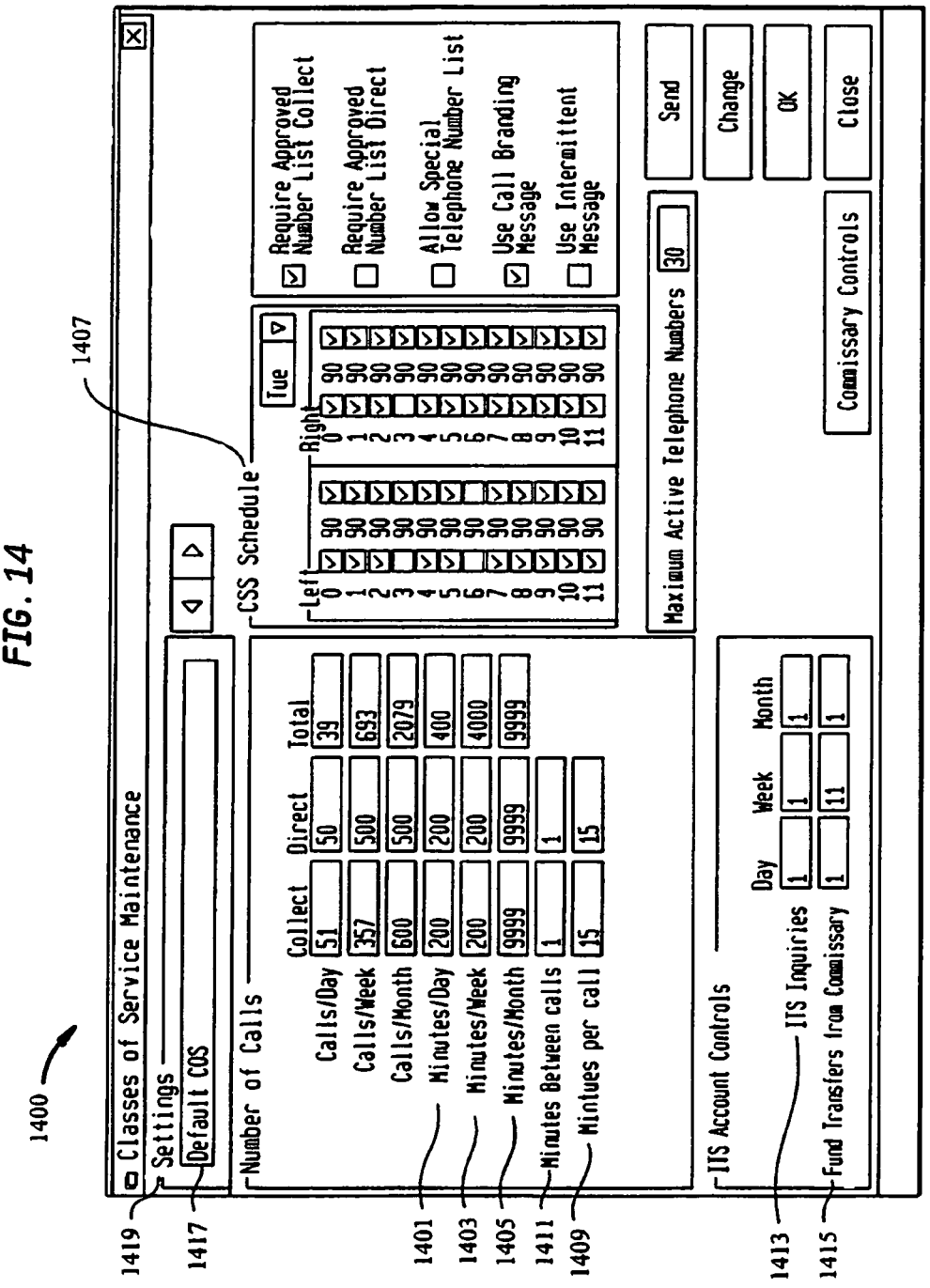
FIG. 14 depicts a sample class of service menu for use with software contained in the call management system of an embodiment of the invention.

Referring next to FIG. 14, depicted is a sample class of service maintenance menu 1400 integrated with the current system of the invention. The class of service maintenance menu 1400 may be provided to an authorized institution agent for monitoring the various aspects of the call system of the invention. Various classes of service maintenance menus (from very simple general menus to extensive broad menus) may be provided in accordance with the general objectives of the invention. However, depicted is a general class of service maintenance menu 1400 illustrating certain common features as presented in a standard IBM compatible software based program. Although numerous software protocol systems may be utilized in accordance with the overall objectives of the invention, it is preferred that Microsoft Windows® based programs are utilized. However, the invention is compatible with other types of operating systems that may be employed depending on the requirements of the institution. In class of service maintenance menu 1400, numerous points of information are depicted for users, including, but not limited to the total number of minutes allowed per user in any given day 1401, week 1403, or month 1405. It is foreseeable that class of service maintenance menu 1400 also sets the dates and times 1407 that calls may be made, as well as telephone call maximum duration 1409 and the time duration between calls 1411. Authorized system users may also set limitations on access to the inquiry system via data input fields. For example, a data input field may be provided for limiting the number of inquiries 1413 or limiting the number of transfers from the commissary 1415. Further parameters can be determined by system users by changing class of service (COS) maintenance settings 1419. For example, for ease of application, access levels usually match the 'Default COS' 1417, but may be customized for each user.

Figure 15:
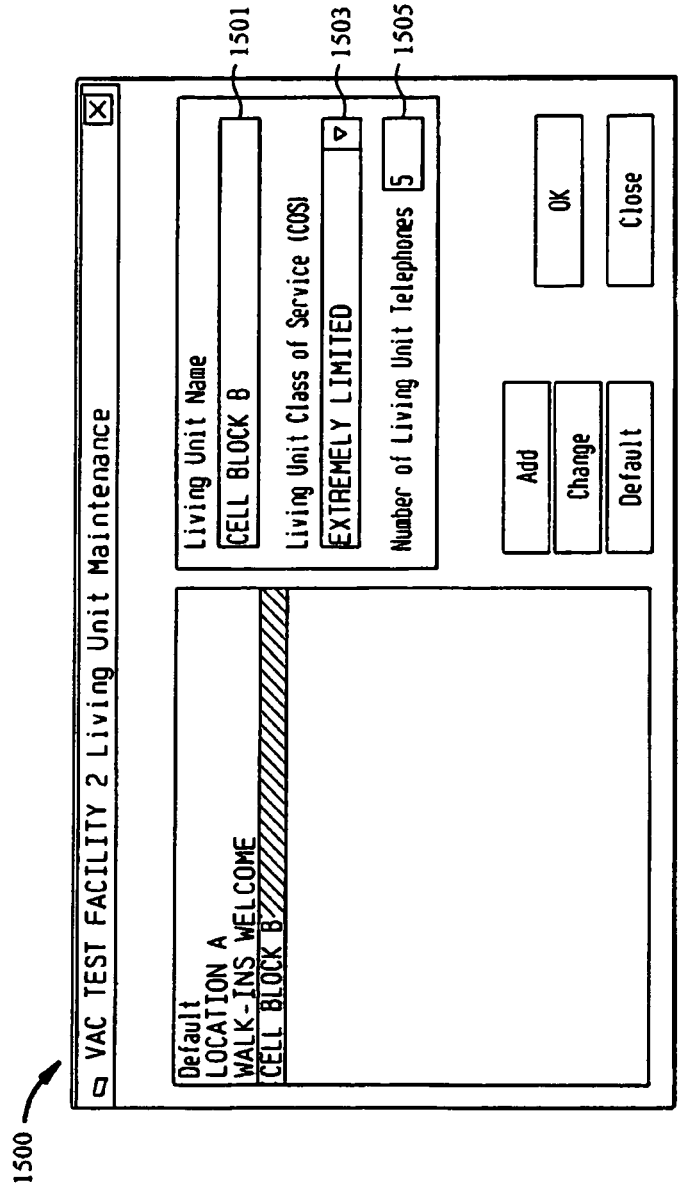
FIG. 15 depicts a sample authorized maintenance interface screen for use with software contained in the call management system of an embodiment of the invention.

Now referring to FIG. 15, shown is authorized agent maintenance interface screen 1500. Many institutional facilities include individual buildings, departments, wings, etc. (e.g., the term cellblocks is often used or different divisions of a prison facility). As depicted in authorized agent maintenance interface screen 1500, the call system of the invention refers to these as "living units". As represented in the authorized agent maintenance interface screen 1500, several control settings can be applied to an entire living unit at a time, including setting the default COS for the unit. If assigned, a personal designation overrides a living unit designation and a living unit designation overrides a facility designation. For example, in a correctional facility, living unit name 1501 is the name assigned to the cellblock (e.g., "Cell Block B", "Cell Block C", etc.). In addition, in this example, the living unit COS 1503 is the default COS that will be assigned to inmates assigned to that living unit. Furthermore, the number of living unit telephones 1505 is for informational purposes only, and does not affect the program. Further, options may be available depending on the requirements and capacity of an institution.

Referring next to FIG. 16, depicted is a sample telephone location maintenance screen 1600 utilized in the invention. For example, telephone location maintenance screen 1600 allows an institutional staff member to define for each telephone station which user telephone account control server may be utilized defined in site server name field 1601. In addition, station number field 1603 provides a data entry point for assigning the station ID or station number to address each telephone location. Living unit field 1605 provides institutional staff members a data entry point to address the telephone locations in various location blocks throughout the institution. Location field 1607 allows users access to specific trunk lines within the call system. Finally; telephone locations summary block 1609 provides a general summary to a staff member for maintaining a call system.

In this example, all parameters except the line number can be changed by staff members' intervention. Further options may be accessible depending on the requirements of an institution.

FIG. 17 depicts a sample facility telephone number control screen 1700. Facility telephone number control screen 1700, accessed from a main screen, provides authorized users the ability to define a list of numbers that supersedes the user's personal telephone number list 1715 for either collect and/or direct dial numbers at the facility level. Each telephone number can be modified in the telephone number field 1702. A maximum extra digits field 1705 indicates the number of digits a user is allowed to dial after a call has been connected.

Facility telephone number control screen 1700 additionally contains call type block 1717 that contains a number of fields indicating the type of call. Block field 1701 is selected if a telephone number is not allowed on the user's personal list. For instance, home telephone numbers of prison guards and wardens may be included as not being allowed on a user's personal list. In addition, telephone numbers of indictment witnesses, trial witnesses, police officers and judges may be included as not being allowed on a user's personal list. This list may supplement the list of blocked numbers in the nationwide telephone number control screen 1800 described below. Allow field 1703 is selected if the telephone number in telephone number field 1702 is on the user's allowed list. If no list required field 1704 is selected, a user does not have to place the telephone number on their personal list in order to call it. Type block 1717 additionally contains collect field 1719 which is selected if a user is authorized to call the number collect. Similarly, type block 1717 also contains direct field 1721 which is selected if a user is authorized to call the number utilizing direct call means.

Facility telephone number control screen 1700 additionally contains a number of days field indicating the number of days a telephone number is actively on the list. In this example of the invention, setting number of days to "0" will cause the number to be active on the list indefinitely. Any number greater than "0" will cause the number to only be active for that number of days.

Brief comment field 1711 may be used to describe the reason a telephone number is on the list or any other like comments. The user security level that added the number is indicated (and cannot be modified) in "User" field 1713.

Depicted in FIG. 18 is a sample tasks/system nationwide telephone number control screen 1800. For example, telephone number control screen 1800 allows authorized users the ability to define a list of numbers that supersedes both the user's personal telephone number and facility number control list for either collect and/or direct dial numbers at the national level. Telephone number control screen 1800 can be accessed from a main menu.

Telephone number control screen 1800 contains a list of telephone numbers 1802 which can be assigned a "Blocked" designation 1801 or an "Approved" designation 1803. Blocked numbers will not be connected even if they are on a user's personal list. For instance, "Blocked" numbers may include home telephone numbers of prison guards, wardens, indictment witnesses, trial witnesses, police officers and judges. This list may supplement and supersede the list of blocked numbers in the facility telephone number control screen 1700 described above. Approved numbers are connected even if they are not on the user's personal list. Numbers can also be assigned an "Exclude" designation 1804 set to exclude. Excluded numbers are not included in any lists or filters generated using wildcards. The number of extra digits dialed field 1805 can be used to limit the number of digits a user is allowed to enter after a telephone call has been connected to prevent a user from achieving an unauthorized connection or for certain gaming telephone options.

A number of days field 1807 is used to set the number of days that a number is actively on a user's list. In this example of the invention, setting number of days to '0' will cause the number to be active on the list indefinitely. Any number greater than '0' will cause the number to be active for only that amount of days, starting from when the number was added to the list as indicated by Date field 1809.

Comment field 1811 is used to describe the number or the reason the number is on the list. User field 1813 indicates the user security level needed to add/edit a number on this screen. In this example, user field 1813 cannot be modified.

Figure 19:
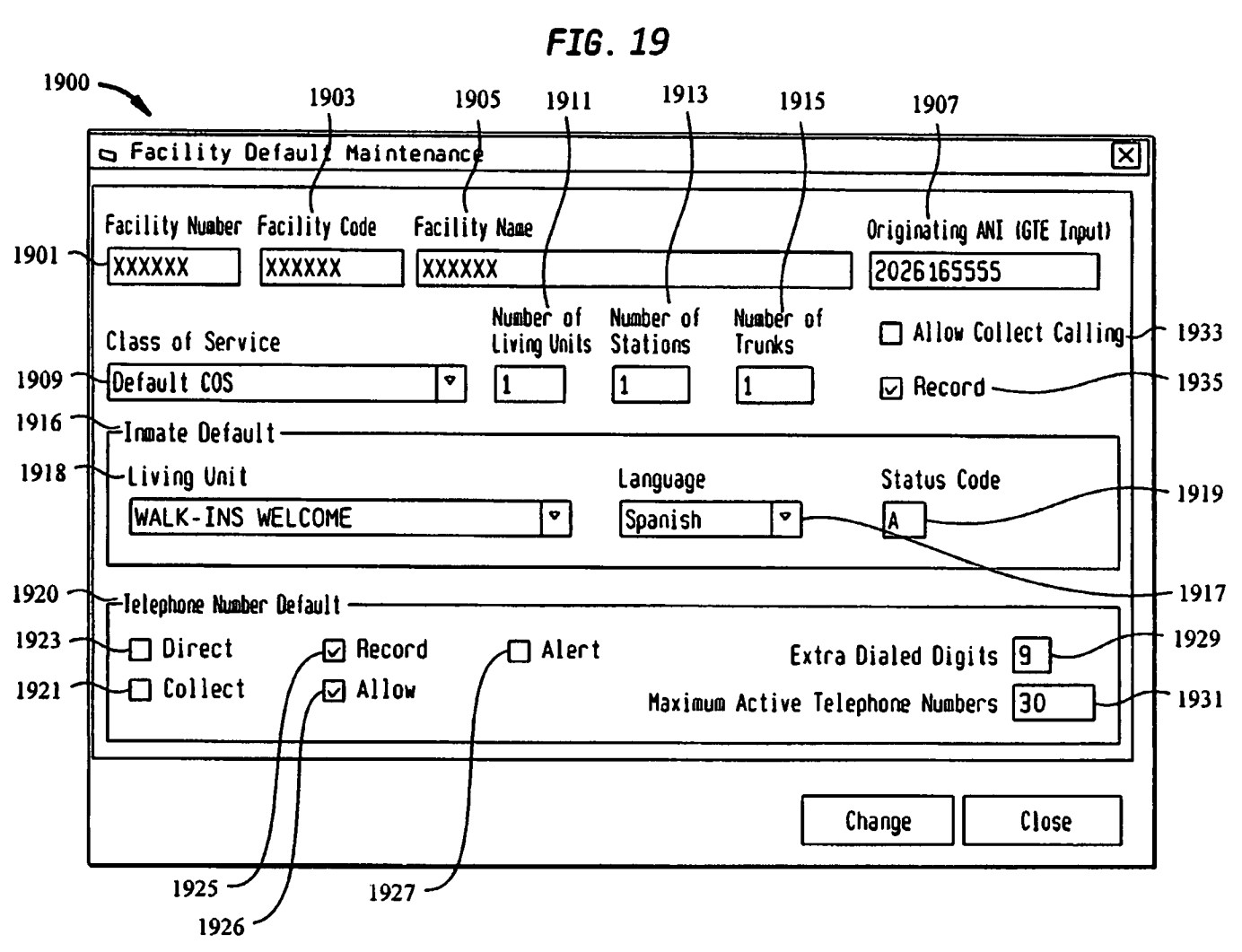

Referring next to FIG. 19, shown is an example default maintenance screen 1900. At the top default maintenance screen 1900 are facility number field 1901, facility code field 1903 (automatically generated three-letter designation code), facility name field 1905, and originating ANI field 1907. Facility number field 1900 indicates the number assigned to the facility to which the options on this screen apply. Similarly, facility code field 1903 contains a three-character designation automatically assigned to each facility. Facility name field 1905 indicates a user-specified name assigned to each institution. ANI (Area Number Identified) field 1907 displays the caller's telephone number. Basically, the originating ANI data identifies the source of a call. Despite having multiple lines, a facility might only have one ANI so that all calls are identified the same way. The ANI field is useful for cross-referencing invoices received from local exchanger carriers or Inter-Exchange carriers to the institution.

A class of service parameter 1909 allows an authorized user to choose a specific class of service from a drop down list (e.g., "Default COS", "COS 1", "COS 2", etc.). Number of living units field 1911 indicates the number of living units in each facility. Number of telephone stations field 1913 displays the number of telephone terminals in use in each living unit. Number of trunk lines field 1915 indicates the number of trunks available at the facility.

Facility default maintenance screen 1900 additionally includes user default block 1916. In the example of FIG. 19, user default block 1916 is an inmate default block 1916. Inmate default block 1916 contains living unit menu 1918 from which different living units can be chosen. For each living unit accessible from living unit field 1918, the default language can be selected from language field 1917. Status code field 1919 contains a letter associated with specific features of the institution.

Telephone number block 1920 contains the default settings used for all telephone numbers in class of service field 1909. Direct call field 1923 indicates if direct call access is allowed. Similarly, collect call field 1921 indicates if collect call access is allowed. Record field 1925 indicates if calls are to be recorded. Allow field 1926 indicates if added telephone numbers are to be allowed by default. Alert field 1927 indicates if all telephone numbers added under this particular class of service are to be, for instance, monitored by investigators. Additionally, telephone number default block 1920 also contains an extra dialed digits field indicating the number of digits that a user may press after a call has been connected and a maximum active telephone numbers field 1931 indicating the number of allowed telephone numbers on any user's list.

FIG. 20 depicts an example of a multiple telephone list update screen 2000. Multiple telephone list update screen 2000 is used to rapidly add several telephone numbers to an inmate's account in a manner that allows an authorized user to see which options have been chosen for each number simultaneously. The information display includes multiple fields. Register number field 2023 displays the unique eight-character number associated with each user authorized under the call management system to place outbound telephone calls. Name field 2001 includes sections indicating a user's first name, last name, and middle initial. Maximum active telephone numbers field 2003 displays the maximum numbers that a user may have on their individual telephone list. Telephone number field 2005 displays the telephone number for which options are being set. New numbers can be added in this field or old ones may be modified. Comments field 2006 can be used to add any information significant to the telephone number listed in telephone number field 2005. Called party language field 2009 is used to select the language used for voice prompts that interface the called party. Record field 2007 can be selected if all calls placed to the specific number are to be recorded. In this example of the invention, all calls are recorded by default. Alert telephone number field 2011 indicates if the telephone number is to be monitored and or subject to additional scrutiny, for instance, to a suspected accomplice. Extra dialed digits field 2021 indicates the number of digits a user may enter after a telephone call has been connected.

Multiple telephone list update, screen 2000 additionally contains fields limiting access to different call methods. Allow field 2013 is used to indicate if a user is authorized to contact the specified number. A not allow reason field 2015 allows a comment to be added indicating why the number is blocked. Collect field 2017 indicates if a user can access the number utilizing collect call means. Similarly, direct field 2019 indicates if a user can access the number utilizing direct call means.

Depicted in FIG. 21 is a sample first level called party number control screen 2100. Called party number control screen 2100, accessed from a main screen, provides authorized users the ability to view or define a list of telephone number list 2115 for either collect and/or direct dial numbers with flags in a flag status column 2121. Each telephone number can be modified in the telephone number field 2115. Flagged field 2121 is selected if a telephone number block or restriction is activated, for instance, if a called party requests that future calls placed by an inmate or user are subject to restricted times of day or altogether blocked.

Referring next to FIG. 22, shown is a view calls in progress screen 2200 that enables a call system administrator to oversee a list of calls currently in progress. Each telephone station's status is indicated by activity icon 2202 in the first column shown on view calls in progress screen 2200. A number of column headings are used to indicate the different statuses of each telephone terminal. An alert column displays "Yes" if the called number has caused an alert or "No" if the called number has not caused an alert. Recorder channel column 2203 indicates the recorder channel being used for each telephone conversation currently in progress. Living unit column 2205 displays the living unit from which the call is being placed. Register column 2207 displays the user utilizing each telephone station. Name column 2209 displays the user's name associated with the register number displayed in register column 2207. Time column 2211 indicates the time a call was initiated. Duration column 2213 displays the amount of time a call has been in progress.

Figure 23:
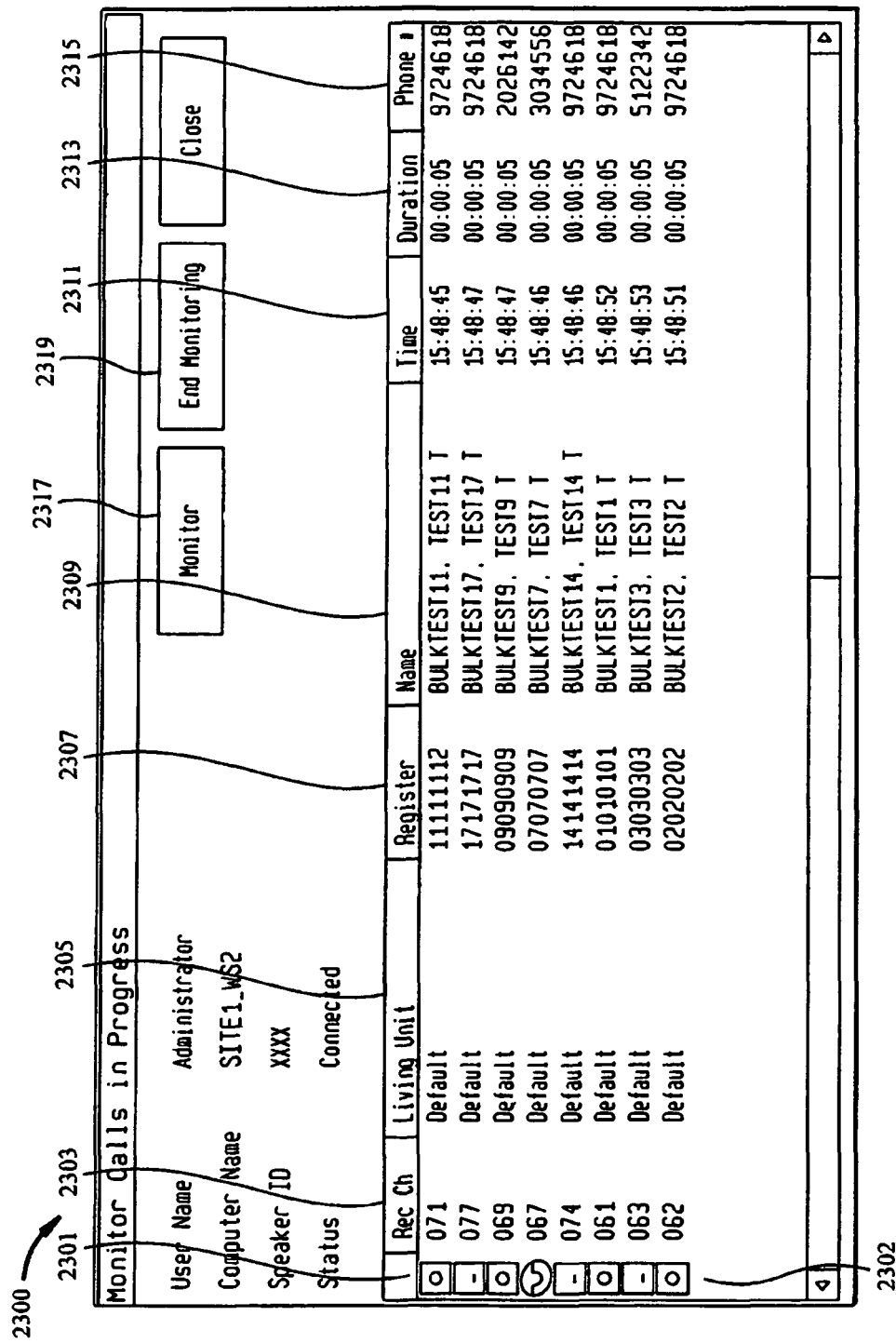
FIG. 23 depicts a sample monitor calls in progress screen for use with software contained in the call management system of an embodiment of the invention.

Now referring to FIG. 23, shown is an example of a monitor calls in progress screen 2300 that is part of the system administrator software. Call monitoring allows the institution to listen in on specific calls. This is done through the skybox devices. Neither the user nor the recipient of the call will be able to detect any change in sound quality to indicate that a call is being monitored. Each telephone station's status is indicated by icon 2302 in the first column 2301 shown on view calls in progress screen 2300. A number of column headings are used to indicate the different statuses of each telephone terminal. An alert column displays "Yes" if the called number has caused an alert or "No" if the called number has not caused an alert. Recorder channel column 2303 indicates the recorder channel being used for each telephone conversation currently in progress. Living unit column 2305 displays the living unit from which the call is being placed. Register column 2307 displays the user utilizing each telephone station. Name column 2309 displays the user's name associated with the register number displayed in register column 2307. Time column 2311 indicates the time a call was on-hook. Duration column 2313 displays the amount of time a call has been in progress. Phone number column 2315 indicates the number being called from each telephone terminal. Monitor calls in progress screen 2300 may also include additional fields indicating station ID, line number, etc.

By clicking monitor button 2317, an authorized software user may monitor live telephone conversations selectively. End monitoring button 2319 is used to end live monitoring.

Figure 24:
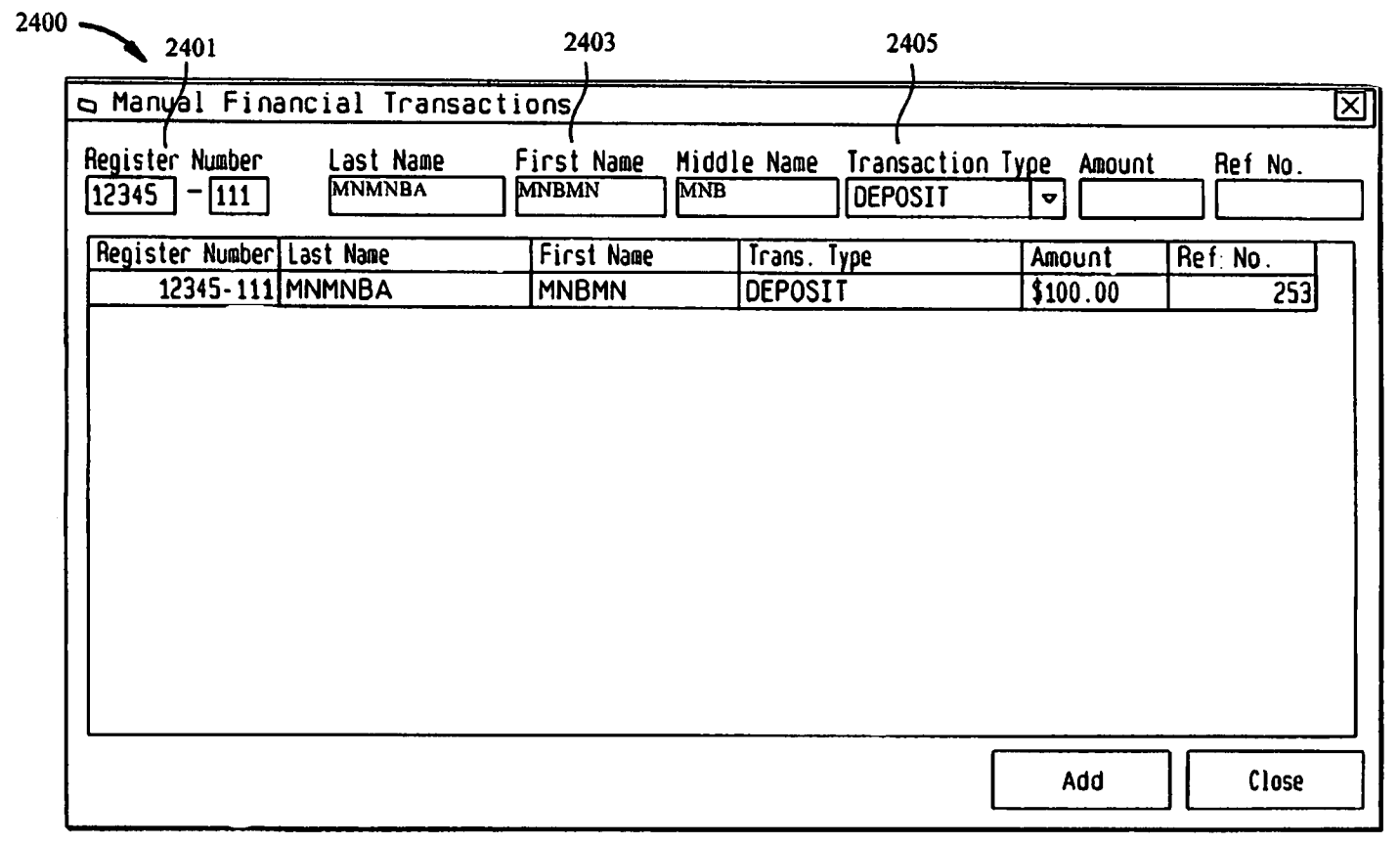

Now referring to FIG. 24, shown is an example of a manual financial transaction screen 2400. Manual financial transaction screen 2400 allows prison staff members to manually transfer funds in or out of an inmate's financial account. Register number field 2401 displays the unique eight-character number associated with each user of the call management system. Name field 2403 includes sections indicating a user's first name, last name, and middle initial.

Transaction type field 2405 indicates the type of transaction selectable from a list. The selection may be deposit, withdrawal, exception, amount of transaction, reference number, etc. Upon completing all manual transactions for a user, a manual transactions report will be generated automatically.

Manual financial transactions screen 2400 is also used to close a user's account. This is done by setting transaction type 2405 to "release". When a user is released using the manual transaction screen, the user's account status automatically changes to inactive, and assuming the user is not using the account at the time, the remaining balance is transferred to a commissary account. No further calls or transactions will be possible with this account while their status remains inactive. In addition, a record of this release will automatically be made on the user release report.

Figure 25:
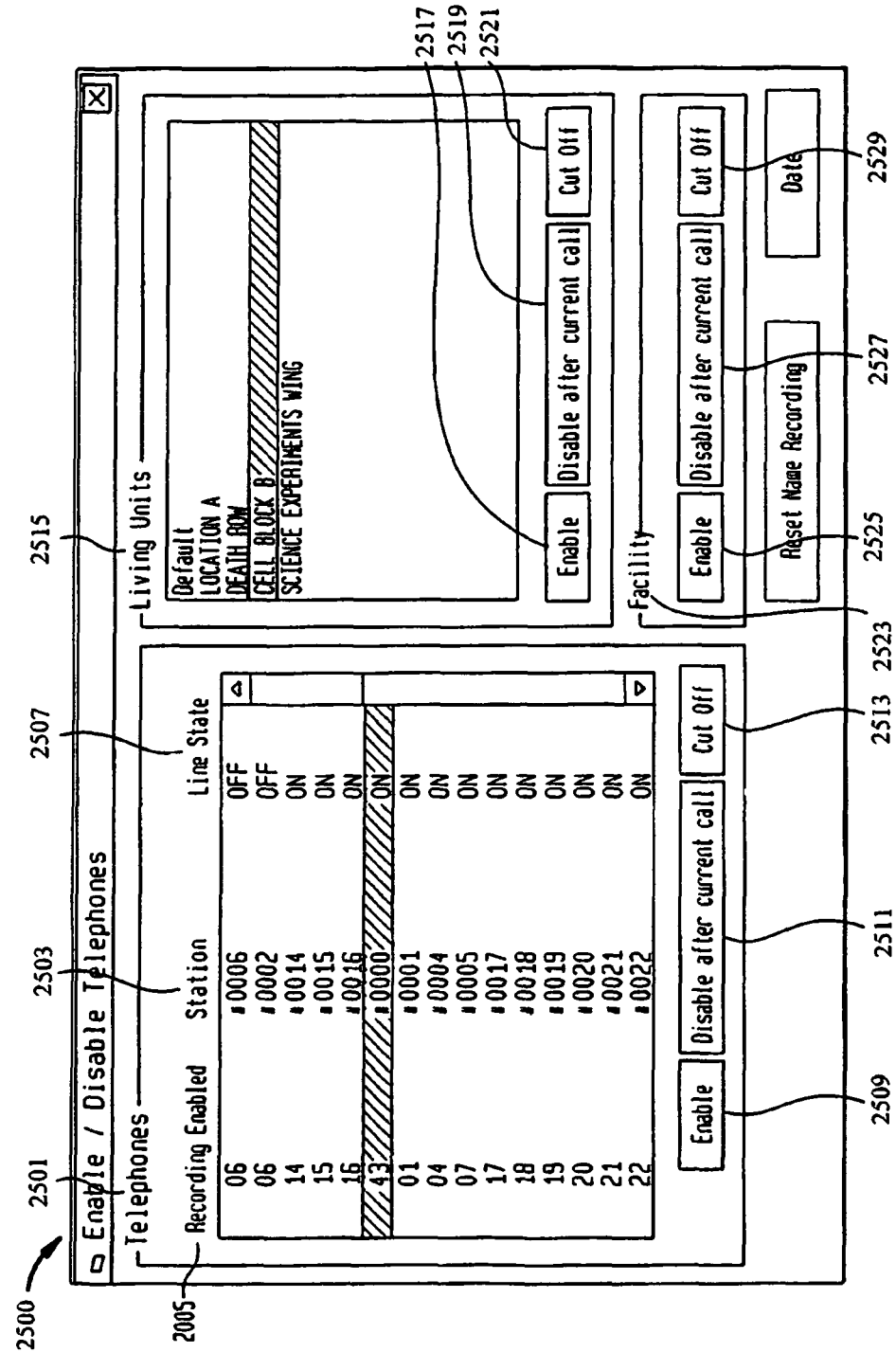
FIG. 25 depicts a sample enable/disable telephone screen for use with software contained in the call management system of an embodiment of the invention.

FIG. 25 depicts an example of enable/disable telephones screen 2500. The leftmost portion of the screen, telephone block 2501, contains three fields. Station number field 2503 indicates the number assigned to each telephone terminal. Recorder channel number field 2505 indicates the recorder channel assigned to each telephone station. Line state field 2507 indicates the hook status of each telephone station. A telephone terminal can be enabled by selecting the proper station number and choosing enable button 2509. Disable after current call button 2511 is used to disable telephones after the line state status field 2507 indicates an "off" status whereas cut off button 2513 is used to disable calls currently in progress.

Enable/disable telephones screen 2500 also allows authorized users to enable/disable all calls at the living unit level or the facility level. Living units block 2515 is used to control the line state status of all phones in each living unit. Telephone terminals are enabled by choosing enable button 2517. Disable after current call button 2519 is used to disable telephones after all telephone stations are free whereas cut off button 2521 is used to disable all telephones even if calls are in progress.

To enable/disable telephones at the facility level, buttons in facility block 2523 are utilized. Telephone terminals are enabled by choosing enable button 2525. Disable after current call button 2527 is used to disable telephones after all telephone stations are free whereas cut off button 2529 is used to disable all telephones even if calls are in progress.

Now referring to FIG. 26, shown is sample user manager screen 2600 which is utilized to control a self-contained application used for assigning access privileges to software users. Only authorized staff may access the telephone system. In addition, their access is limited to only those facilities for which they are responsible, unless granted increased access by a higher security level. The user administration option include a user manager and screens to set security level access and user alerts. Username column 2601 indicates the different authorized users. User names typically indicate security level, such as "guest", "administrator", etc. Full name column 2603 typically displays the first, middle, and last name corresponding to each username. Description column 2605 displays a brief description associated with each username.

Different lists of users are accessed from the groups block 2607, typically located at the bottom of the screen. User groups may include, but are not limited to, account operators 2609, administrators 2611, backup operators 2613, and guests 2615. Each user group may additionally be given a selection. User security profiles and groups can be modified by double clicking on the desired user or group.

Figure 27:
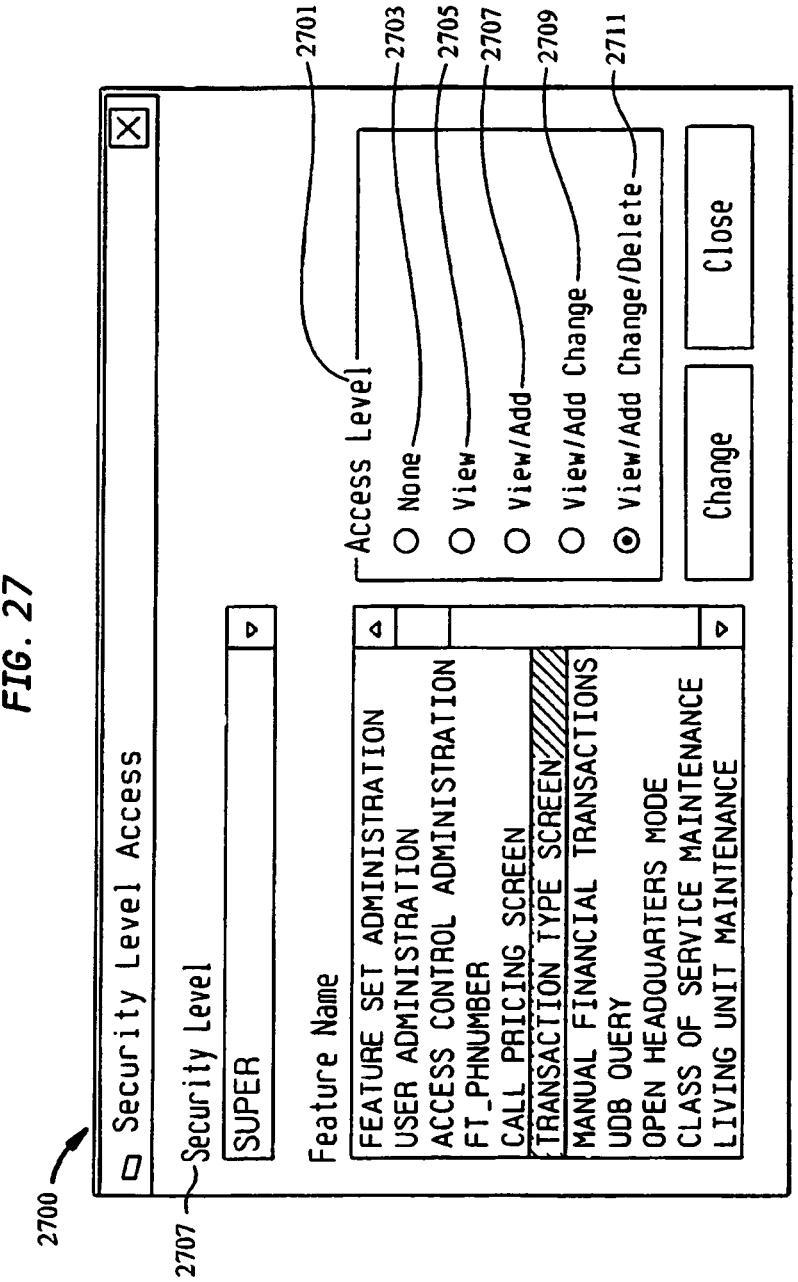
FIG. 27 depicts a sample security level access screen for use with software contained in the call management system of the preferred embodiment of an invention.

Referring next to FIG. 27, depicted a sample security level access screen 2700, which is available from the main menu of the user manager software. Security level field 2707 determines how much access a prison staff member has to work with information and modify settings in the call management system. For each security level, the access capabilities may be set for each feature, selectable from access level block 2701. If "none" selection 2703 is selected, a user is denied access to the system. The "view" selection 2705 allows users with this security level to only view user profiles and other features of the system. The "view, add" selection 2707 allows users with this security level the added ability to add new phone numbers to the software. The "view, add, change" selection 2709 allows users with this security level the added ability to change settings within system. The highest level of access afforded to users is granted by selecting the "view, add, change, delete" selection 2711 which allows full control over the software. Security level field 2707 includes selections such as monitor, unit operator, investigative, technician, supervisor, COF operative, etc.

Figure 28:
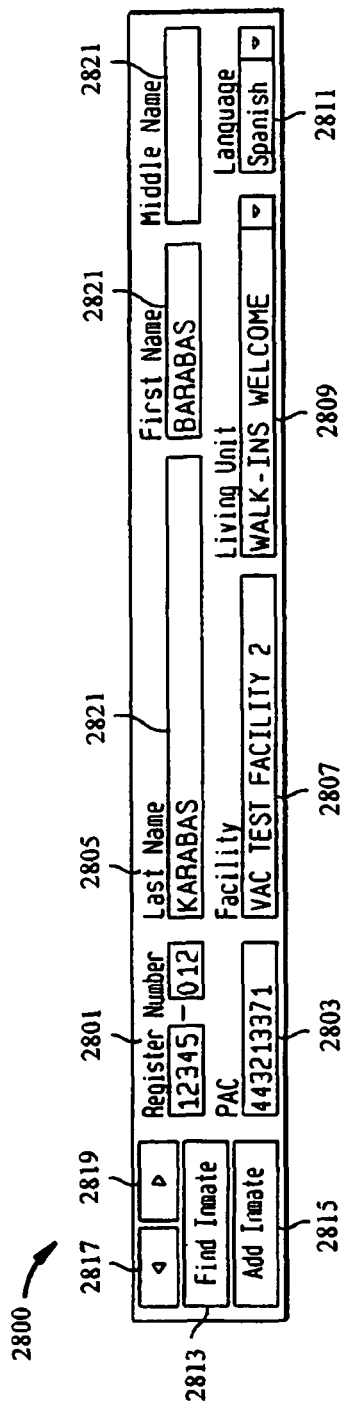
FIG. 28 depicts a sample user information screen for use with software contained in the call management system of an embodiment of the invention.

Now referring to FIG. 28, shown is a sample user information screen 2800 displayed at the top of every page of an inmate's account information. Users establish an account to have funds for telephone transactions. In order for a user to place a direct dialed call, a user must have sufficient funds in an account to pay for at least a three-minute call. For example, in a correctional facility, this account is separate from the user's commissary account, which is the inmate's general prison spending account. However, a user may transfer money from their commissary account into a user-specific account. Alternatively, a prison staff member can perform a manual transaction. At no time will an account balance be allowed to drop below zero.

A user must have a system account established in order to make telephone calls from a specific facility. This information will be stored on the site server which may be integral or remote from the call system architecture. When an inmate is transferred from one facility to another, only the inmate's account information, COS, and telephone lists are transferred to that facility. In addition, the centra server maintains detailed records regarding flagged called numbers and transfer to the new facility a flag list, for instance in the form of a list of flagged called party numbers in local user profile 354 described herein. However, previous information may remain in an archived database or other storage system.

Register number field 2801 contains an eight-digit number unique to each user. Although eight digits are utilized for the invention, numerous character strings may be utilized depending on the number of intended users. A name field lists the user's first, last, and middle name. Facility field 2807 indicates the facility at which the user is located. Living unit field 2809 indicates the living unit in which a user is located. A language field 2811 is used to select the language of voice prompts used by the call system. Personal identification number field 2803 displays the user's PIN used to access the call system. The PIN may be used in conjunction with biometric authentication and/or RF authentication. The latter two types of authentication are processed using additional software. The PIN is a confidential number. Should the number be lost or stolen, a new PIN should be assigned as soon as possible to prevent fraud. A unique PIN will be selected from a national pool of numbers and assigned to the user.

In the example of a penitentiary, a find inmate button 2813 allows access to an inmate's account from any page on the inmate account information screen. User accounts can also be added from this screen via the Add Inmate (or Add User in other embodiments) button 2815. Using the ">" button 2817 and "<" button 2819 buttons allows for easy navigation through inmate profiles.

Figure 29:
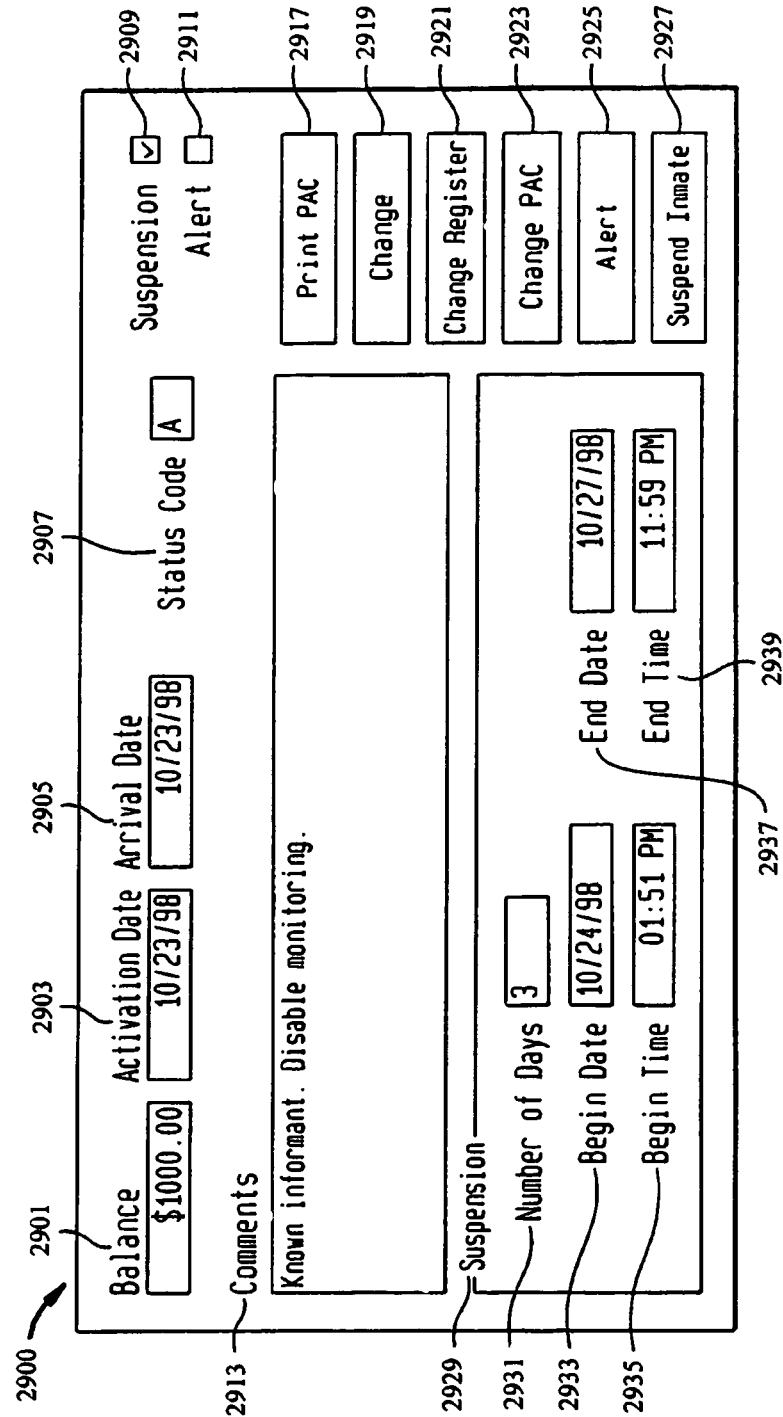
FIG. 29 depicts a sample account screen for use with software contained in the call management system of an embodiment of the invention.

FIG. 29 depicts a sample account screen 2900 which is used to monitor a user's account balance and suspension status. A user's financial account is used to pay for direct dialed calls from their account. This is separate from any money a user may have in their commissary account. When placing a direct dialed call, a user must have a large enough balance, displayed in balance field 2901, to pay for at least a three minute call, or they will be informed that they have insufficient funds to place the call.

The account activation date field 2903 indicates the date a user's account was originally created. It is supplied automatically by the program and cannot be modified. Financial and call records for an inmate should be available back to this date. In the present example, the most recent data is kept locally on the site server, unless the inmate had been transferred within that time, in which case only the data since the transfer is kept.

The date of arrival field 2905 displays the date that an inmate arrived at their current facility. The date of arrival is automatically generated when an inmate is transferred to a new facility.

Inmates may be assigned a status code, displayed in status code field 2907, to help separate them into various classifications. The status code is a single letter code from A-Y. The definitions for these codes are established by the central site server. In one embodiment, a status code 'Z' indicates that the inmate has been released, and their account is inactive. Status 'Z' cannot be set manually. It is done automatically once an inmate has been released using the manual transaction screen. An account with a status code 'Z' cannot be used to make calls or process transactions from that facility.

Suspension field 2909 indicates whether or not a user's calling privileges are suspended. Similarly, alert field 2911 indicates a user's current alert status. Comments field 2913 can be used to display any information regarding a user's financial, alert, or suspension status.

Buttons located in the lower right corner of account screen 2900 are used to modify a number of user settings. Print PAC button 2917 is used to print a user's current PIN or other access number. Change button 2919 is used to modify data such as user name, living unit, user language preference, status code, and comments. Change register button 2921 allows authorized personnel to change a user's identification number. Change PAC button 2923 is used to modify a user's current PIN. Alert button 2925 toggles alert field 2911. Finally, suspend inmate button 2927 is used to toggle suspension field 2909.

The prison staff has the capacity to temporarily suspend an inmate's calling privileges using suspension block 2929. Number of days field 2931 is used to set the length of a user's suspension. Begin date field 2933 and begin time field 2935 are used to input the respective date and time that a user's suspension is to begin. Similarly, end date field 2937 and end time field 2939 are used to input the respective time and date a suspension is to end. Information regarding an user's last suspension remains displayed in suspension block 2929 even after the suspension has expired.

FIG. 30 displays a sample financial history screen 3000, which includes all call system financial transactions for the inmate's account during the year and month selected in year field 3002 and month field 3004. A date column 3001 displays the date of each financial transaction. Time column 3003 displays the hour at which each financial transaction occurred. Type column 3005 indicates the type of each transaction (e.g., deposit, withdraw, refund, etc.). Amount column 3007 displays the monetary amount involved in each financial transaction. Balance field 3009 displays the resulting balance after each financial transaction has occurred. Facility column 3011 displays the facility location at which the transaction occurred. Reference number column 3013 indicates the specific reference number assigned to each financial transaction. User column 3015 displays the system user that authorized each financial transaction.

Financial transaction screen 3000 also includes a number of buttons located in the upper right hand corner. Display button 3017 refreshes the financial transaction list for the month and year selected. Display button 3017 must be pressed each time the year and date are changed. Current month button 3019 brings up financial transaction data for the current month. Sort order button 3021 determines the order in which the information will be displayed. In this embodiment, the choices are date/time (ascending or descending), or transaction type/date/time (ascending or descending). Refund button 3023 is used to perform a direct dial call refund.

FIG. 31 displays a sample call records screen 3100 which includes everything about each call made or attempted, and whether or not the call was successful. The range of dates listed is determined by year field 3101 and month field 3103.

Date column 3105 displays the date of each financial transaction. Time column 3107 displays the hour at which each financial transaction occurred. Dialed digits column 3109 indicates the sequence of digits used during each phone call. Duration column 3111 displays the time in minutes of each phone call and charge column 3113 indicates the resulting cost of the call. Charge type column 3115 indicates the calling method used for each telephone call (e.g., direct call, collect call, international, etc.). Call result column 3117 displays the appropriate completion code for each call. A completion code is chosen from a pre-assigned code list indicating possible outcomes of telephone calls. Recorder column 3119 displays the recorder used for each call. Alter type column 3121 indicates the type of alert triggered, if any. For instance, if a call was placed to a flagged called number (e.g., as stored in database 352), column 3121 may include the text "FLAGGED." In other examples, if a call was placed to a number that was noted for monitoring for a particular reason, the column 3121 may include appropriate notation.

Figure 32:
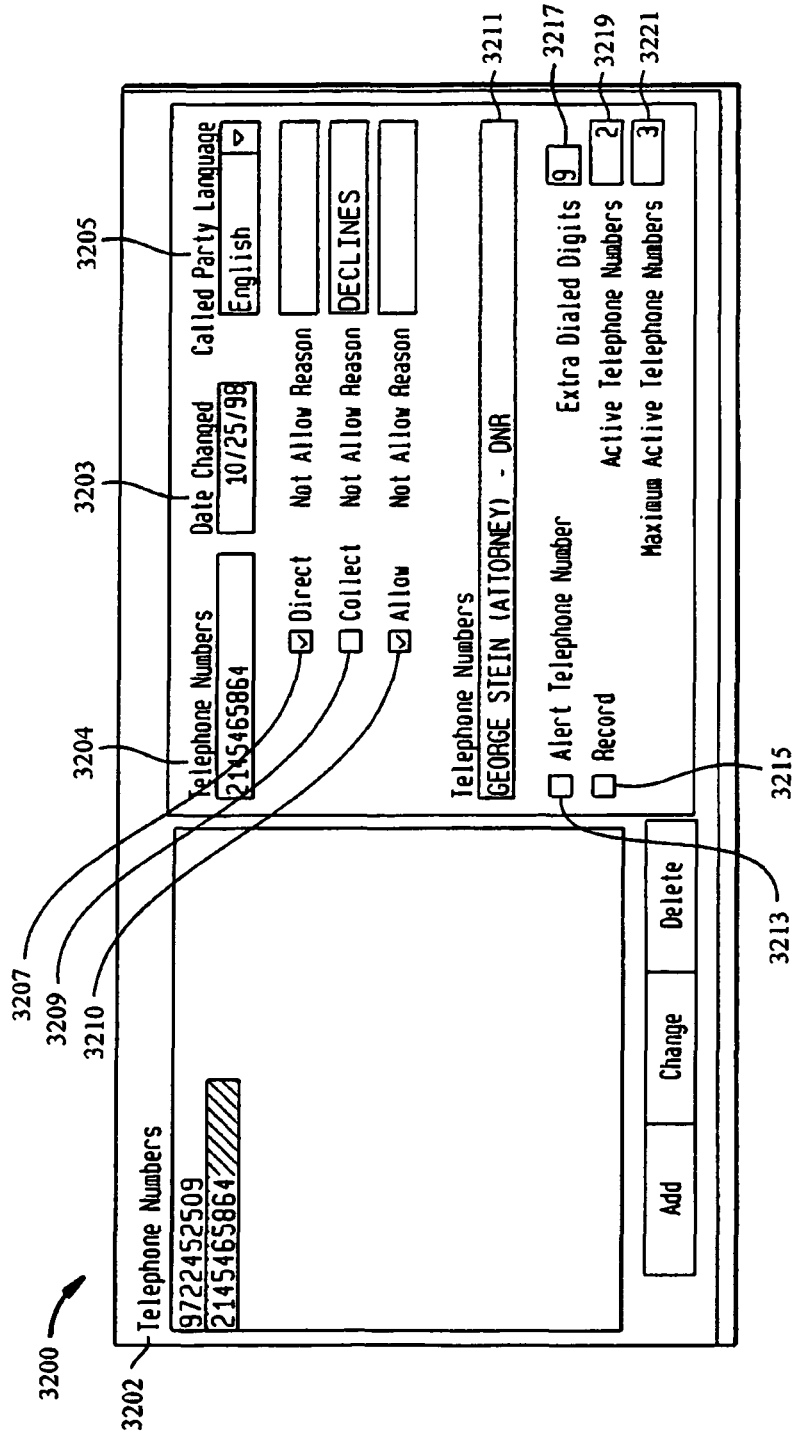
FIG. 32 depicts a sample telephone list screen for use with software contained in the call management system of an embodiment of the invention.

Displayed in FIG. 32 is a sample telephone list screen 3200. A user's list of telephone numbers is displayed in telephone number list 3202. By selecting a particular telephone number from this list, its associated information (i.e., name of party, whether to record those calls, etc.) can be edited using options located on the right hand portion of telephone list screen 3200. Telephone number field 3204 is used to change the digits in each telephone number. Date changed field 3203 indicates the last time telephone number information was modified. Called party language field 3205 indicates the language of voice prompts used to interface the called party. Direct dial field 3207 is used to select if direct dial calls are allowed for the telephone number listed in telephone number field 3204. Collect call field 3209 is used to select if collect calls are allowed. Allow field 3210 is used to set the telephone number to a user's allow list. Comments field 3211 is utilized to store any extra information concerning the called party. Alert telephone number field 3213 is used to toggle an alert flag on the telephone number. If this field is checked, then the telephone number may be a called party telephone number subject to further monitoring. Record field 3215 is used to indicate if telephone conversations are to be recorded. Extra dialed digits field 3217 indicates the number of extra digits allowed after a call is connected. Active telephone numbers field 3219 displays the number of telephone numbers currently on a user's active list Maximum telephone numbers field 3221 displays the maximum amount of telephone numbers that may be on a user's list at any given time.

Shown in FIG. 33 is a sample call limit status screen 3300 containing three separate sections. The number of calls block 3301 displays information relating to the number of calls placed. Number of calls block 3301 is divided into a collect section 3303, direct section 3305, and total section 3307. For each section, there is maximum column 3309, used column 3311, and a remaining column 3313. Additionally, each section contains today row 3315, "this week" row 3317, and "this month" row 3319. The intersection of these rows in columns forms nine fields in each section for a total of twenty-seven fields in each block. The additional blocks are a number of minutes block 3321 and a number of inquiries block 3323.

Figure 34:
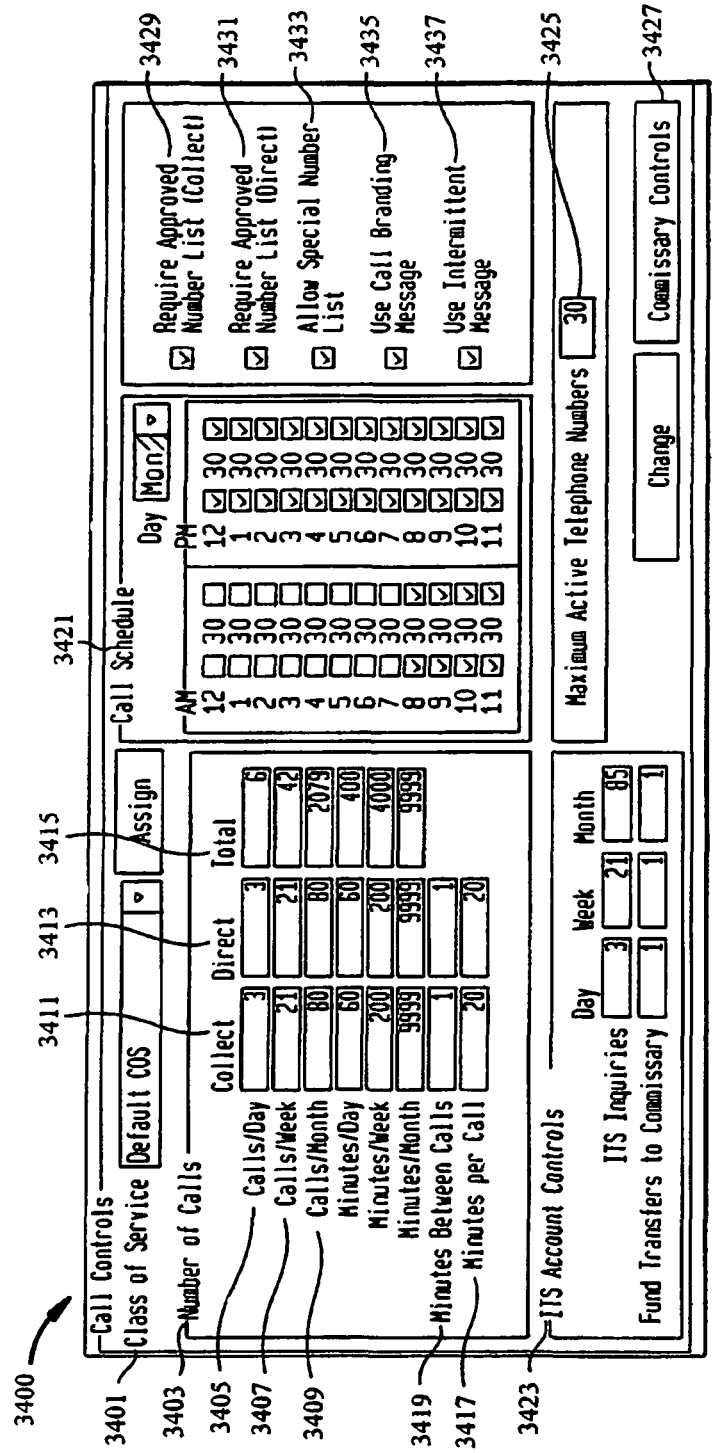
FIG. 34 depicts a sample access control screen for use with software contained in the call management system of an embodiment of the invention.

FIG. 34 depicts a sample access control screen 3400 in which the calling limits and permissions are set, usually by assigning a predefined COS to the inmate. Initially, the COS assigned to an inmate account is the default COS for the living unit they have been assigned to. In addition, all the settings and permissions may be customized for the inmate manually.

Call access control block 3403 contains collect column 3411, direct call column 3413, and total column 3415. Corresponding to these columns are a number of rows. At the intersection of the rows and columns a number of fields are formed. Calls/Day row 3405 is used to enter the number of collect, debit, and total calls allowed per day. Calls/Week row 3407 is used to enter the number of calls allowed per week. Calls/Month row 3409 is used to enter the number of calls allowed per month. A minutes between calls row 3419 indicates the amount of time that must lapse between calls before another can be made. Minutes per call row 3417 is used to enter the maximum duration allowed for each telephone call.

Call schedule block 3421 determines when the inmate may use the telephone system. For each day of the week, selected from the day drop down list, there is a checkbox for each half hour period of time. If checked, calls are allowed to begin during that half-hour. For instance, if 9:30 PM is checked, calls can begin anytime from 9:30-9:59:59 PM.

ITS access control settings block 3423 determine how many times inmates may perform an inquiry for each day, week, or month.

Maximum active telephone numbers field 3425 limits the number of telephone numbers on the inmate's approved list. Commissary controls button 3427 switches screens to allow control of when and how often inmates may access the commissary system and transfer funds.

A number of check box fields are also located on this screen, including require approved number list (collect) field 3429, require approved number list (direct) box 3431, allow special number list 3433, use call branding message 3435, and use intermittent message 3437.

Branding allows a pre-recorded message to be played for the called party at the beginning of every call to announce, "This call is from a Colorado Correctional Facility." This message can be set for the individual inmate, a living unit, or all inmates at a facility. Call branding may be turned on or off at the discretion of the prison staff.

Much like call branding, intermittent messages play the pre-recorded message "This call is from a Colorado Correctional Facility" throughout the call. How often the message plays is randomly determined, within a set minimum and maximum duration between plays.

The Shadow software provides the capability to digitally record, store, playback and execute a possible keyword search. Shadow resides on a separate site server providing flexibility in implementation and sizing of the system. It can simultaneously record conversations from all telephones installed at a site regardless of the size of the site. As an integrated part of the system, the Shadow software is completely transparent to the user. An intuitive user interface is provided for playback of the conversation.

Figure 35:
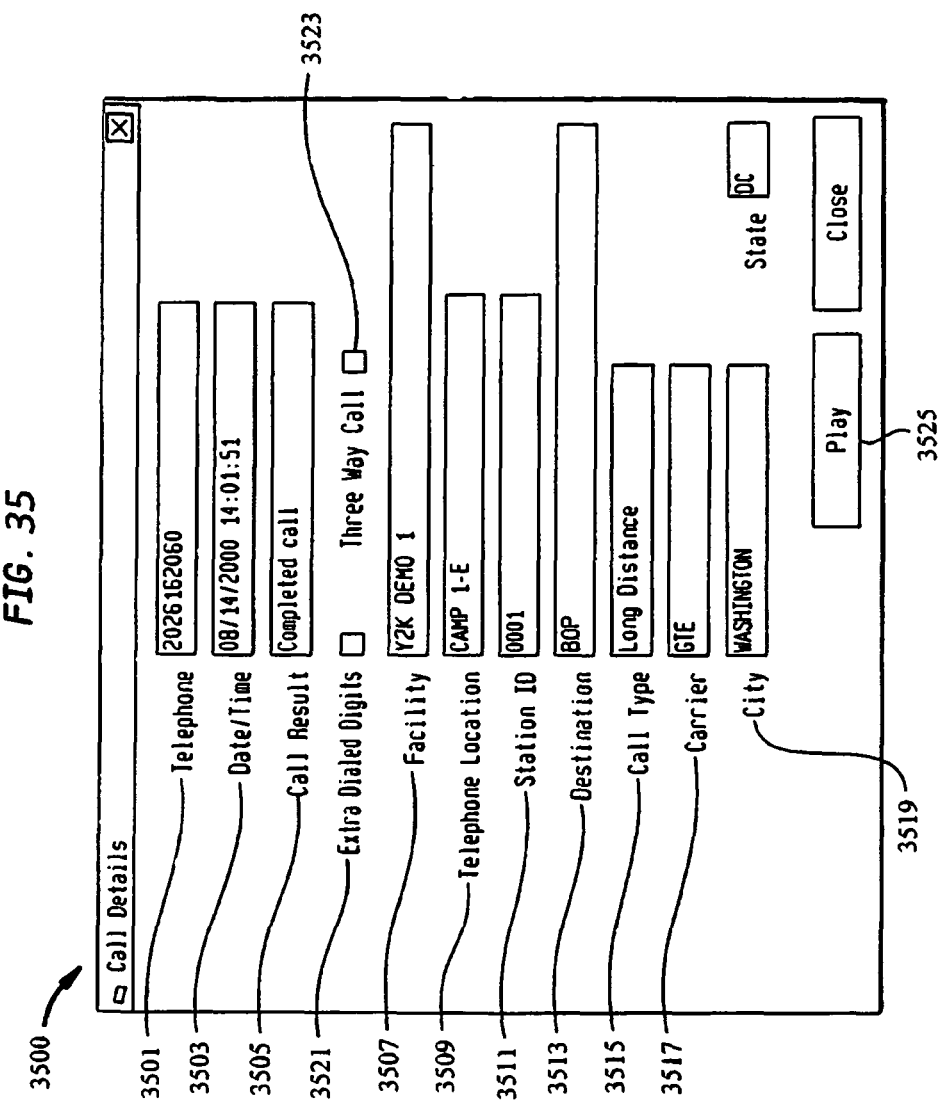
FIG. 35 depicts a sample call detail screen for use with software contained in the call management system of an embodiment of the invention.

The call records screen, (FIG. 31), is used to access the Shadow software. Each call record can be played by double-clicking on the desired call record. This example call detail screen is shown in FIG. 35. Call detail screen 3500 contains all details of the selected call. Telephone number field 3501 indicates the number called. Date/time field 3503 indicates the date and time the call commenced. Call result field 3505 displays the final status of completed call. Facility field 3507 indicates the facility from which the call was placed. Telephone location field 3509 displays the living unit from which the call was placed. Station ID field 3511 indicates the particular telephone terminal used to place the call. Destination field 3513 indicates the trunk line used for the call. Call type field 3515 displays the method employed for placing the call. Carrier field 3517 displays the long distance carrier used for the call. City and state field 3519 indicates the location of the placed call. Extra dialed digits field 3521 indicates if extra dialed digits are allowed after a call has been connected. Call details screen 3500 also contains three way call field 3523 used to enable conferencing calling. Clicking play button 3525 allows authorized users access to the shadow software.

Figure 36:
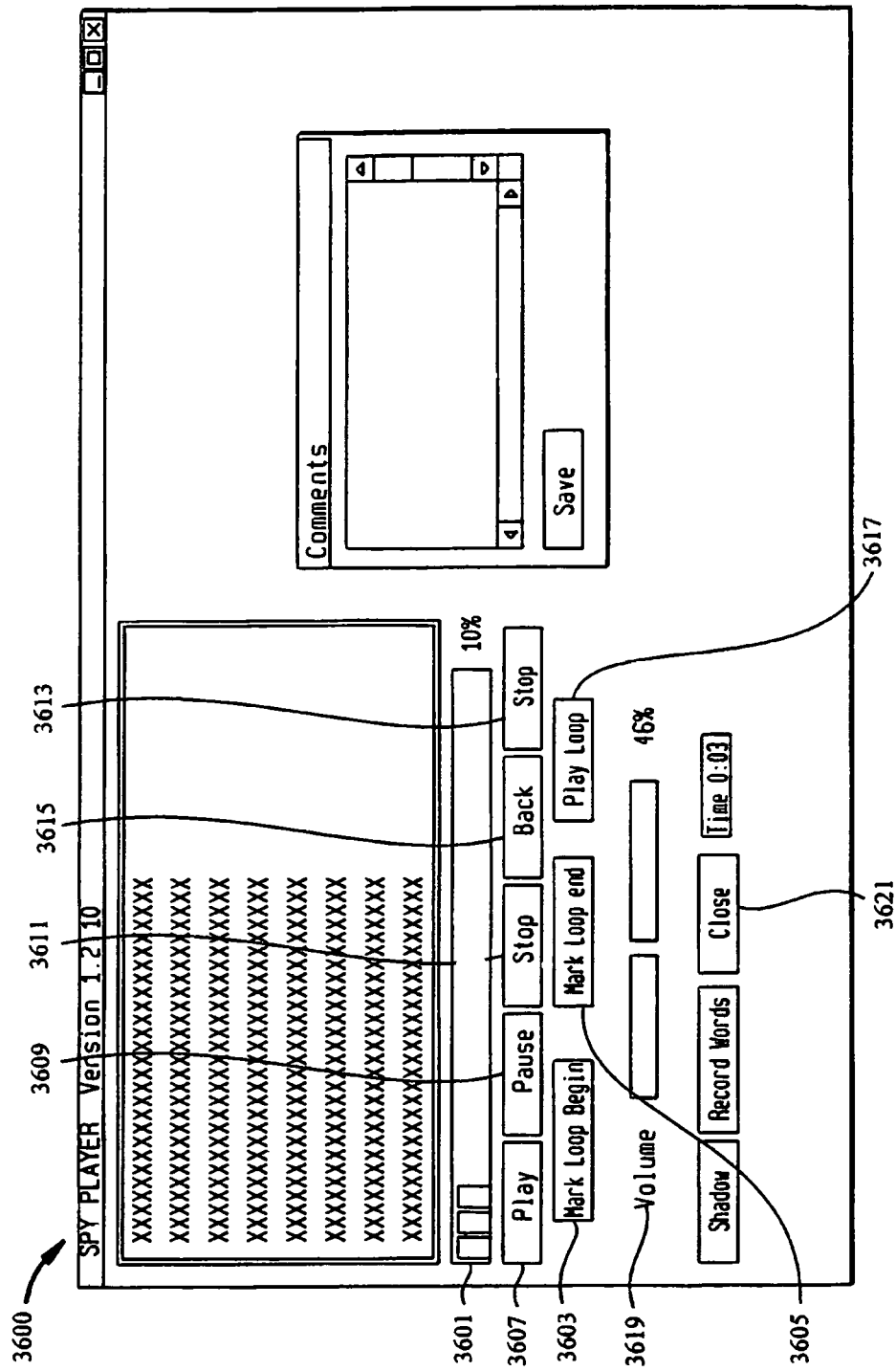
FIG. 36 depicts a sample spy player screen for use with software contained in the call management system of an embodiment of the invention.

FIG. 36 shows an example spy player screen used for controlling the shadow hardware. The top half of the screen provides the user with full control of the software. Percentage bar 3601 at the top of the lower half permits the user to see how far into the conversation he has progressed. This information can be used in conjunction with mark loop begin button 3603 and mark loop end button 3605.

Play button 3607, pause button 3609, and stop button 3611 operate in the typical fashion. Step button 3613 permits users to "fast forward" in the recorded conversation to any point. Playback is automatically resumed when the step button is released. Back button 3615 is used in a similar manner. Mark loop begin button 3603 marks the beginning of a selected segment of the recorded conversation for repeated playback. This feature is extremely useful when a segment of the recorded conversation is not readily understood. Mark loop end button 3605 marks the end of a selected segment of the recorded conversation for repeated playback. This button is grayed out until mark loop begin button 3603 is activated.

Play loop button 3617 is used to replay the portion of the conversation from the mark loop begin to the mark loop end positions. Repeated playback continues until stop button 3611 is depressed. The button is grayed out until mark loop begin 3603 button is activated. Volume bar 3619 permits users to adjust the volume to a desired level. Close button 3621 closes the shadow button and returns the user to the call detail screen (as shown in FIG. 35).

Figure 37:
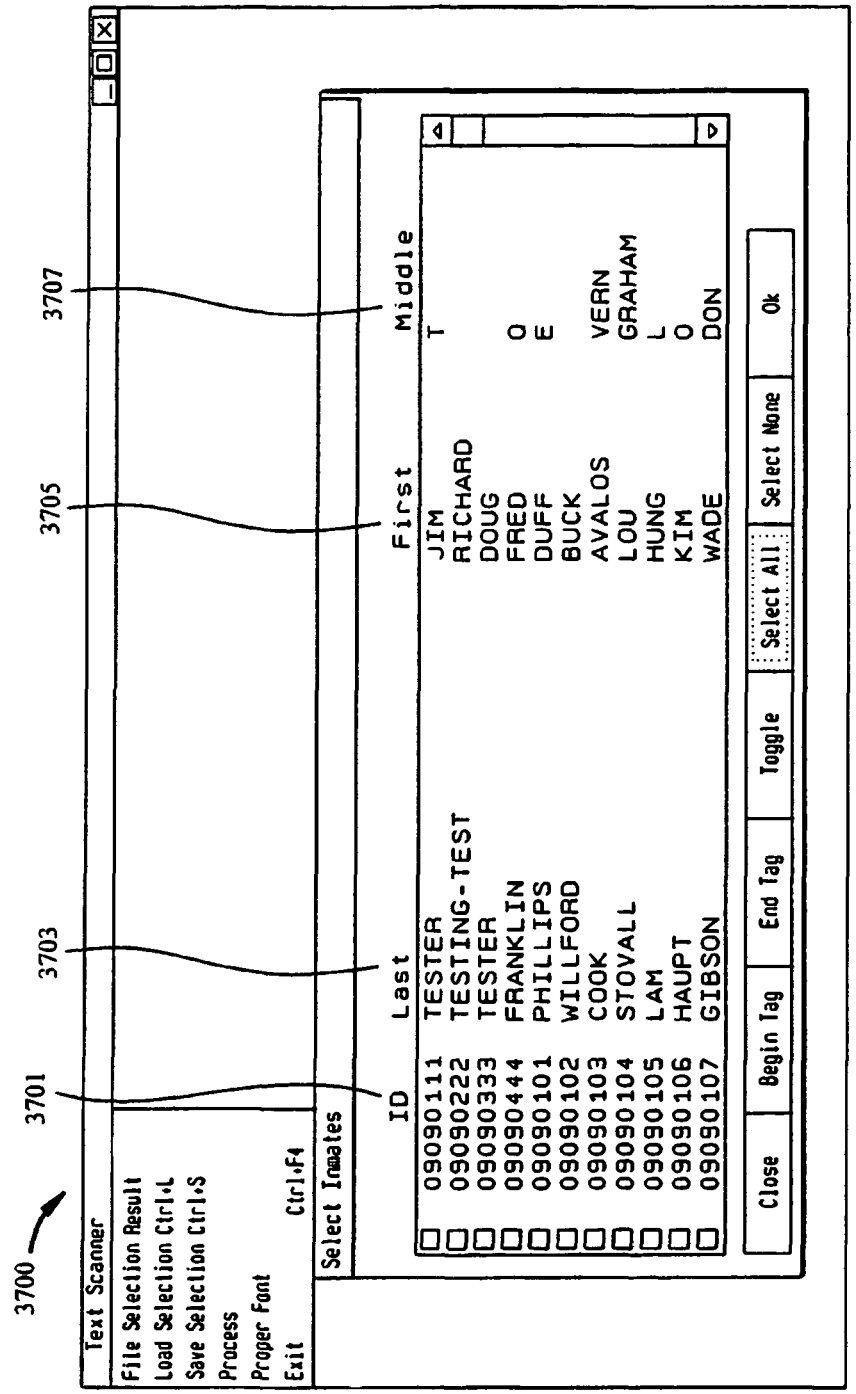
FIG. 37 depicts a sample "text scanner" selection screen for use with software contained in the call management system of an embodiment of the invention.

The Shadow software also incorporates a text scan, which can be used to find a particular call for audio review. A site to search is selected from a drop down list accessed from the main screen of the software. This brings up a text scanner selection screen shown in FIG. 37. Text scanner selection screen 3700 contains a number of columns. Resident ID number column 3701 displays the ID number of each inmate. Last name column 3703 displays the last name of the user. Similarly, first name column 3705 and middle name column 3707 contain the first and middle name of the user, respectively.

After the desired criteria have been chosen from this list, the software executes the text scan and query result screen will appear, as shown in FIG. 38. From query result screen 3800, the desired call can be selected and played back using the Shadow software. Resident ID number column 3801 displays the ID number of each inmate. Date column 3803 displays the date the call was made. Time column 3805 indicates the time at which a call commences. Destination ANI column 3807 displays the sequence of digits dialed. Duration column 3809 displays the time duration of a completed call. Station name column 3811 displays the station identification number of the phone used to place the call.

Figure 39:
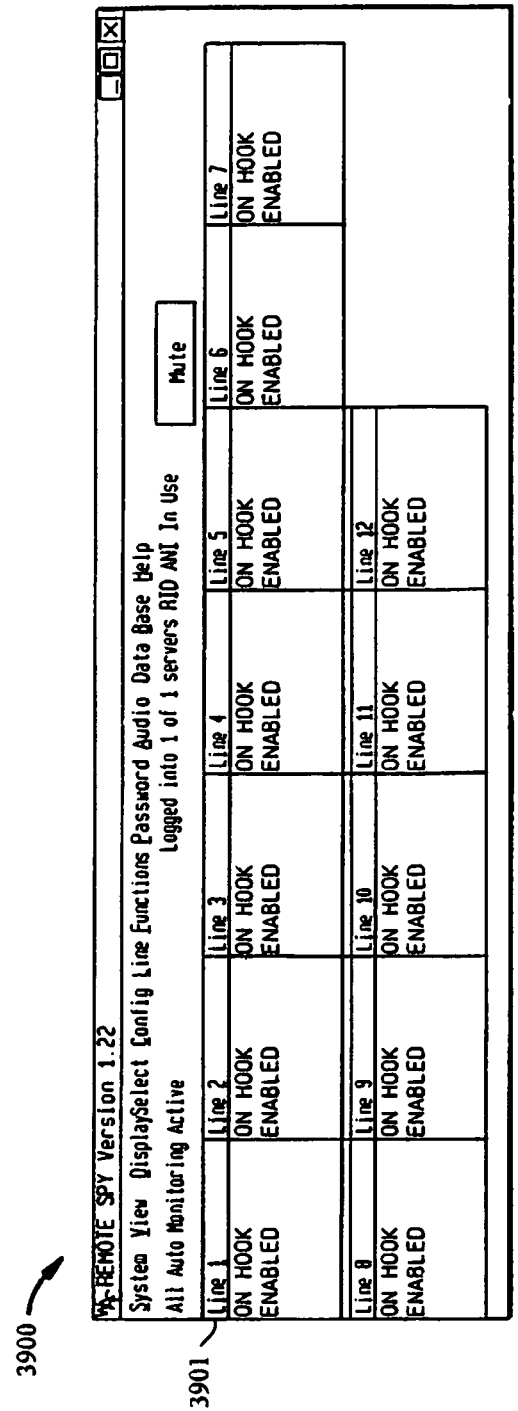
FIG. 39 depicts a sample remote spy screen for use with software contained in the call management system of an embodiment of the invention.

FIG. 39 depicts sample remote spy screen 3900 used to interface the shadow software. It can be used to remotely view all calls in progress. Each telephone line is displayed with its associated status in status box 3901. By double clicking on any telephone line, users can access the details (FIG. 35) of the call showing telephone number of called party, inmate RID, line out, first name, last name, screen block, line enabled or disabled, current status of line, off hook time, and on hook time. For each telephone call, a user can access buttons for force hang up, host record, or filename, start monitoring, start local recording, local record file name, or close. Users may also listen to real time telephone conversations using this piece of the shadow software.

The call system allows for quick and easy tabulation of data. Every report contains at a minimum general report capabilities. Reports may either be generated automatically at certain times or under certain conditions, or printed upon demand by prison staff members with appropriate user level access. Reports may be generated for one facility or a combination of facilities, depending upon the requesting user's security level.

All reports contain, at a minimum, time, terminal making request, parameters of the report, number of pages, report heading, end of report footer, report heading on each page, report title on each page, identified of the staff member creating the report. In the present example, the header on each page includes the prison name, report name, data and time of the report, page number, and field headings. The footer, contained at the end of the report, contains total for all columns containing dollar values, total count of inmates if the report contains inmate information, and total call counts or total call duration if report includes this information.

Various reports have different selection criteria and parameters to be defined before running the report. Many will prompt the user for a start date/time and an end date/time and an end date/time. Others require the user to select individual or multiple records at a time. Some reports utilize 'wizards', such as the telephone wizard, that allow the use of pre-saved selections. All reports can also be saved for later use.

An example report is shown in FIG. 40 displaying an account telephone number list report. Account telephone number list report 4000 displays all the telephone numbers on the allowed list for one or more inmates. For each inmate, the report displays inmate DOC number 4001, inmate name 4003, facility code 4005. The report additionally contains phone number column 4007, collect calls column (yes/no) 4009, accept direct calls column (yes/no) 4011, recorder on column (yes/no) 4013, number allowed column (yes/no) 4015, called party language column 4017, date number added to their list 4019, and total number of telephone numbers on the list 4021. Similar reports for call and financial statistics may be compiled according to their desired use.

Separate software may also be provided to control the biometric and RF authentication. Alternatively, or in combination, the call management software may contain suitable sub-routines to control the biometric and RF authentication.

Upon entering an institution, each potential telephone user has a telephone account setup. If biometric authentication is being utilized by the institution, the required information is scanned using a biometric scanner. This information is relayed through the DIS and stored on the site server along with the user's PIN and other authentication information. When a user attempts to access the telephone system at a later time, the system will ask the user to supply the same biometric information to the scanner located at the telephone. This information is compared to the biometric information already located on the site server using complicated algorithms to process the digitized data. If the supplied information matches the stored information, the user is authenticated and can use the call system call management system.

The biometric scanner may be a retinal scanner, fingerprint scanner, body heat sensor, or any other like device. Such scanners typically include means of digitizing the information so it is readily available to the DIS.

The called party may also be voice authenticated each time a user places a call (e.g., a record of voice prints for the called family members may be established). This provides additional security because it ensures that the user is not communicating with an unauthorized party.

The biometric information provided by the called party can also be used for third party call detection. By continuously sampling voice data from the telephone conversation, the biometric software can be used to detect if a third party or an unauthorized person has spoken. Upon third party detection, the call can be disconnected and/or authorities may be notified. This will cause an alert in the inmate's profile.

The biometric authentication software can easily be extended for use with telephone cards. Upon purchasing a telephone card with limited or unlimited debit, the user provides voice initial voice data for future voice authentication. This may occur in a number of ways. For example, the user may be required to provide voice information at the institution that the telephone debit card was purchased, such as a supermarket or convenience store. The voice information may also be provided the first time that a user calls the access number for the debit card. A voice prompt asks the user to state and repeat their name. Additionally, the telephone number from which the user is calling from may be asked for and entered via DTMF tones or recording based on the ANI data. The telephone system may then hang up the line and call back the number provided by the user and ask for voice authentication utilizing the information previously provided. Upon authentication, the user does not have to repeat the initial voice supplication. If a user attempts to use the purchased telephone debit account again, the user only has to supply voice authentication and/or an account or PIN. In this way, the user does not have to carry the telephone card to access the telephone system and need only remember the telephone access number. This authentication process can additionally be used with prepaid cellular telephones.

A similar authentication process may also be used to access an internet telephone account, or any other secure internet information. The person simply uses the microphone attached to their computer to provide the voice authentication instead of the telephone handset. This information can be transmitted via the internet to the server containing the stored biometric data and be used to voice authenticate the user.

The voice database concept may be extended for use on a PSTN. Each user of the public telephone network would only be granted access if the user's name is in the database. The voice database may also be used to limit telephone access. For example, a convicted criminal would be blocked from ever calling his previous victims. Teenagers may also be blocked from accessing "1-900" numbers and the like.

A national voice database may also be used to track wanted criminals. For example, if a wanted criminal or suspect ordered a pizza from a local pizzeria, biometric software, located on the same server as the voice database, could recognize the calling party as the wanted criminal. Authorities would then be alerted that the fugitive has been identified. Since the called number is known, authorities already have a means of narrowing the search field for the criminal. Authorities may then call the pizzeria and inquire about previously placed orders. This would provide them with a list of possible locations that the criminal may be located. Furthermore, if voice recognition is also in the capability of the biometric software, the food order of the calling party may be ascertained. Authorities could then inquire who placed that specific order. Speech recognition capability may additionally allow the address of the calling party to be located without ever having to call the pizzeria because a delivery address or telephone callback number is typically provided when placing a food order. Once the suspect is located, the suspect can easily be apprehended. This technology may also be used to help apprehend criminals who steal any device interfaced with a telephone network, public or private. Such devices include, but are not limited to; cellular telephones, wireless internet appliances, and laptops. Whenever the criminal attempts to use the stolen device, a voice print is automatically recognized by the voice database as not being an authorized user of that device. The proper authorities could then be alerted.

The RF authentication portion of the software operates in a similar fashion. When a user picks up the telephone, the RF emitter is activated. The signal is reflected by a band the user wears and the reflected signal is received by the RF sensor. Using this information, the RF software determines the distance of the inmate from the telephone and the user's uniquely encoded RF frequency. This is done using complex algorithms known to one skilled in this particular art. If the user is not a valid user of the call system, the prison authorities are notified at which facility and station ID the violation occurred. If the user is a valid user, the supplied PIN and/or biometric information are also authenticated. The user is allowed access to the system only if the information supplied is valid and agrees with the other authentication method utilized.

To implement the RF authentication, the user can be required to have in the user's possession some type of radio frequency identification technology to access the telephone system. This may be accomplished in a number of ways.

In a first example, each user of the system would be required to wear an RF band attached preferably to the ankle or wrist. The RF band may be active, passive, or neutral. For example, the frequency of the band is unique to each wearer. An active RF band contains a transponder that either intermittently or constantly emits an intermittent RF pulse that is detected by a series of sensors placed about the user's location. The sensors relay the detected data to a remote or central database containing a processor that calculates the location of the wearer in one of two usual methods known in the art, as well as those methods not yet contemplated.

The first method involves triangulating the user's source, which requires two or more sensors or a sensor on a rotating platform. The analyzing system detects the angle of the incident pulse with the sensor and uses this data from multiple detectors to triangulate the source of the user.

A second method of detection involves the analysis of the time of flight of the emitted RF pulse. This method requires the same sensor configuration as the triangulation method. In this method, the sensor measures the time it takes each pulse to arrive at the sensor location as compared to the pulses that occur at a regular rate in an active RF device. From this data, the analyzing system can determine an accurate distance from the sensor that the user must be located within some minor degree of error. By combining this information from a multitude of sensors, the location of the person can triangulated.

Active RF bands may be used in the invention to locate an individual within the facility housing the telephone system. When an individual attempts to access a telephone terminal, the system can determine the user accessing the terminal since the location of each individual is known. The options for that specific individual can then be used by the phone terminal allowing the user to place a call.

It is advantageous to use active RF bands because they are very accurate for determining the location of an individual. However, most active systems have a relatively short battery life and require constant recharging. A passive RF device may also be used with only slight modification to the system. A passive RF device works by emitting a pulse only when activated by some other emitted pulse. In this embodiment, the sensors may also be equipped with RF pulsing devices designed to activate the user's RF devices. When a user attempts to access a telephone terminal, the system sends out a pulse. As a result, the user's RF device is activated and the person using the telephone terminal is authenticated. The user's specific user options can then be forwarded to the telephone terminal the user is utilizing.

Passive RF bands may be used in conjunction with the invention for a variety of applications. For example, each telephone may be located in its own booth and fitted with an RF emitter and sensor. When a person attempts to access a telephone account at a terminal, an emitter terminal can send out a pulse activating a passive RF user device. In turn, the RF device may emit a responsive pulse. Subsequently, the sensor on the terminal can detect the responsive pulse. Using time of arrival analysis, the user can be located and verified, thereby authenticating the telephone terminal.

Neutral RF bands may also be used in the invention. Neutral RF bands function by reflecting an incident RF pulse with a slight modulation, which is unique to each user. In response, the sensor on the telephone terminal can record the reflected wave and forward the information to analyzing software. The analyzing software subtracts off the original pulse signal to determine the modulation frequency of the user's RF band, thereby authenticating the user at the terminal. The correct user options can then be supplied to that specific terminal.

Figure 41:
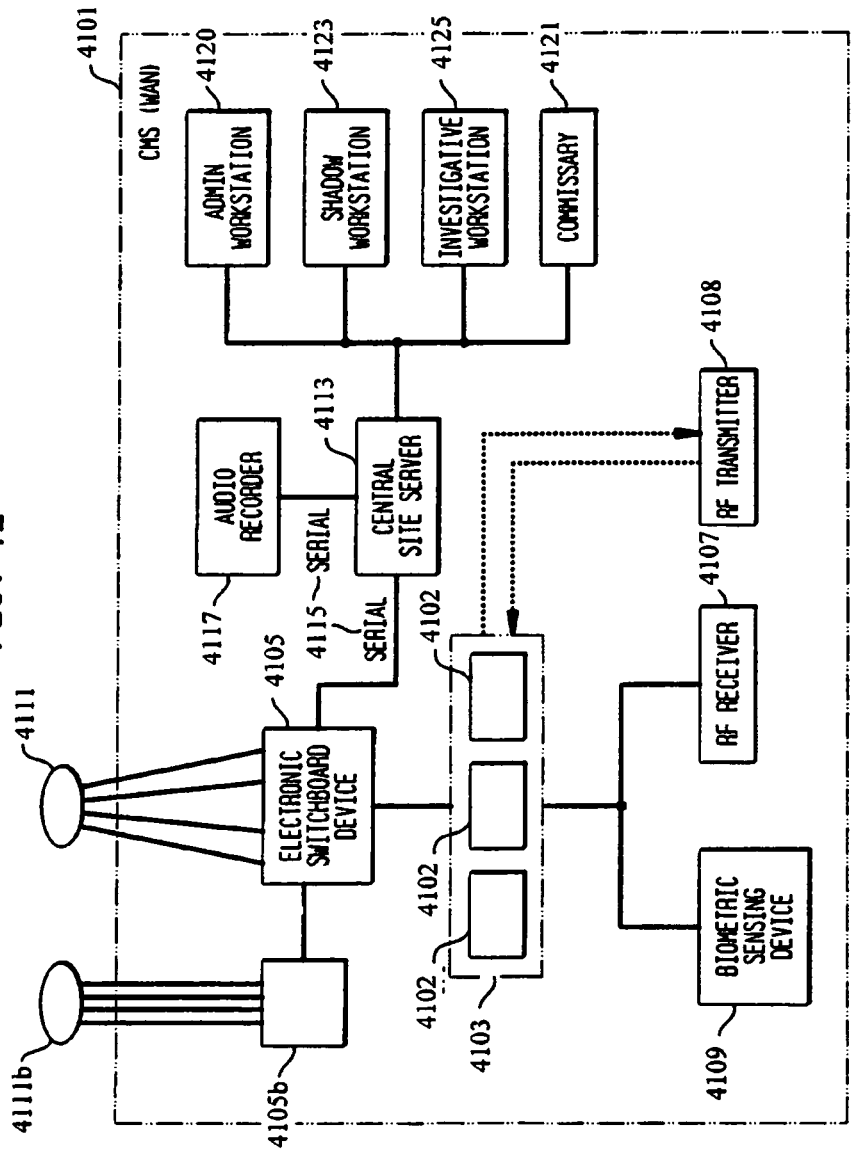
FIG. 41 depicts a schematic view of an alternate embodiment of the invention wherein a second electronic switchboard device is connected in parallel within the call management system to handle additional trunk line capacity and overflow.

Referring next to FIG. 41, shown is an alternative embodiment of call management system 4101. Electronic switchboard device 4105 regulates calls and connects them to proper outgoing trunk line 4111. Trunk line 4111 may consist of a multitude of connections to any number of local, long distance, or international telephone service providers. The number of trunk lines 4111 depends on the outgoing capacity desired by the institution. In addition, trunk lines 4111 may be analog, digital, or any other type of trunk lines not yet contemplated. Electronic switchboard device 4105 also further incorporates an integrated channel bank, allowing calls to be processed over either analog or digital trunks as required by call management system 4101. Specifically, when one trunk line 4111 is occupied and handling an outgoing communication, electronic switchboard device 4105 automatically accesses an alternate trunk line to handle the outgoing communication. If all trunk lines 4111 on the system are in use, the call may be routed to an alternate system as a busy signal (not depicted). For example, electronic switchboard device 4105 may be interconnected to another electronic switchboard device 4105b which may be located within the institution or at a geographically distinct location. In this embodiment, electronic switchboard device 4105b is connected to an additional series of trunk lines 4111b. The electronic switchboard device 4105 routes calls to electronic switchboard device 4105b if call volume is high. A cross point switch integrated into electronic switchboard device 4105 may also accomplish this routing. It is foreseeable that the embodiment described herein supports up to 32 inmate telephone stations 4103 and 24 trunk lines 4111. However, multiple units 4105 may be configured to support up to the required number of telephone stations and trunk lines.

In certain embodiments, one or more user telephones 4102 are optionally equipped with biometric sensing device 4109, such as a retinal scanner, fingerprint reader, etc., or any combination of biometric devices, so that the acquired biometric data can be used for user authentication. Alternatively, for efficiency, a single biometric sensing device 4109 may be employed for a multitude of user telephones 4102. Additionally, one or more telephones may optionally incorporate RF receiver 4107 and RF transmitter 4108 to provide RF signals for authentication purposes. In this scenario, it is foreseeable that at least certain users are required to wear an RF transmitter 4108 device to transmit radio waves to the RF receiver 4107. RF receiver 4107 is integral to telephone bank 4103 or may be remote to telephone bank 4103. Each RF transmitter 4108 may be uniquely encoded to a specific authorized user. The encoded signal for RF transmitter 4108 may be altered on an intermittent basis depending on the security desired at the institution. RF transmitter 4108 may be incorporated into a wristband, ankle band, or any other like device. It is foreseeable that RF transmitter 4108 may be semi-permanently or permanently attached to a user's person in any manner.

A central site server 4113, which is part of a central call management system 4101, interfaces within electronic switchboard device 4105 via a first serial port 4115. In one embodiment, an RS-232 serial port is employed for the interference connection. However, it is foreseeable that other types of serial ports 4115 commonly known in the art may be utilized. Serial port 4115 may also be comprised of a direct hardware connection or may consist of a series of ports and connecting means commonly known in the art for connecting electronic devices. Serial port 4115 is designed to allow firmware driven systems, such as electronic switchboard device 4105, to interface with software-based systems, such as a PC designed system operating as a site server. At central site server 4113, user call information is digitized for efficient data transfer and efficient record keeping.

It is preferred that central site server 4113 also stores the digitized audio used for voice prompts as well as each user's financial transaction data, call limitations, PIN, etc. However, depending on the memory requirements, numerous site servers may be employed. It is foreseeable that older archived data may also be stored on an integral or a remote computer system database (not shown) or kept on additional storage devices on the central site server 4113.

Connected to central site server 4113 via one of serial ports 4115 is audio recorder 4117. In the preferred embodiment of the invention, an RS-232 serial port is employed for the interference connection. However, it is foreseeable that other types of serial ports 4115 commonly known in the art may be utilized. Serial port 4115 may also be comprised of a direct hardware connection or may consist of a series of ports and connecting means commonly known in the art for connecting electronic devices. Audio recorder 4117 may be digital, may be or another known type of recording devices, as well as those not yet contemplated. Audio recorder 4117 records the conversations performed under the direction of central call management system 4101. Audio recorder 4117 may be activated for each call unless the number being called is specifically noted for no recording or monitoring, such as calls to or from an attorney. Furthermore, audio recorder 4117 can monitor multiple telephone lines simultaneously, using a different recorder channel number for each of trunk lines 4111 and 4111b. The recorder channel number further enables the institution's staff to identify the call record they wish to review associated with a desired outgoing telephone call.

Further, central site server 4113 is controlled by software associated with administrative workstation 4120. In the certain embodiments, administrative workstation 4120 is connected to central site server 4113 via a Wide Area Network (LAN). However, it is foreseeable that other types of electronic connections may be employed. The administrative workstation's 4120 software can add or modify blocked called party data for individual users in addition to call limitations and all telecommunication activity of the institution. This blocked called party data may include, for instance, blocked numbers as specified by the particular facility (e.g., as shown with respect to FIG. 17), or blocked numbers as specified by system administrators of plural facilities (e.g., nationwide, statewide, or regional) as shown with respect to FIG. 18. In further embodiments, the administrative workstation's 4120 software can add or modify flagged called party data, for instance, based upon instructions from a called party.

Additionally, the administrative workstation's 4120 software can also track a user's commissary information, such as the account balance if a debit system is being used. Furthermore, depending on the needs of an institution, the database may perform other functions.

The call management system 4101 also includes a commissary workstation 4121 used in conjunction with administrative workstation 4120 to manage and record a user's financial transactions. In an embodiment, commissary workstation 4121 and administrative workstation 4120 are connected to central site server 4113 via a WAN. However, other known connections, or connections not yet contemplated may be utilized. Commissary workstation 4121 can also record other financial information, such as the total amount spent on collect calls by each inmate, amount spent on debit calls, the total net financial transactions for each user, etc.

Shadow workstation 4123 and investigative workstation 4125 are also employed in the present embodiment of the call management system 4101. Shadow workstation 4123 and investigative workstation 4125 are connected via the local area network linked to central site server 4113 in the present embodiment. Shadow workstation 4123 utilizes a live operator to monitor telephone calls without detection. It is foreseeable that this function may be performed by software integrated with shadow workstation 4123. The shadow workstation 4123 software provides a means for patching into a call using circuitry without alerting the user or called party to the operator's presence. If the operator finds that a call being monitored is suspicious, the operator may manually (or by using software) activate the audio recorder 4117 to record a portion of an active telephone call. The called party's number may also be notes with instructions or an indicator in the inmate's profile (stored on administrative workstation 4120 or central site server 4113) to provide future monitoring of calls from the specific user to the specific called party.

Alternatively, software located on central site server 4113 or investigative workstation 4125 may be used to passively monitor calls. For example, when certain key words or phrases are spoken, voice recognition software may activate audio recorder 4117 via electronic means and alert the proper authorities that a violation has occurred.

Furthermore, investigative workstation 4125 controls other monitoring and security features interfaced in call system. For example, investigative workstation 4125 can be used to access past conversations stored on audio recorder 4117. Software on investigative workstation 4125 may also be configured to detect if a third party is present during a user's conversation. Investigative workstation 4125 or central site server 4113 may also contain voice recognition software to aid in calling or called party voice authentication. Administrative workstation 4120, shadow workstation 4123, investigative workstation 4125, and commissary workstation 4121 may alternatively be combined into one or several units. Furthermore, administrative workstation 4120, shadow workstation 4123, investigative workstation 4125, and commissary workstation 4121 may be integral within the central site server. It is also foreseeable that any component may be alternately located off site from the other apparati of the invention.

While the invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. A computer implemented method of managing restricted calls placed by a user of a phone system serving a secure premises, comprising:
 verifying an identity of the user of the phone system serving the secure premises based on a unique access identifier provided by the user;
 comparing a phone number associated with a phone call requested to be placed by the user to a called phone number list, wherein each phone number included in the called phone number list that is flagged is marked as potentially having restrictions placed on the user;
 connecting the phone call when the phone number is not flagged as potentially having restrictions placed on the user in the called phone number list;
 querying a restricted phone number list for the user when the phone number is flagged as potentially having restrictions placed on the user in the called phone number list; and
 determining whether the phone call is to be allowed or restricted based on instructions included in the restricted phone number list for each phone number that is flagged.

2. The computer implemented method of claim 1, wherein instructions to restrict the phone call provided by the restricted phone number list are based on a request of a called party at a receiving end of the phone call.

3. The computer implemented method of claim 1, wherein the called phone number list is stored locally to the phone system in an internal database.

4. The computer implemented method of claim 1, wherein the restricted phone number list is stored external to the phone system in an external database stored in an external server.

5. The computer implemented method of claim 4, wherein the connecting further comprises:
 minimizing network traffic on the phone system by refraining from querying the restricted phone number list stored external to the phone system in the external server when the phone number is not flagged in the called phone number list.

6. The computer implemented method of claim 1, further comprising:
 blocking the phone call from being connected when the instructions included in the restricted phone number list for the flagged phone number associated with the phone call require that the phone call be blocked.

7. The computer implemented method of claim 6, further comprising:
 notifying the user when the phone call is blocked.

8. The computer implemented method of claim 1, further comprising:
 connecting the phone call when the instructions included in the restricted phone number list for the flagged phone number associated with the phone call require that the phone call be connected to the called party for the user.

9. The computer implemented method of claim 1, further comprising:
 recording the phone call when the phone call is connected to the called party.

10. The computer implemented method of claim 1, further comprising:
 displaying the called phone number list in a local user profile, wherein each phone number included in the called phone number list is displayed with a flag or without a flag.

11. An electronic switchboard device, comprising:
 a local database configured to store a called phone number list for a user of a phone system serving a secure premises, wherein the called phone number list includes a plurality of called phone numbers with each phone number that is flagged is marked as potentially having restrictions placed on the user attempting to connect a phone call associated with each flagged phone number
 a call processing system configured to:
  verify an identity of a user of a phone system serving the secure premises based on a unique access identifier provided by the user,
  compare a phone number associated with a phone call requested to be placed by the user to the called phone number list for the user,
  query a restricted phone number list for the user when the phone number is flagged as potentially having restrictions placed on the user in the called phone number list, and
  determine whether the phone call is allowed or restricted based on instructions included in the restricted phone number list for each phone number that is flagged; and
 a call processor card configured to connect the phone call when the phone number is not flagged as potentially having restrictions placed on the user in the called phone number list.

12. The electronic switchboard device of claim 11, wherein the call processing system is further configured to restrict the phone call provided by the restricted phone number list are based on a request of a called party at a receiving end of the phone call.

13. The electronic switchboard device of claim 12, wherein the call processing system provides voice prompts to the user and the called party.

14. The electronic switchboard device of claim 11, wherein the restricted phone number list is stored external to the phone system in an external database stored in an external server.

15. The electronic switchboard device of claim 11, wherein the call processing system is further configured to minimize network traffic on the phone system by refraining from querying the restricted phone number list stored external to the phone system in the external server when the phone number is not flagged in the phone number list.

16. The electronic switchboard device of claim 11, wherein the call processing system is further configured to block the phone call from being connected when the instructions included in the restricted phone number list for the flagged phone number associated with the phone call require that the phone call be blocked.

17. The electronic switchboard device of claim 16, wherein the call processing system is further configured to notify the user when the phone call is blocked.

18. The electronic switchboard device of claim 11, wherein the call processor card is further configured to connect the phone call to the called party when the instructions included in the restricted phone number list for the flagged phone number associated with the phone call require that the phone call be connected to the called party for the user.

19. The electronic switchboard device of claim 11, further comprising:
 a spybox configured to monitor the phone call placed by the user that is connected to the called party.

20. The electronic switchboard device of claim 11, further comprising:

a call processor card configured to detect a hook-flash event that is indicative of a third party being connected to the phone call placed by the user.

* * * * *